United States Patent
Nakamura

(10) Patent No.: US 11,159,339 B2
(45) Date of Patent: Oct. 26, 2021

(54) INFORMATION PROCESSING APPARATUS, METHOD OF PROCESSING INFORMATION AND STORAGE MEDIUM

(71) Applicant: Ricoh Company, Ltd., Tokyo (JP)

(72) Inventor: Yutaka Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 195 days.

(21) Appl. No.: 16/676,589

(22) Filed: Nov. 7, 2019

(65) Prior Publication Data
US 2020/0177407 A1 Jun. 4, 2020

(30) Foreign Application Priority Data

Nov. 30, 2018 (JP) .............................. JP2018-226151

(51) Int. Cl.
| | |
|---|---|
| *G10L 15/22* | (2006.01) |
| *H04L 12/28* | (2006.01) |
| *H04N 1/00* | (2006.01) |
| *H04L 12/24* | (2006.01) |

(52) U.S. Cl.
CPC ............ *H04L 12/282* (2013.01); *G10L 15/22* (2013.01); *H04L 41/0806* (2013.01); *H04N 1/00403* (2013.01); *H04N 1/00488* (2013.01)

(58) Field of Classification Search
CPC ... H04L 12/282; H04L 41/0806; G10L 15/22; H04N 1/00403
See application file for complete search history.

(56) References Cited

U.S. PATENT DOCUMENTS

| | | | | |
|---|---|---|---|---|
| 5,375,063 A | * | 12/1994 | Peck | ...................... D05B 19/02 112/277 |
| 6,253,184 B1 | * | 6/2001 | Ruppert | ............. G03G 15/5016 704/272 |
| 2014/0282991 A1 | | 9/2014 | Watanabe et al. | |
| 2019/0304453 A1 | | 10/2019 | Nakamura | |

FOREIGN PATENT DOCUMENTS

| | | |
|---|---|---|
| JP | 2014-199653 | 10/2014 |
| JP | 2018-524645 | 8/2018 |
| WO | WO2017/206312 A1 | 12/2017 |

\* cited by examiner

*Primary Examiner* — Ibrahim Siddo
(74) *Attorney, Agent, or Firm* — Xsensus LLP

(57) ABSTRACT

An information processing apparatus includes circuitry configured to issue a provisional code in response to receiving a setup request via an audio input-output device useable for operating a target apparatus, store, in a memory, the issued provisional code in association with first identification information identifying the audio input-output device, transmit, to the audio input-output device, audio feedback information causing the audio input-output device to output the issued provisional code as audio, in response to inputting the provisional code, which is output via the audio input-output device, into the target apparatus, receive the provisional code and second identification information identifying the target apparatus transmitted from the target apparatus, and store, in the memory, the first identification information identifying the audio input-output device and the second identification information identifying the target apparatus in association with each other when the provisional code received from the target apparatus is already stored in the memory.

7 Claims, 37 Drawing Sheets

FIG. 10

| printColor | |
|---|---|
| ☑Define synonyms ⓘ  ☐Allow automated expansion | |
| auto_color | auto_color |
| monochrome | monochrome, black and white |
| color | color, full color |
| two_color | two color |
| single color | single color |
| red_and_black | red and black |

FIG. 11A

| " Add USER expression |
|---|

| " Please copy this by setting of two color, double sides and 2 in 1. |
|---|
| " Please copy this document by setting of Tray 1, fitting, and double sides. |
| " Make two copies of this document by monochrome and dark. |
| " Make three copies with 4 in 1. |
| " Execute copy by setting of color and auto tray. |
| " Please Copy this document with 80% on Tray 1. |
| " Copy dark on one side. |
| " copy by black and white and dark. |

RELATED PARAMETER

FIG. 11B

Action

| copy |
|---|

FIG. 11C

| Entity | ENTITY | VALUE |
|---|---|---|
| ☐ copies | @copies | Scopies |
| ☐ paperTray | @paperTray | SpaperTray |
| ☐ magnification | @magnification | Smagnification |
| ☐ printColor | @printColor | SprintColor |
| ☐ printSide | @printSide | SprintSide |
| ☐ combine | @combine | Scombine |
| ☐ density | @density | Sdensity |
| ⋮ | ⋮ | ⋮ |

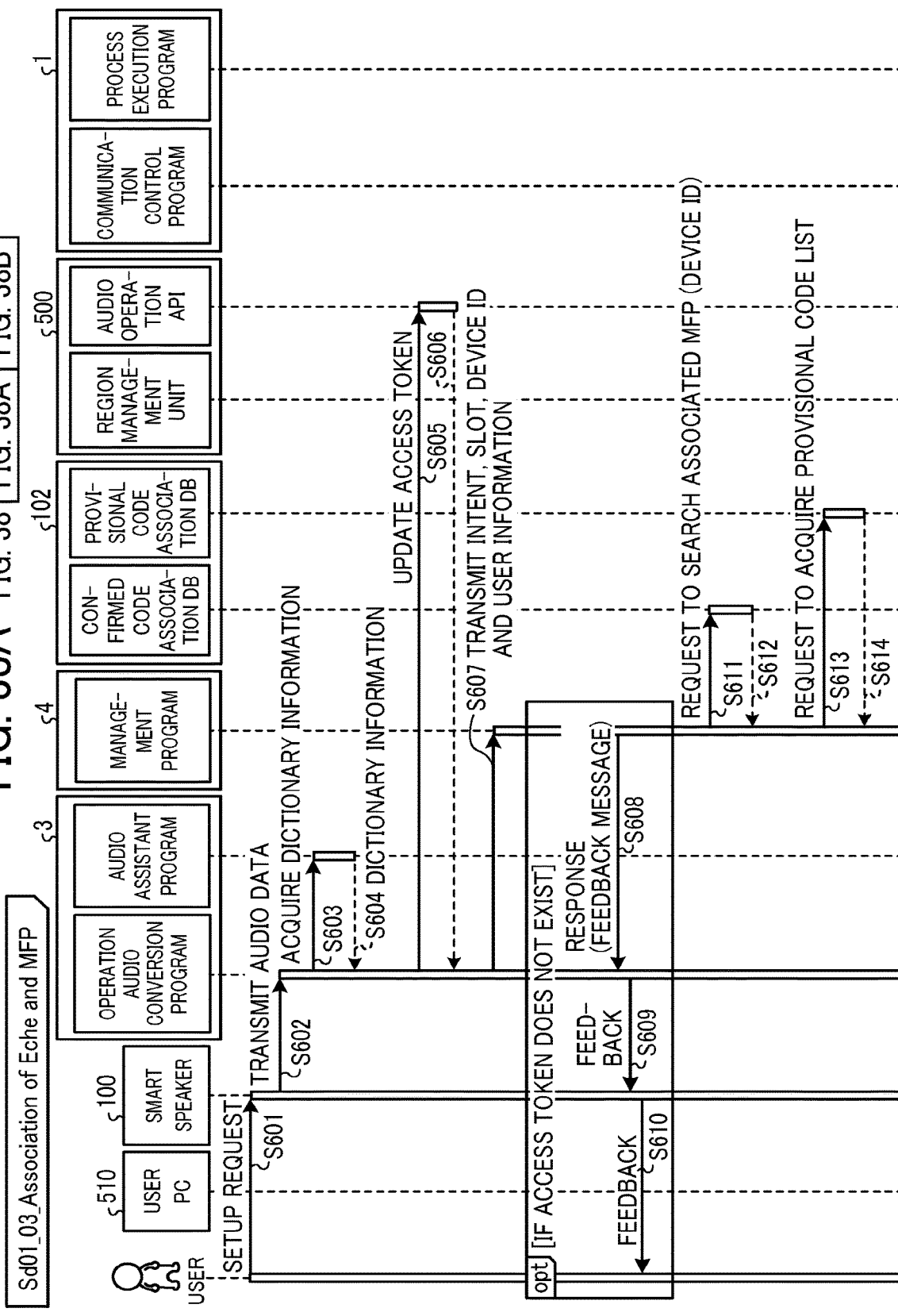

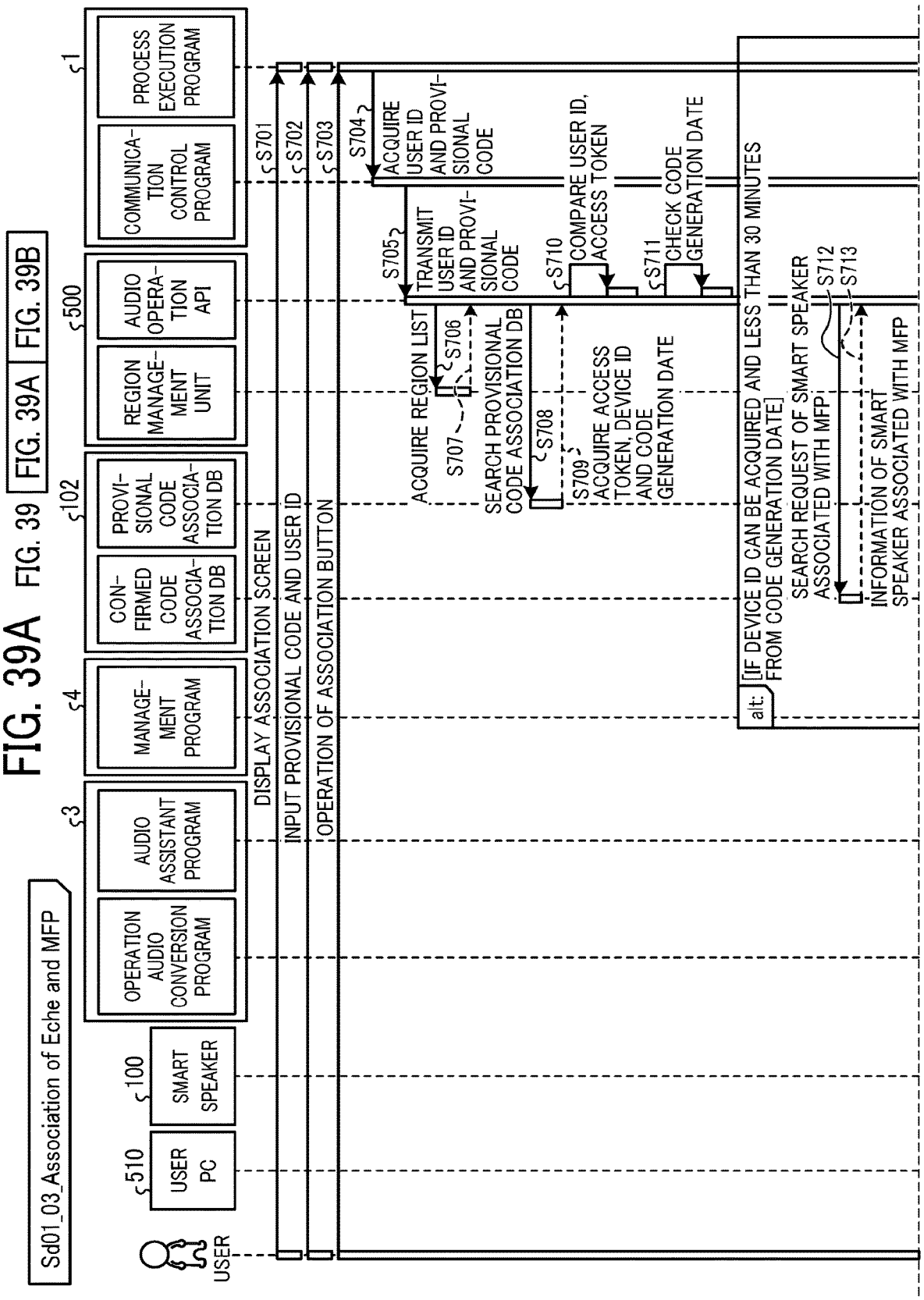

INFORMATION PROCESSING APPARATUS, METHOD OF PROCESSING INFORMATION AND STORAGE MEDIUM

CROSS-REFERENCE TO RELATED APPLICATION

This application claims priority pursuant to 35 U.S.C. § 119(a) to Japanese Patent Application No. 2018-226151, filed on Nov. 30, 2018 in the Japan Patent Office, the disclosure of which is incorporated by reference herein in its entirety.

BACKGROUND

Technical Field

This disclosure relates to an information processing apparatus, a method of processing information, and non-transitory computer readable storage medium storing program codes for causing a computer to execute a method of processing information.

Background Art

Artificial intelligence (AI) audio assistants have been used for operating devices or apparatuses. Further, smart home appliances can be operated by audio (e.g., voice) instructions, and the application fields of using audio-based operation are expected to grow further in the future. In conventional technologies, an account that is logged in by a smart device and account information of a control target apparatus are associated with each other so that the control target apparatus, which is controlled from the smart device, can be identified.

SUMMARY

As one aspect of the present disclosure, an information processing apparatus is devised. The information processing apparatus includes circuitry configured to issue a provisional code in response to receiving a setup request via an audio input-output device, the audio input-output device useable for operating a target apparatus based on an audio instruction input via the audio input-output device, store, in a memory, the issued provisional code in association with first identification information identifying the audio input-output device, transmit, to the audio input-output device, audio feedback information causing the audio input-output device to output the issued provisional code as an audio, in response to inputting the provisional code, which is output via the audio input-output device, into the target apparatus operable by the audio input-output device, receive the provisional code and second identification information identifying the target apparatus transmitted from the target apparatus, and store, in the memory, the first identification information identifying the audio input-output device and the second identification information identifying the target apparatus in association with each other when the provisional code received from the target apparatus is already stored in the memory.

As another aspect of the present disclosure, a method of processing information is devised. The method includes issuing a provisional code in response to receiving a setup request via an audio input-output device, the audio input-output device useable for operating a target apparatus based on an audio instruction input via the audio input-output device, storing, in a memory, the issued provisional code in association with first identification information identifying the audio input-output device, transmitting, to the audio input-output device, audio feedback information causing the audio input-output device to output the issued provisional code as an audio, in response to inputting the provisional code, which is output via the audio input-output device, into the target apparatus operable by the audio input-output device, receiving the provisional code and second identification information identifying the target apparatus transmitted from the target apparatus, and storing, in the memory, the first identification information identifying the audio input-output device and the second identification information identifying the target apparatus in association with each other when the provisional code received from the target apparatus is already stored in the memory.

As another aspect of the present disclosure, a non-transitory computer readable storage medium storing one or more instructions that, when performed by one or more processors, cause the one or more processors to execute a method of processing information is devised. The method includes issuing a provisional code in response to receiving a setup request via an audio input-output device, the audio input-output device useable for operating a target apparatus based on an audio instruction input via the audio input-output device, storing, in a memory, the issued provisional code in association with first identification information identifying the audio input-output device, transmitting, to the audio input-output device, audio feedback information causing the audio input-output device to output the issued provisional code as an audio, in response to inputting the provisional code, which is output via the audio input-output device, into the target apparatus operable by the audio input-output device, receiving the provisional code and second identification information identifying the target apparatus transmitted from the target apparatus, and storing, in the memory, the first identification information identifying the audio input-output device and the second identification information identifying the target apparatus in association with each other when the provisional code received from the target apparatus is already stored in the memory.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 10 illustrates an example of entity information used for interpreting an audio input by a user in an audio-based operation system according to the first embodiment;

FIGS. 11A, 11B and 11C illustrate an example of entity information registered based on a spoken phrase in an audio-based operation system according to the first embodiment;

FIGS. 38A and 38B (FIG. 38) are a sequence diagram illustrating a flow of a first half of an association operation between a smart speaker and an MFP in an audio-based operation system according to the third embodiment; and FIGS. 39A and 39B (FIG. 39) are a sequence diagram illustrating a flow of a second half of an association operation between a smart speaker and an MFP in an audio-based operation system according to the third embodiment, continued from FIG. 38.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an information processing system, an information processing apparatus, a method of processing information, and a storage medium strong a program of a method of processing information, applied to an audio-based operation system.

First Embodiment

Figure 1:
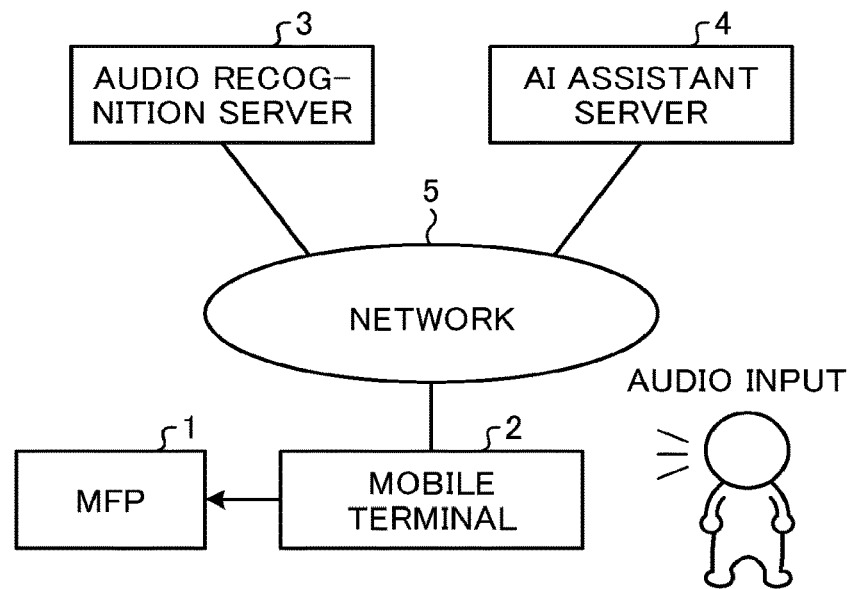
FIG. 1 is an example system configuration of an audio-based operation system according to a first embodiment of the present disclosure.

System Configuration:

FIG. 1 is a diagram illustrating an example system configuration of an audio-based operation system according to a first embodiment of the present disclosure. As illustrated in FIG. 1, the audio-based operation system can be configured by connecting a plurality of apparatuses, such as a multi-function peripheral (MFP) 1 (an example of target apparatus), a mobile terminal 2 (an example of information processing apparatus), such as smart phone or tablet terminal, an audio recognition server 3, and an AI assistant server 4 via a network 5, such as local area network (LAN). The target apparatus is not limited to the multifunction peripheral (MFP) but can be a variety of electronic apparatuses and devices including office apparatuses, such as electronic information board and projector.

The mobile terminal 2 receives an audio (e.g., voice), input by a user, to perform an audio-based operation (audio-use operation) of the MFP 1. Further, the mobile terminal 2 feeds back the received operation to the user using audio, such as sound. Further, the mobile terminal 2 relays data communication (text data communication to be described later) to the audio recognition server 3 and the AI assistant server 4.

The audio recognition server 3 analyzes audio data received from the mobile terminal 2 and converts the audio data into text data. The audio recognition server 3 corresponds to a first server in this description.

The AI assistant server 4 analyzes the text data, which may be received from the audio recognition server 3, and converts the text data into a user intention registered in advance, such as a job execution instruction of the MFP 1, and transmits the job execution instruction to the mobile terminal 2.

The AI assistant server 4 corresponds to a second server in this description. The MFP 1 executes the job execution instruction transmitted from the mobile terminal 2. The communication between the mobile terminal 2 and the MFP 1 can be wireless communication or wired communication. That is, the mobile terminal 2 can be employed as an operation terminal that can be connected to the MFP 1 using wireless communication or wired communication. Further, the mobile terminal 2 can be employed as an operation terminal that can be detachably attached to the MFP 1.

In this example case, two servers such as the audio recognition server 3 and the AI assistant server 4 are provided, but the audio recognition server 3 and the AI assistant server 4 can be integrated as a single server. Further, each of the audio recognition server 3 and the AI assistant server 4 can be configured using a plurality of servers.

Figure 2:
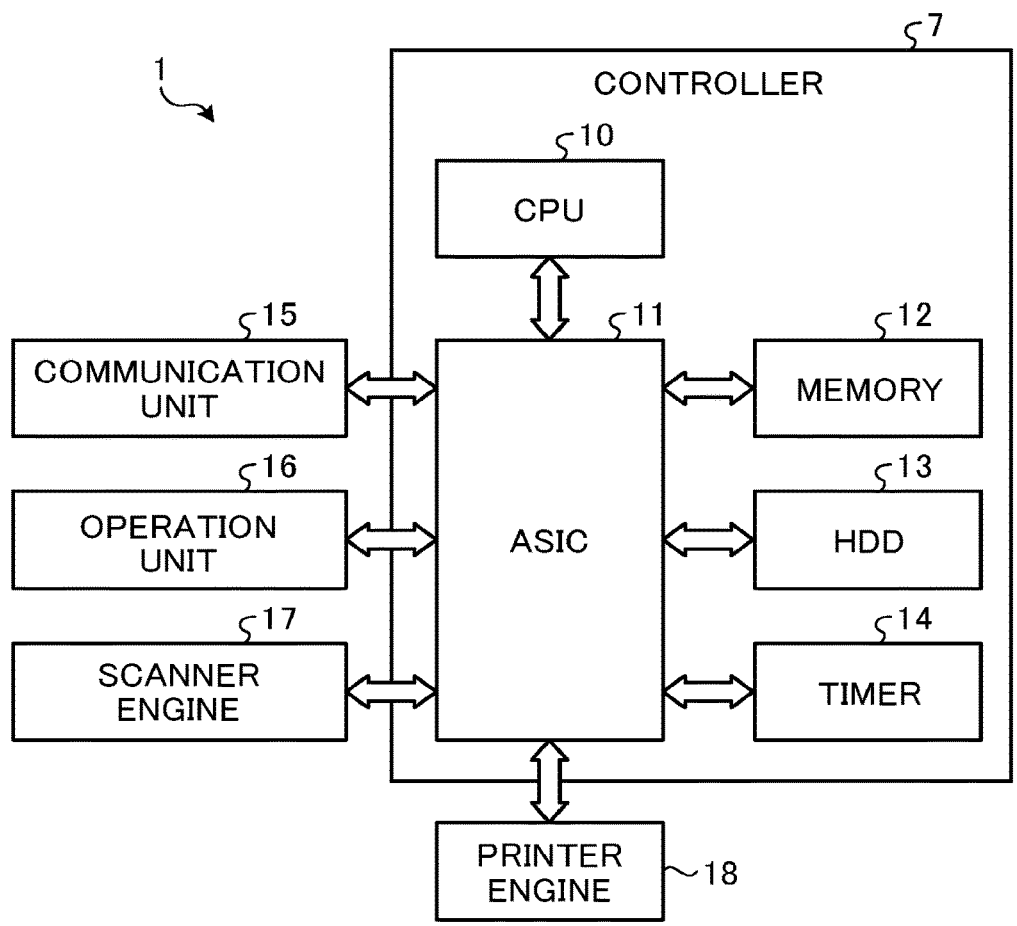
FIG. 2 is an example block diagram of a hardware configuration of a multifunction peripheral (MFP) provided for an audio-based operation system according to the first embodiment.

Hardware Configuration of MFP:

FIG. 2 is an example block diagram of a hardware configuration of the MFP 1 provided in the audio-based operation system. The MFP 1 includes a plurality of functions, such as a printer function and a scanner function. That is, as illustrated in FIG. 2, the MFP 1 includes, for example, a controller 7, a communication unit 15, an operation unit 16, a scanner engine 17, and a printer engine 18.

As illustrated in FIG. 2, the controller 19 includes, for example, a central processing unit (CPU) 10, an application specific integrated circuit (ASIC) 11, a memory 12, a hard disk drive (HDD) 13, and a timer 14. The CPU 10 to the timer 14 are connected to each other to enable interactive communication via a bus line.

The communication unit 15 is connected to the network 5, and acquires a job execution instruction, such as a scan instruction or a print instruction, input by using the mobile terminal 2, to be described later. The communication unit 15 is implemented by, for example, a network interface circuit.

The operation unit 16 is, for example, a touch panel integrating a liquid crystal display (LCD) and a touch sensor. When an operator (user) inputs an execution instruction of a desired operation using the operation unit 16, the operator can designate the desired operation by operating one or more operation buttons (e.g., software keys) displayed on the operation unit 16.

The scanner engine 17 controls a scanner unit to optically read document. The printer engine 18 controls an image writing unit to print an image on, for example, a transfer sheet. The CPU 10 controls the image forming apparatus entirely. The ASIC 11, which is a large-scale integrated circuit (LSI), performs various image processing necessary for images processed by the scanner engine 17 and the printer engine 18. The scanner engine 17 and the printer engine 18, which are engines for executing the job execution instruction acquired from the mobile terminal 2, correspond to the functional units.

The memory 12 stores applications to be executed by the CPU 10 and various data to be used when executing various applications. The HDD 13 stores image data, various programs, font data, various files, or the like. Further, a solid state drive (SSD) can be provided in place of the HDD 13 or along with the HDD 13.

Figure 3:
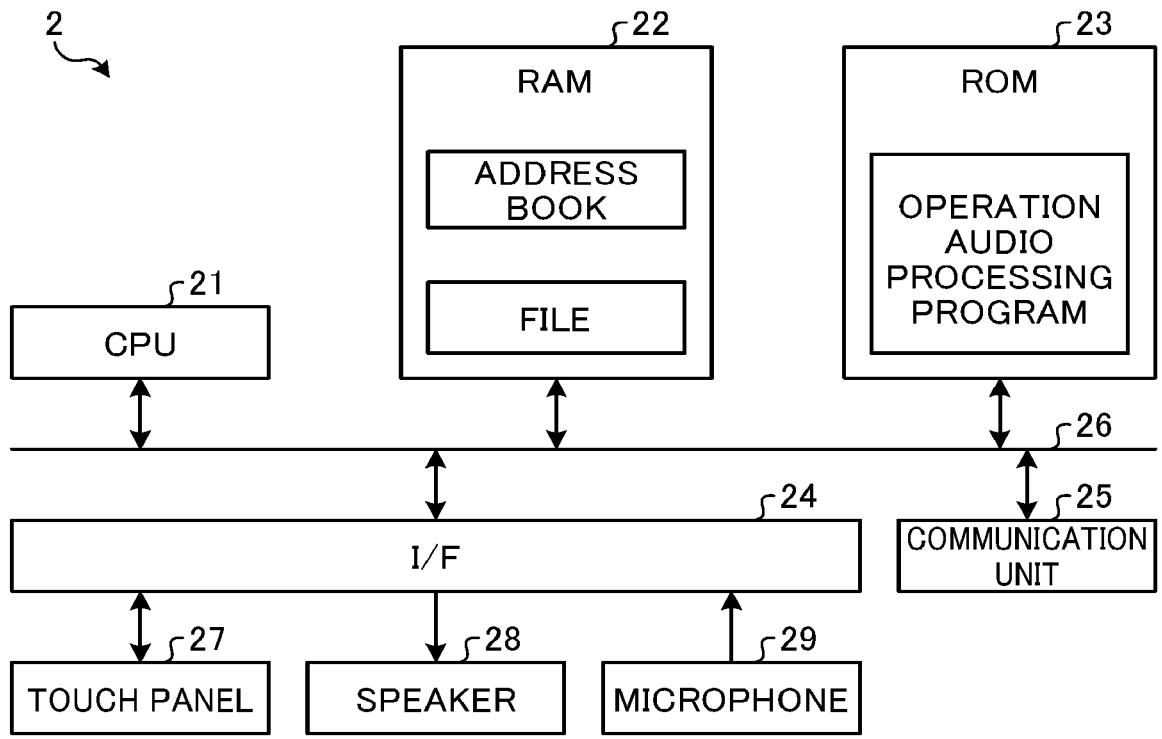
FIG. 3 is an example block diagram of a hardware configuration of a mobile terminal provided for an audio-based operation system according to the first embodiment.

Hardware Configuration of Mobile Terminal:

FIG. 3 is an example block diagram of a hardware configuration of the mobile terminal 2 provided in the audio-based operation system. As illustrated in FIG. 3, the mobile terminal 2 includes, for example, a CPU 21, a random access memory (RAM) 22, a read only memory (ROM) 23, an interface (I/F) 24, and a communication unit 25 connected with each other via a bus line 26. The RAM 22 stores an address book storing e-mail addresses of users who can become transmission destinations of e-mail, scanned image, or the like. The RAM 22 further stores files of image data to be printed.

The ROM 23 stores an operation audio processing program. When the CPU 21 executes the operation audio processing program, an audio input operation of the MFP 1 can be performed.

The I/F 24 is connected to a touch panel 27, a speaker 28, and a microphone 29. The microphone 29 collects (acquires) an input audio indicating a job execution instruction to the MFP 1 in addition to communication voice. The input audio is transmitted to the audio recognition server 3 via the communication unit 25, and then converted into text data in the audio recognition server 3. The communication unit 25 is implemented by, for example, a network interface circuit.

Figure 4:
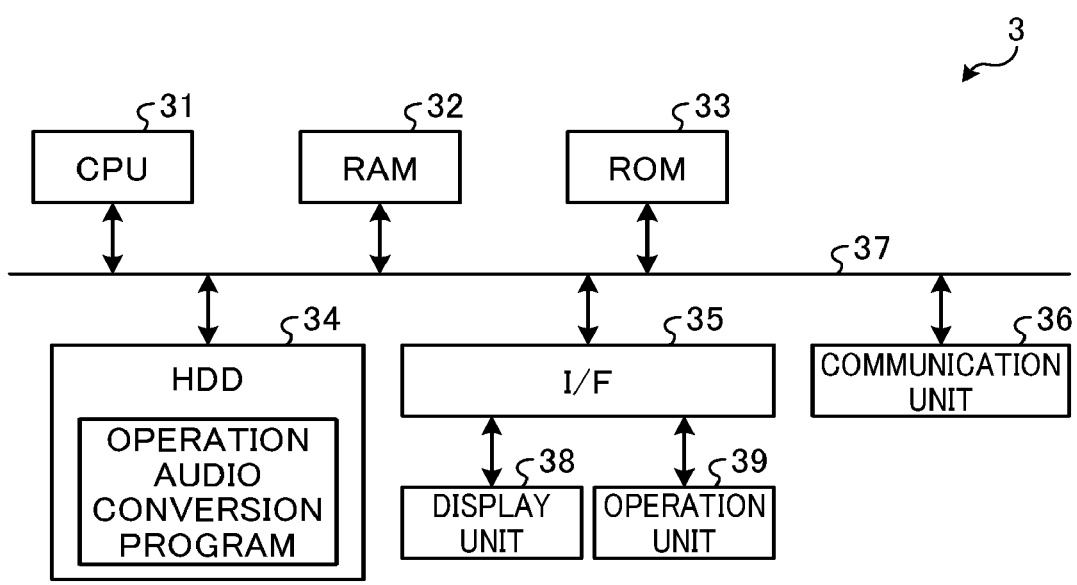
FIG. 4 is an example block diagram of a hardware configuration of an audio recognition server provided for an audio-based operation system according to the first embodiment.

Hardware Configuration of Audio Recognition Server:

FIG. 4 is an example block diagram of a hardware configuration of the audio recognition server 3 provided in the audio-based operation system. As illustrated in FIG. 4, the audio recognition server 3 includes, for example, a CPU 31, a RAM 32, a ROM 33, a hard disk drive (HDD) 34, an interface (I/F) 35, and a communication unit 36 connected with each other via a bus line 37. The I/F 35 is connected to a display unit 38 and an operation unit 39. The HDD 34 stores an operation audio conversion program used for converting audio data into text data. The CPU 31 executes the operation audio conversion program to convert the audio data transmitted from the mobile terminal 2 into the text data, and then returns the text data to the mobile terminal 2. The communication unit 36 is implemented by, for example, a network interface circuit.

Figure 5:
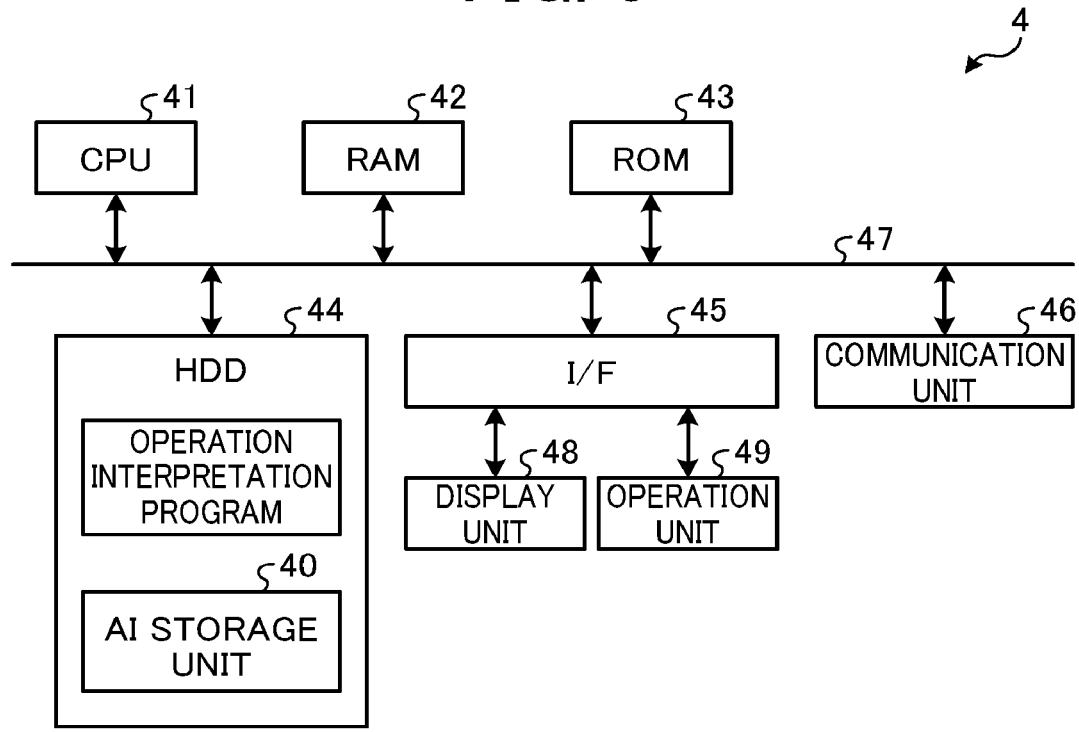
FIG. 5 is an example block diagram of a hardware configuration of an artificial intelligence (AI) assistant server provided for an audio-based operation system according to the first embodiment.

Hardware Configuration of AI Assistant Server:

FIG. 5 is an example block diagram of a hardware configuration of the AI assistant server 4 provided in the audio-based operation system. As illustrated in FIG. 5, the AI assistant server 4 includes, for example, a CPU 41, a RAM 42, a ROM 43, an HDD 44, an interface (I/F) 45, and a communication unit 46 connected to each other via a bus line 47. The I/F 45 is connected to a display unit 48 and an operation unit 49. The HDD 44 stores an operation interpretation program used for interpreting a job instructed by a user. The communication unit 46 is implemented by, for example, a network interface circuit.

The CPU 41 executes the operation interpretation program to interpret a job instructed by the user from the text data generated (converted) by the audio recognition server 3. Then, an interpretation result is transmitted to the mobile terminal 2. The mobile terminal 2 converts the interpretation result into a job instruction or job execution instruction, and transmits the job instruction to the MFP 1. As a result, the MFP 1 can be operated by the audio input via the mobile terminal 2.

Figure 6:
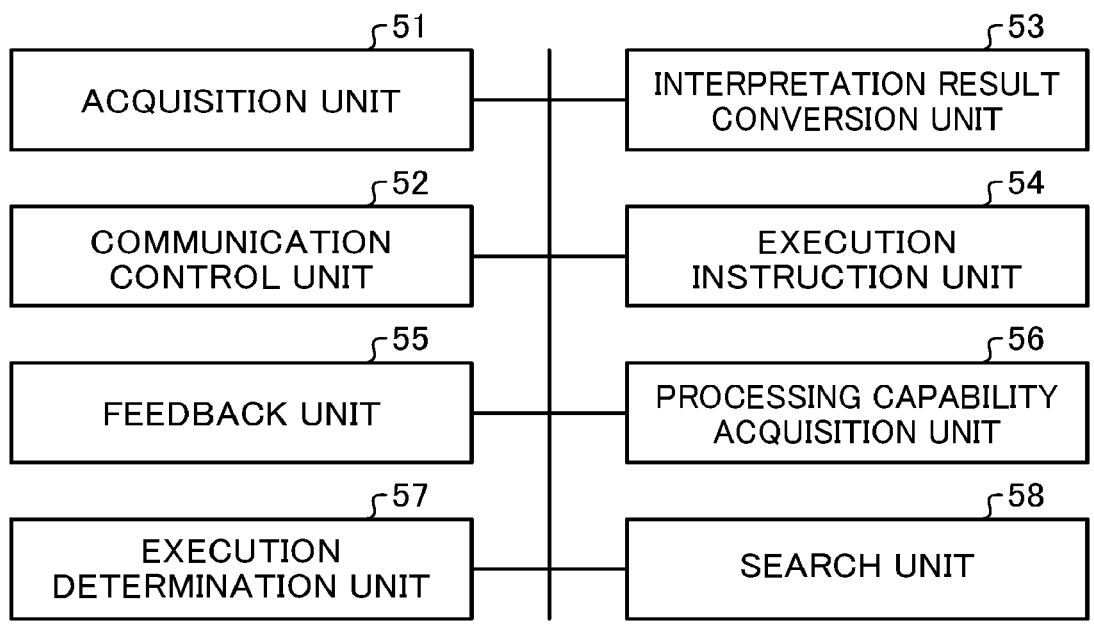
FIG. 6 is an example block diagram of a functional configuration of a mobile terminal provided for an audio-based operation system according to the first embodiment.

Function of Mobile Terminal:

FIG. 6 is an example block diagram of a functional configuration of the mobile terminal 2 provided in the audio-based operation system. When the CPU 21 of the mobile terminal 2 executes the operation audio processing program stored in the ROM 23, the CPU 21 implements functions, such as an acquisition unit 51, a communication control unit 52, an interpretation result conversion unit 53, an execution instruction unit 54, an feedback unit 55, a processing capability acquisition unit 56, an execution determination unit 57, and a search unit 58 as illustrated in FIG. 6.

The acquisition unit 51, which is an example of an acquisition unit and a first acquisition unit, acquires an audio instruction input by a user and collected via the microphone 29, which is used for an audio-based operation of the MFP 1.

The communication control unit 52, which is an example of an output unit, a first output unit, a second output unit, a third output unit, a second acquisition unit and a third acquisition unit, controls communication between the mobile terminal 2 and the MFP 1, communication between the mobile terminal 2 and the audio recognition server 3, and communication between the mobile terminal 2 and the AI assistant server 4.

The interpretation result conversion unit 53, which is an example of a conversion unit, converts an interpretation result of text data corresponding to user's audio instruction into a job instruction or job execution instruction of the MFP 1. The execution instruction unit 54 transmits the job instruction or job execution instruction to the MFP 1 to instruct a job execution.

The feedback unit 55, which is an example of a modification unit, feeds back audio for demanding or prompting an input of data that is determined to be insufficient, or feeds back audio for demanding or prompting a confirmation of the input of data to implement an interactive audio input operation.

The processing capability acquisition unit 56, which is an example of a processing capability detection unit, acquires, from the MFP 1, information of processing capability of the MFP 1, such as the maximum number of pixels that can be processed at the MFP 1.

The execution determination unit 57 compares the processing capability of the MFP 1 and a job designated by a user to determine whether or not the job designated by the user can be executed using the processing capability of the MFP 1.

The search unit 58, which is an example of a print information detection unit and an address detection unit, searches a transmission destination and/or a file instructed by a user from a memory, such as the RAM 22.

In this example case, the acquisition unit 51 to the search unit 58 are implemented by software, but a part or all of the acquisition unit 51 to the search unit 58 can be implemented by hardware, such as integrated circuit (IC). Further, the functions implemented by the acquisition unit 51 to the search unit 58 can be implemented by the operation audio processing program alone, or a part of the functions implemented by the acquisition unit 51 to the search unit 58 can be implemented by using other programs, or the functions implemented by the acquisition unit 51 to the search unit 58 can be implemented indirectly by executing other programs. For example, information such as the processing capability of MFP 1 can be acquired by other programs, and the processing capability acquisition unit 56 can acquire the information acquired by other programs, in which the processing capability acquisition unit 56 can acquire the information set for the MFP 1 indirectly.

Figure 7:
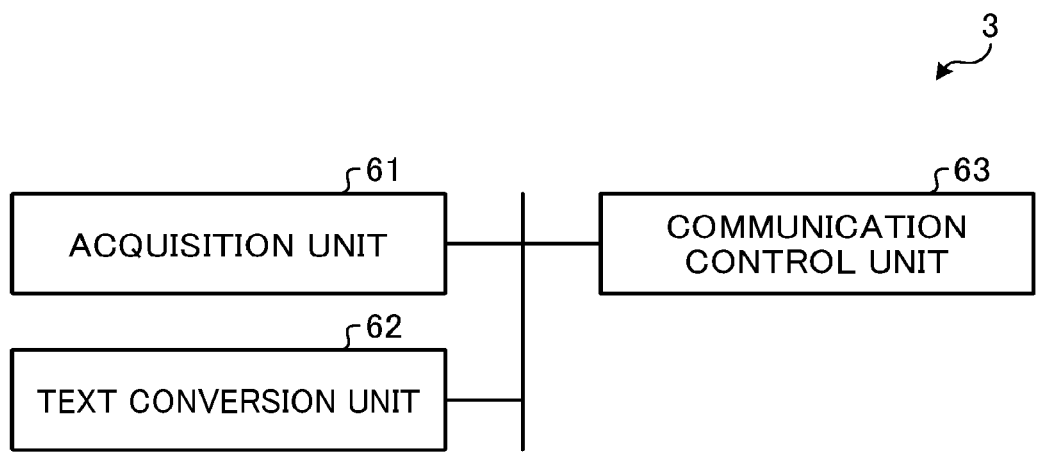
FIG. 7 is an example block diagram of a functional configuration of an audio recognition server provided for an audio-based operation system according to the first embodiment.

Function of Audio Recognition Server:

FIG. 7 is an example block diagram of a functional configuration of the audio recognition server 3 provided in the audio-based operation system. The CPU 31 of the audio recognition server 3 executes the operation audio conversion program stored in the HDD 34 to implement functions, such as an acquisition unit 61, a text conversion unit 62, and a communication control unit 63 as illustrated in FIG. 7. The acquisition unit 61 acquires audio data input by a user, which is transmitted from the mobile terminal 2. The text conversion unit 62, which is an example of an audio recognition unit, converts the audio data input by a user into text data. The communication control unit 63 controls the communication unit 36 to receive the audio data input by a user and to transmit the text data to the mobile terminal 2.

In this example case, the acquisition unit 61 to the communication control unit 63 are implemented by software, but a part or all of the acquisition unit 61 to the communication control unit 63 can be implemented by hardware, such as integrated circuit (IC). Further, the functions implemented by the acquisition unit 61 to the communication control unit 63 can be implemented by the operation audio conversion program alone, a part of the functions implemented by the acquisition unit 61 to the communication control unit 63 can be implemented by using other programs, or the functions implemented by the acquisition unit 61 to the communication control unit 63 can be implemented indirectly by executing other programs.

Figure 8:
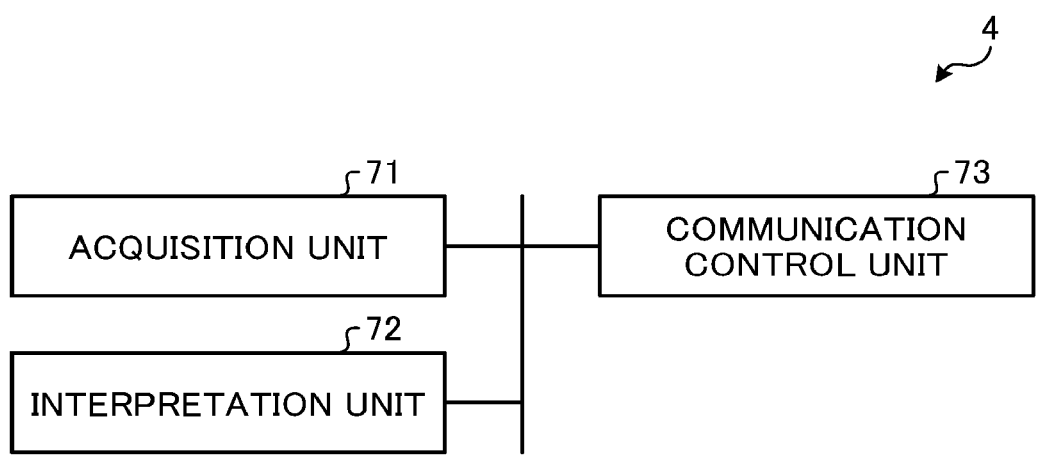
FIG. 8 is an example block diagram of a functional configuration of an AI assistant server provided for an audio-based operation system according to the first embodiment.

Function of AI Assistant Server:

FIG. 8 is an example block diagram of a functional configuration of the AI assistant server 4 provided in the audio-based operation system. The CPU 41 of the AI assistant server 4 executes the operation interpretation program stored in the HDD 44 to implement functions, such as an acquisition unit 71, an interpretation unit 72, and a communication control unit 73 as illustrated in FIG. 8.

The acquisition unit 71 acquires the text data, corresponding to the audio data input by a user, which is transmitted from the mobile terminal 2. The interpretation unit 72, which is an example of an extraction unit, interprets an operation instruction input by the user based on the text data. The communication control unit 73 controls the communication unit 46 to transmit an interpretation result to the mobile terminal 2 used by a user, and to receive the text data corresponding to the audio data input by the user.

In this example case, the acquisition unit 71 to the communication control unit 73 are implemented by software, but a part or all of the acquisition unit 71 to the communication control unit 73 can be implemented by hardware, such as integrated circuit (IC). Further, the functions implemented by the acquisition unit 71 to the communication control unit 73 can be implemented by the operation interpretation program alone, or a part of the functions implemented by the acquisition unit 71 to the communication control unit 73 can be implemented by using other programs, or the functions implemented by the acquisition unit 71 to the communication control unit 73 can be implemented by executing other programs.

Further, the operation audio processing program, the operation audio conversion program, and the operation interpretation program can be recorded on a recording medium such as compact disk ROM (CD-ROM), flexible disk (FD), readable by computers, in an installable format or an executable format file. Further, the operation audio processing program, the operation audio conversion program, and the operation interpretation program can be recorded on a recording medium, such as compact disk recordable (CD-R), digital versatile disk (DVD), Blu-ray Disc (registered trademark) and semiconductor memory, readable by computers. Further, the operation audio processing program, the operation audio conversion program, and the operation interpretation program can be provided via a network such as the Internet or the like, or can be provided in advance in a ROM or the like disposed in the apparatus.

Figure 9:
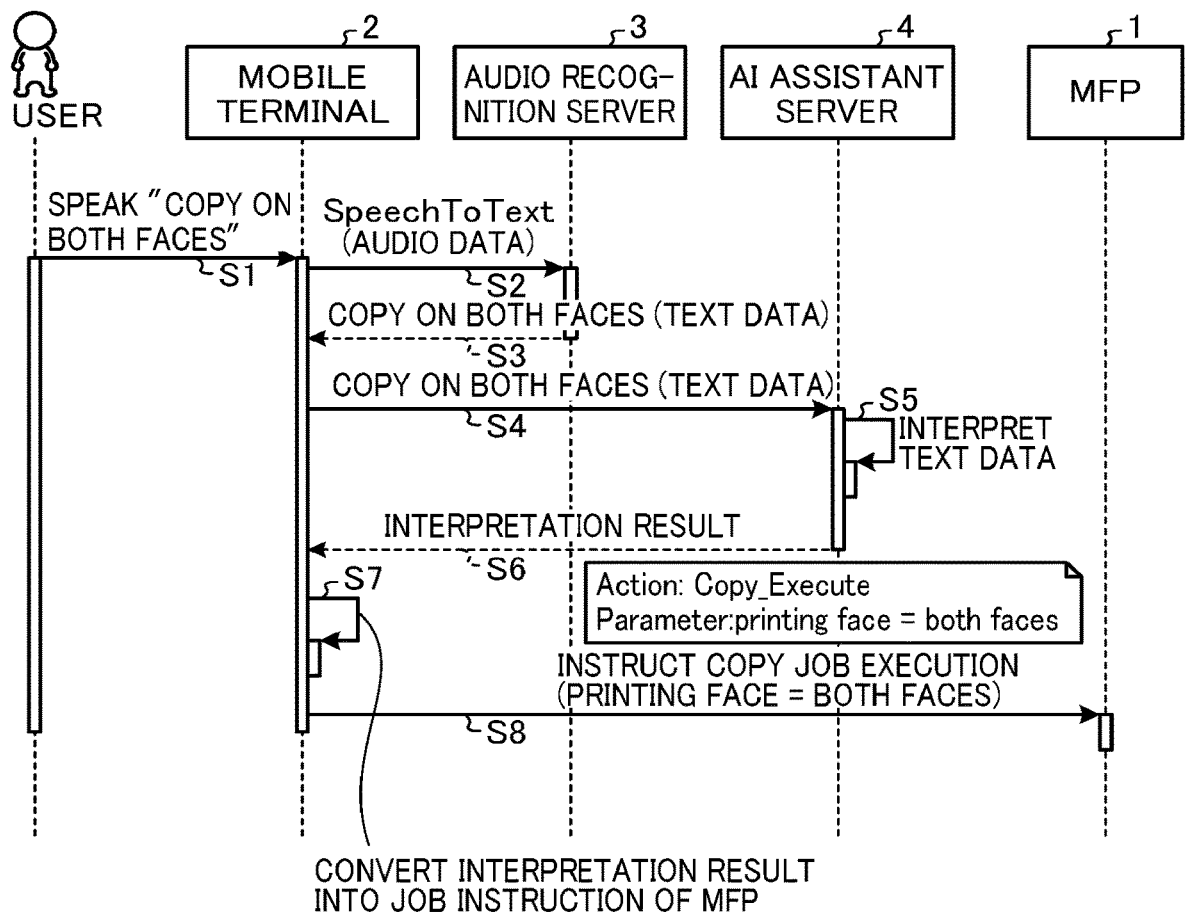
FIG. 9 is a sequence diagram illustrating a flow of an overall operation of audio-based operation in an audio-based operation system according to the first embodiment.

Audio Input Operation:

Hereinafter, a description is given of an audio input operation in the audio-based operation system according to the first embodiment with reference to FIG. 9. FIG. 9 is an example of a sequence diagram of operating the MFP 1 to perform a both-face (double-sided) copying function based on an audio input operation via the mobile terminal 2. In this example case, a user activates the operation audio processing program of the mobile terminal 2, and then speaks, for example, "copy on both faces" to the mobile terminal 2.

Then, the audio (e.g., voice) of the user is collected by the microphone 29 of the mobile terminal 2 and then acquired by the acquisition unit 51 of the mobile terminal 2 (step S1).

Then, the communication control unit 52 of the mobile terminal 2 transmits audio data of "copy on both faces" to the audio recognition server 3 and controls the communication unit 25 to transmit an audio-to-text conversion request to the audio recognition server 3 (step S2).

Then, the text conversion unit 62 of the audio recognition server 3 converts the audio data of "copy on both faces" into text data.

Then, the communication control unit 63 of the audio recognition server 3 controls the communication unit 36 to transmit the text data, converted from the audio data, to the mobile terminal 2 (step S3).

Then, the communication control unit 52 of the mobile terminal 2 transmits the text data of "copy on both faces" to the AI assistant server 4 (step S4).

In this example case, the interpretation unit 72 of the AI assistant server 4 interprets the text data of "copy on both faces" as an operation to be requested to the MFP 1 such as "copy (Action: Copy_Execute)" and interprets that "printing face is both faces (printing face=both faces)" (step S5). In this manner, the interpretation unit 72 generates an interpretation result indicating the type (action) and content (parameter) of a job designated by the user based on the text data.

Then, the communication control unit 63 of the AI assistant server 4 transmits the interpretation result to the mobile terminal 2 via the communication unit 46 (step S6).

Then, the interpretation result conversion unit 53 of the mobile terminal 2 converts the interpretation result received from the AI assistant server 4 into a job instruction of the MFP 1 (step S7).

The following Table 1 illustrates an example of the interpretation result and the job instruction converted from the interpretation result. In order to convert the interpretation result into the job instruction, the interpretation result conversion unit 53 can be configured to store information corresponding to Table 1 in the storage unit of the mobile terminal 2 and refer to Table 1 as needed.

TABLE 1

| Name | Value | Processing by voice actions application |
|---|---|---|
| Action | COPY_EXECUTE | Execution of copy job |
|  | SCAN_EXECUTE | Execution of scan job |
|  | PRINT_EXECUTE | Execution of print job |
|  | FAX_EXECUTE | Execution of fax job |
| Parameter | printing face | Change setting value of printing face |
|  | number of copies | Change setting value of number of copies |
|  | *parameter may include any value designatable as job setting value | |

In an example of Table 1, "COPY_EXECUTE," "SCAN_EXECUTE," "PRINT_EXECUTE," and "FAX_EXECUTE" are set as examples of the Action. Further, the "printing face" and "number of copies" are indicated as examples of the Parameter. The Parameter includes any parameter that can be designated as the job setting value.

The interpretation result conversion unit 53 of the mobile terminal 2 converts an interpretation result of "COPY_EXECUTE" into a job instruction of the MFP 1, such as "Execution of copy job." Similarly, the interpretation result conversion unit 53 converts an interpretation result of "SCAN_EXECUTE" into a job instruction of the MFP 1 such as "Execution of scan job." Similarly, the interpretation result conversion unit 53 converts an interpretation result of "PRINT_EXECUTE" into a job instruction of the MFP 1 such as "Execution of print job." Similarly, the interpretation result conversion unit 53 converts an interpretation result of "FAX_EXECUTE" into a job instruction of the MFP 1 such as "Execution of fax job."

Further, if the interpretation result includes the parameter of "printing face," the interpretation result conversion unit 53 of the mobile terminal 2 generates a job instruction of the MFP 1, such as "change setting value of printing face." Similarly, if the interpretation result includes the parameter of "number of copies," the interpretation result conversion unit 53 generates a job instruction of the MFP 1, such as "change setting value of number of copies."

That is, the interpretation result conversion unit 53 of the mobile terminal 2 determines a type of job to be executed in the MFP 1 based on the information included in "Action" of the interpretation result, determines a value included in the "Parameter" as the job setting value, and converts the interpretation result into the job instruction.

Then, the communication control unit 52 of the mobile terminal 2 controls the communication unit 25 to transmit the job instruction generated as above described to the MFP 1 (step S8). In this example case, the job instruction of "copy job execution (printing face=both faces)" is transmitted to MFP 1. As a result, the duplex printing is executed in the MFP 1.

Interpretation in AI Assistant Server:

An AI storage unit 40 of the HDD 44 of the AI assistant server 4 stores AI assistant service information used for interpreting a job instructed by an audio input by a user. The AI assistant service information includes, for example, entity information (Entity), action information (Action), and intent information (Intent).

The entity information is information that associates parameters of job with natural language, and a plurality of synonyms can be registered for one parameter. The action information is information indicating a type of job.

The intent information associates the user-spoken phrases (natural language) and the entity information, and the user-spoken phrases (natural language) and the action information, respectively. The intent information enables a correct interpretation even if a sequence or nuance of the parameter is slightly changed. Further, the intent information can be used to generate response text (interpretation result) based on the input content.

FIG. 10 illustrates an example of the entity information used for interpreting an audio input by a user in the audio-based operation system. FIG. 10 is an example of the entity information corresponding to "Print Color." In FIG. 10, characters of "printColor" indicates an entity name. Further, in FIG. 10, characters such as "auto_color," "monochrome," "color," or the like in the left column indicate specific parameter names, respectively. Further, in FIG. 10, characters such as "auto_color," "monochrome, black and white," "color, full color," or the like in the right column indicate specific synonyms, respectively.

As indicated in FIG. 10, the parameters and synonyms can be associated with each other as the entity information and stored. By registering the associated parameters and synonyms, for example, if a copying of monochrome is to be instructed, the parameter can be set even if a user speaks "Please copy by black and white" or "Please copy by monochrome."

FIG. 11 is an example of entity information that is registered based on a spoken phrase. FIG. 11A illustrates spoken phrases of user according to the embodiment. FIG. 11B illustrates an action name according to the embodiment. FIG. 11C illustrates the entity information according to the embodiment. As indicated in FIGS. 11A to 11C, by operating the operation unit 49 on a screen displayed on the display unit 48 provided for the AI assistant server 4, user-spoken content can be dragged. Alternatively, if another apparatus is connected to the AI assistant server 4, by operating an operation unit of another apparatus that have accessed the AI assistant server 4 via the network, the user-spoken content can be dragged.

With this configuration, the entity information, which is a target of association, can be selected. Further, when a value ("VALUE" in FIG. 11C) is set for the selected entity information, the parameter, which is entered as the response, is changed. For example, if the user speaks "Please copy by black and white," and the value is "SprintColor," a return value of "printColor=monochrome" is returned. In contrast, if the value is "SprintColor.original," then a return value of "printColor=black and white" is returned. In this case, if the value is "SprintColor.original," the user-spoken content itself can be returned as the parameter of the response.

Interactive Operation:

Hereinafter, a description is given of an interactive operation implemented in the audio-based operation system of the first embodiment, in which the system performs the interactive operation based on content input by a user, such as audio (e.g., voice) input by the user. In the audio-based operation system of the first embodiment, in addition to responding to standard phrases necessary for the interactive operation, an interactive operation using the MFP 1 can be implemented by performing two types of responses, such as "input insufficient feedback" and "input confirmation feedback" as the responses specifically set for the operation using the MFP 1.

The "input insufficient feedback" is a response that is output when information required to execute a job is not enough. If the information content input by the user cannot be recognized by the system, or if the required parameter is determined to be insufficient, the "input insufficient feedback" is output. That is, for parameters other than the required parameters (hereinafter, non-relevant parameter), it is not necessary to provide insufficient feedback even if the non-relevant parameter is not instructed. Further, in addition to the parameters, a process of checking to-be-used functions, such as a copying function and a scanning function, can be also included in the "input insufficient feedback."

For example, depending on the type of a target apparatus connected to the mobile terminal 2, the functions and the parameters to be checked by the user can be changed. In this case, the processing capability acquisition unit 56 acquires information indicating the type and function of the target apparatus at a given timing after the communication with the target apparatus is established, and then, for example, the feedback unit 55 can determine which function and parameter are to be checked or confirmed by the user based on the acquired information. For example, if the type of target apparatus is the MFP 1, the functions included in the MFP 1 such as copying, printing, scanning, facsimile can be checked or confirmed by the user, and the functions, such as copying, printing, scanning, facsimile, included only in the MFP 1 can be checked or confirmed by the user.

The "input confirmation feedback" is a response that is output when the information required to execute the job is sufficiently or completely prepared. That is, the input confirmation feedback is output only when all of the required parameters are instructed. Further, the input confirmation feedback is performed to demand or prompt the user to select whether to execute the job using the current setting values or to change the current setting values. In order to confirm whether or not to execute the job using the current setting values, all of the parameters (any required parameter and any non-required parameter) instructed by the user can be output as an audio sound so that the parameters can be confirmed by the user.

Figure 12:
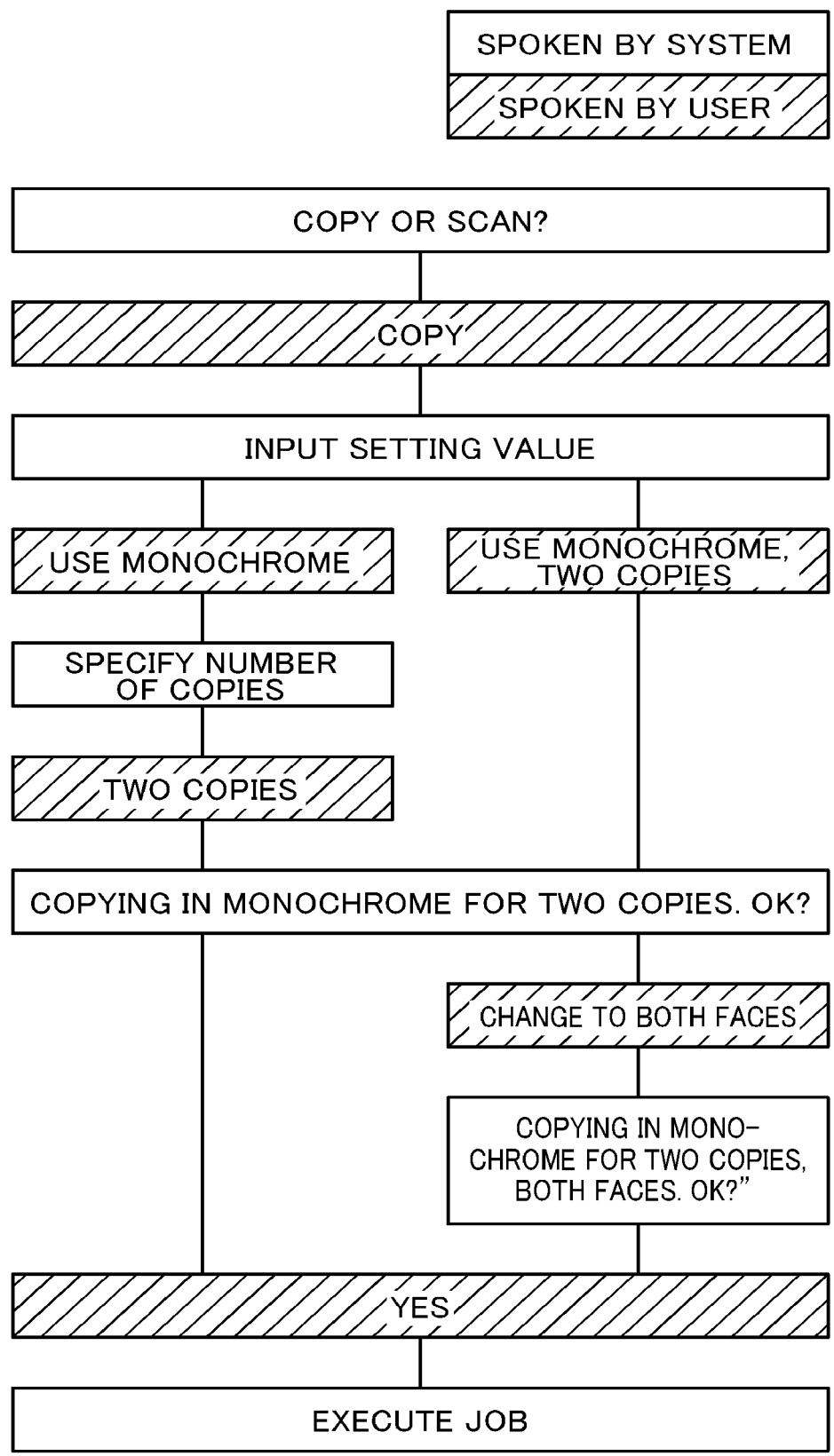
FIG. 12 is a diagram illustrating a flow of an interactive input operation in an audio-based operation system according to the first embodiment.

An example of an interactive operation between the system and a user, including the above described feedback, is illustrated in FIG. 12. FIG. 12 is an example flow of an interactive input operation. FIG. 12 is an example of an operation of the MFP 1 to perform copying of two copies of a monochrome image on both faces of a recording medium, such as sheet. In this example case, the number of copies (e.g., one copy) becomes the required parameter. The required parameter is not limited to the number of copies, but may include a plurality of parameters, such as monochrome, color, and sheet size.

Further, one or more required parameters can be determined from a plurality of parameters and can be stored in advance in the storage unit of the AI assistant server 4. Further, a user can appropriately change which parameters are the required parameters by operating the operation unit 49 or by accessing the AI assistant server 4 via the network.

In an example case illustrated in FIG. 12, sections indicated by a diagonal line is spoken by a user (audio output by the user) and sections without the diagonal line is spoken by the system (audio output by the system).

At first, when the system outputs (speaks) an audio of "copy or scan?," the user speaks "copy" to instruct to use the copy function. Then, the system outputs (speaks) an audio of "input setting value" to request the user to input or enter one or more setting values to be used for "copy" designated by the user.

Then, it is assumed that the user speaks "use monochrome." In this case, as described above, the number of copies is the required parameter. Therefore, the system requests the number of copies, such as "specify number of copies." This is an example of "input insufficient feedback." As to such "input insufficient feedback," the user specifies number of copies, such as "two copies." Thus, the insufficient input state is solved, so that the system responds with an audio of "copying in monochrome for two copies. OK?" and demands or prompts the user to start the copying. This is the "input confirmation feedback" that is output when the information necessary to execute the job becomes complete.

Further, if the user responds with an audio of "use monochrome, two copies" to the "input setting value," the information necessary for executing the job becomes sufficient or complete, and thereby the system outputs the above described "input confirmation feedback" such as "copying in monochrome for two copies. OK?"

Then, if a copy mode is changed from the one face (one-sided) copying to the duplex (two-face) copying, the user speaks an audio of "change to both faces." In this case, since the information necessary to execute the job becomes sufficient or complete, the system outputs "the input confirmation feedback" such as "copying in monochrome for two copies, both faces. OK?"

Then, if the user responds "YES" to the "input confirmation feedback such as "copying in monochrome for two copies. OK?" or "copying in monochrome for two copies, both faces. OK?", the system responds with an audio of "Execute job," and executes the job designated by the user.

Figure 13:
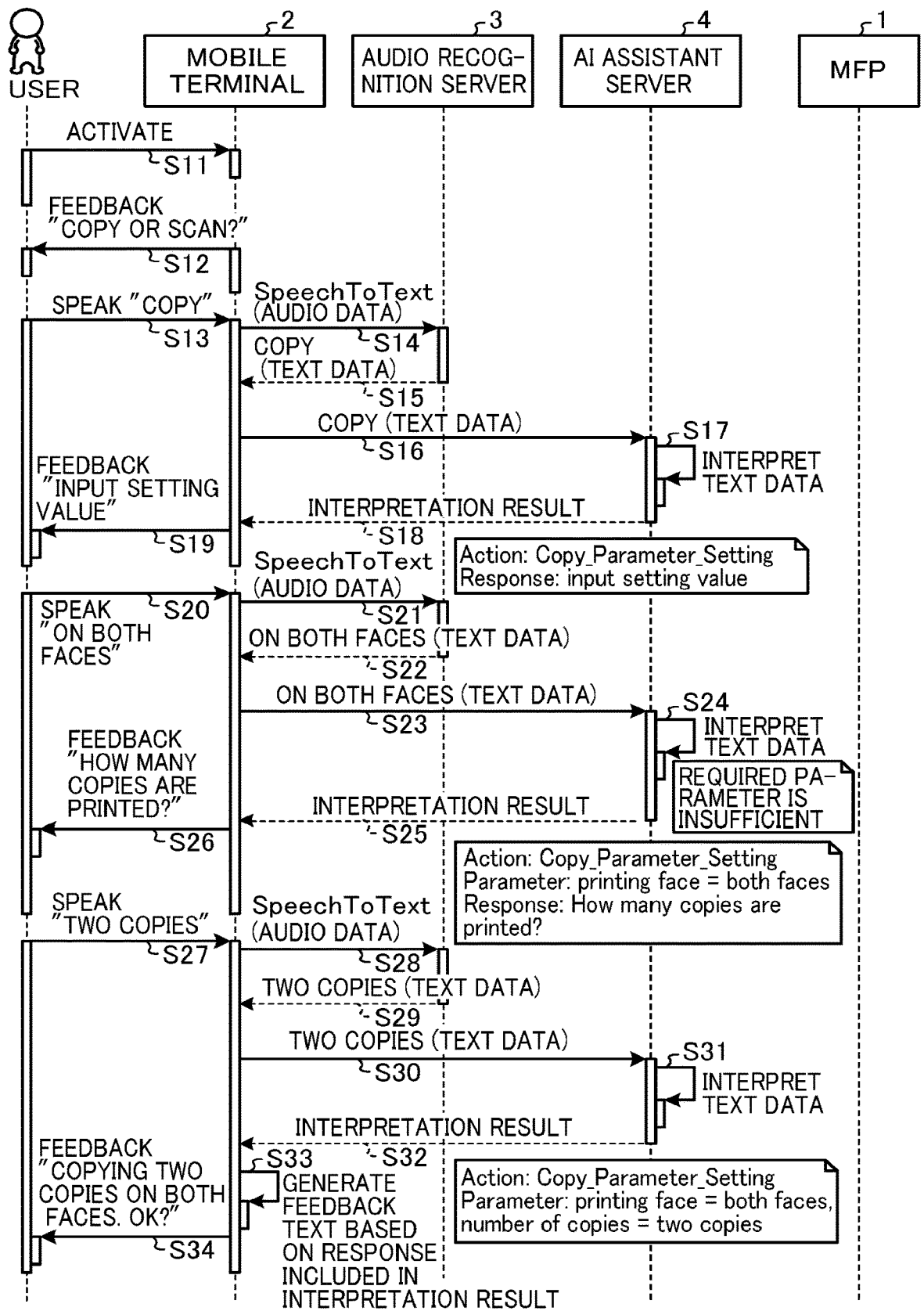
FIG. 13 is a sequence diagram indicating a flow of a first half of an interactive input operation in an audio-based operation system according to the first embodiment.
Figure 14:
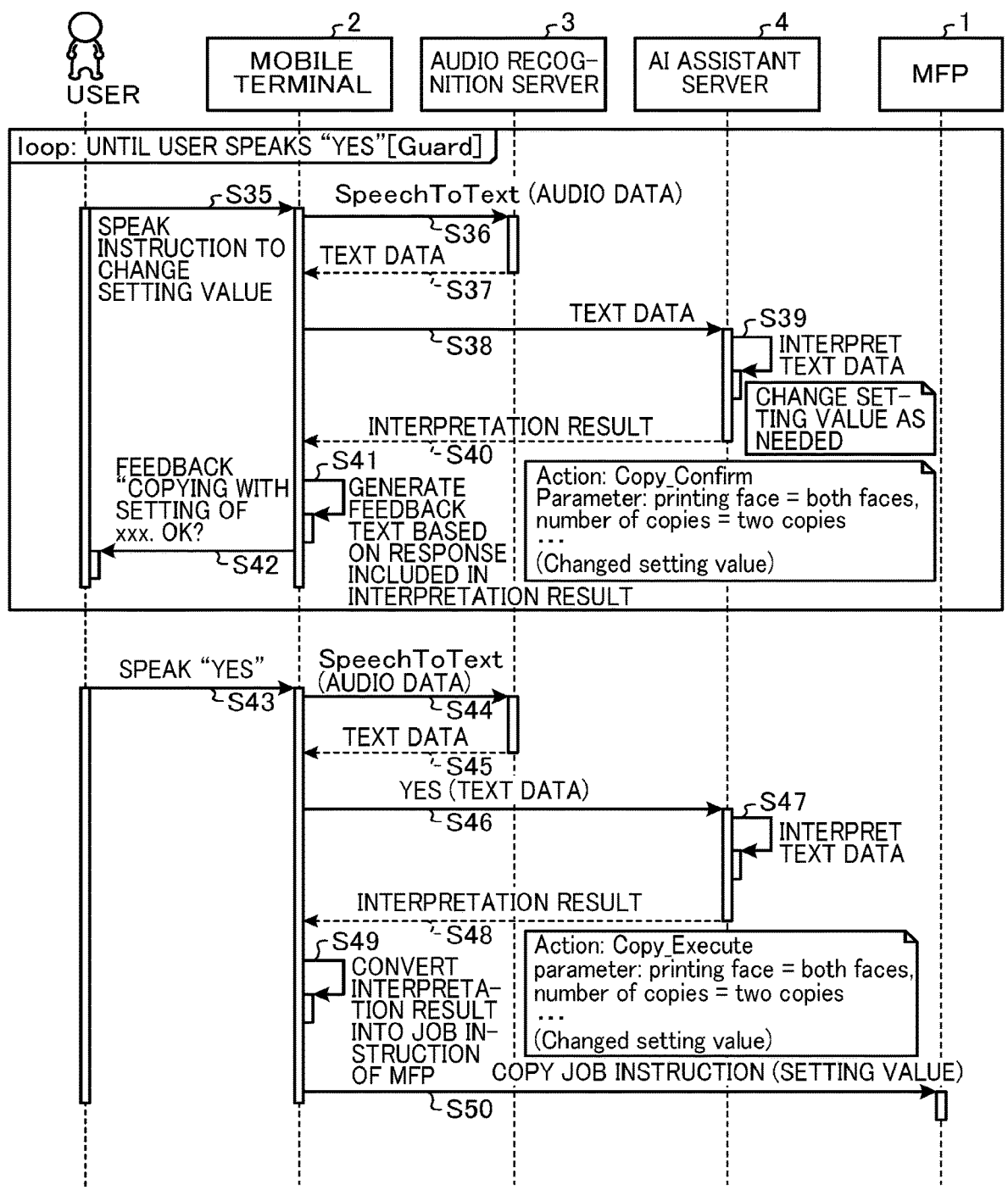
FIG. 14 is a sequence diagram illustrating a flow of a second half of an interactive input operation in an audio-based operation system according to the first embodiment, continued from FIG. 13.

Flow of Interactive Operation:

FIGS. 13 and 14 are sequence diagrams illustrating a flow of the interactive operation. The sequence diagram of FIG. 13 illustrates a flow of a first half of the interactive operation, and the sequence diagram of FIG. 14 illustrates a flow of a second half of the interactive operation.

At first, when the operation audio processing program of the mobile terminal 2 is activated by a user (step S11), the feedback unit 55 speaks an audio feedback of "copy or scan?" (step S12).

If the user speaks "copy" (step S13), the communication control unit 52 of the mobile terminal 2 transmits audio data of "copy" to the audio recognition server 3 with an audio-to-text conversion request (step S14).

Then, the text conversion unit 62 of the audio recognition server 3 converts the audio data of "copy" into text data, and transmits the text data to the mobile terminal 2 (step S15).

Then, the acquisition unit 51 of the mobile terminal 2 acquires the text data from the audio recognition server 3.

Then, the communication control unit 52 of the mobile terminal 2 transmits the acquired text data to the AI assistant server 4 (step S16). As described with reference to FIGS. 10 and 11, the interpretation unit 72 of the AI assistant server 4 interprets the action and parameter based on the user-spoken phrase indicated by the received text data. In this example case, since the user only speaks "copy," the number of copies is unknown (insufficient input).

Therefore, the interpretation unit 72 generates an interpretation result adding the Response of "input setting value" to the Action of "Copy_Parameter_Setting" (step S17).

Then, the communication control unit 73 of the AI assistant server 4 transmits the interpretation result to the mobile terminal 2 (step S18).

Then, based on the interpretation result, the feedback unit 55 of the mobile terminal 2 outputs an audio of "input setting value" via the speaker 28, and also instructs the touch panel 27 to display text of "input setting value" (step S19: input insufficient feedback).

Then, since the input insufficient feedback is output via the mobile terminal 2, the user speaks, for example, "on both faces" (step S20).

Then, the communication control unit 52 of the mobile terminal 2 transmits audio data of "on both faces" to the audio recognition server 3 with an audio-to-text conversion request (step S21).

Then, the text conversion unit 62 of the audio recognition server 3 converts the audio data of "on both faces" into text data, and transmits the text data to the mobile terminal 2 (step S22).

Then, the acquisition unit 51 of the mobile terminal 2 acquires the text data from the audio recognition server 3 (step S22).

Then, the communication control unit 52 of the mobile terminal 2 transmits the acquired text data to the AI assistant server 4 (step S23). The interpretation unit 72 of the AI assistant server 4 interprets the action and parameter based on the user-spoken phrase indicated by the received text data. In this example case, since the user only speaks "copy" and "on both faces," the number of copies is unknown (insufficiency state of required parameter).

Among a plurality of parameters, the required parameters can be stored in the storage unit such as the HDD 44 of the AI assistant server 4 in advance. In this case, based on information of the required parameters stored in the storage unit, the interpretation unit 72 of the AI assistant server 4 can determine whether the parameters acquired from the mobile terminal 2 can be used to set all of the required parameters. If one or more of the required parameters have not been set, the interpretation unit 72 can demand or prompt the user to set the required parameter via the mobile terminal 2.

Therefore, the interpretation unit 72 generates an interpretation result adding the Response of "How many copies are printed?" to the Action of "Copy_Parameter_Setting" and the Parameter of "printing face=both faces" (step S24).

Then, the communication control unit 73 of the AI assistant server 4 transmits the interpretation result to the mobile terminal 2 (step S25).

Then, the feedback unit 55 of the mobile terminal 2 outputs an audio of "How many copies are printed" via the speaker 28, and also instructs the touch panel 27 to display the text of "How many copies are printed?" (step S26: input insufficient feedback).

Then, since the input insufficient feedback is output again via the mobile terminal 2, the user speaks, for example, "two copies" (step S27).

Then, the communication control unit 52 of the mobile terminal 2 transmits audio data of "two copies" to the audio recognition server 3 with an audio-to-text conversion request (step S28).

Then, the text conversion unit 62 of the audio recognition server 3 converts the audio data of "two copies" into text data, and transmits the text data to the mobile terminal 2 (step S29).

Then, the acquisition unit 51 of the mobile terminal 2 acquires the text data from the audio recognition server 3 (step S29).

Then, the communication control unit 52 of the mobile terminal 2 transmits the acquired text data to the AI assistant server 4 (step S30). The interpretation unit 72 of the AI assistant server 4 interprets the action and parameter based on the user-spoken phrase indicated by the received text data. In this example case, if the user transmits the audio data of "two copies," the insufficient state of the required parameter of the copy job is solved.

Therefore, the interpretation unit 72 of the AI assistant server 4 generates an interpretation result adding the Parameter of "printing face=both faces, and number of copies=two copies" to the Action of "Copy_Confirm" (step S31).

Then, the communication control unit 73 of the AI assistant server 4 transmits the interpretation result to the mobile terminal 2 (step S32).

Since the insufficient state of the required parameter is solved, and it is ready to start the copying, the feedback unit 55 of the mobile terminal 2 generates, for example, a feedback text of "copying two copies on both faces. OK?" based on the Response included in the interpretation result (step S33). In this stage, the text can be generated by reading out all or a part of the text data stored in the storage unit of the mobile terminal 2, and by combining all or a part of the read-out text data.

The feedback unit 55 can be configured to generate the feedback text not only in step 33 but also in any other steps in the same manner if the interpretation result is acquired from the AI assistant server 4, but if the feedback text information is included in the Response of the interpretation result, the feedback unit 55 is not required to generate the feedback text.

Then, the above described input confirmation feedback is performed (step S34). In response to receiving this input confirmation feedback, the user performs an audio input for instructing a change of setting value and/or a start of copying.

FIG. 14 is an example of a sequence diagram illustrating a flow of an operation when a change of setting value is instructed by an audio (e.g., voice), which is indicated in steps S35 to S42.

In FIG. 14, if the user speaks an instruction of changing the setting value (step S35), the text conversion unit 62 of the audio recognition server 3 generates text data of the changed setting value and transmits the text data of the changed setting value to the AI assistant server 4 via the mobile terminal 2 (steps S36, S37, S38).

Then, the AI assistant server 4 generates an interpretation result including the changed setting value based on the user-spoken phrase indicated by the received text data (step S39), and transmits the interpretation result to the mobile terminal 2 (step S40).

Then, the feedback unit 55 of the mobile terminal 2 generates a feedback text based on the Response included in the interpretation result (step S41), and performs the above described input confirmation feedback, such as "copying with setting of xxx. OK?" to check or confirm whether or not to start the copying with the changed setting value (step S42).

FIG. 14 is a sequence diagram illustrating a flow of an operation when the start of copying is instructed, which is indicated in steps S43 to S50.

That is, if the user responds with "YES" to the above described input confirmation feedback (step S43), audio data of "YES" is converted into text data by the audio recognition server 3, and then the text data is transmitted to the AI assistant server 4 via the mobile terminal 2 (steps S44, S45, S46).

If the AI assistant server 4 recognizes a copy start instruction based on the received text data, the AI assistant server 4 generates an interpretation result adding the Parameter of "printing face=both faces, number of copies=two copies" to the Action of "Copy_Execute" and then transmits the interpretation result to the mobile terminal 2 (steps S47, S48).

Then, the interpretation result conversion unit 53 of the mobile terminal 2 converts the interpretation result into a job instruction of the MFP 1 (step S49), and transmits the job instruction to the MFP 1 (step S50). Thus, the MFP 1 can be controlled for executing the copying using the above described audio input operation. Feedback Information from AI Assistant Server:

The following Table 2 illustrates an example of the interpretation result fed back to the mobile terminal 2 from the AI assistant server 4.

TABLE 2

| Name | Value | Processing by voice actions application |
| --- | --- | --- |
| Action | COPY_PARAMETER_SETTING | Prompting to input job setting value |
| | COPY_CONFIRM | Prompting to confirm job setting value |
| | COPY_EXECUTE | Execution of copy job |

TABLE 2-continued

| Name | Value | Processing by voice actions application |
|---|---|---|
| Parameter | printing face | Change setting value of printing face |
| | number of copies | Change setting value of number of copies |
| | *parameter may include any value designatable as job setting value | |
| Response | Text | Feedback contents specified by text to user |

As illustrated in Table 2, the Action, such as "COPY_PARAMETER_SETTING" for demanding or prompting a user to input a job setting value, "COPY_CONFIRM" for demanding or prompting a user to confirm a job setting value, and "COPY_EXECUTE" for notifying a start of a copy job execution to a user are included in the interpretation result, and fed back to the mobile terminal 2.

The feedback unit 55 can determine the feedback to the user in accordance with the Action, Parameter, and Response included in the interpretation result. In order to determine the content of feedback, the feedback unit 55 can be configured to store information corresponding to Table 2 in the storage unit of the mobile terminal 2 and refer to Table 2. Although a case of copying is described in Table 2, the Action similar to Table 2 can be set for printing, scanning, and facsimile, such as "PARAMETER_SETTING" to demand or prompt a user to input a job setting value, and "CONFIRM" to demand or prompt a user to confirm a job setting value.

Further, the parameter, such as the setting value of printing face indicating both faces or one face, or the setting value of number of copies, or the like, can be included in the interpretation result, and then the interpretation result is fed back to the mobile terminal 2. Further, if the required parameter is insufficient, a message demanding or prompting an input of the insufficient parameter can be included in the interpretation result as the response, and then the interpretation result is fed back to the mobile terminal 2.

Figure 15:
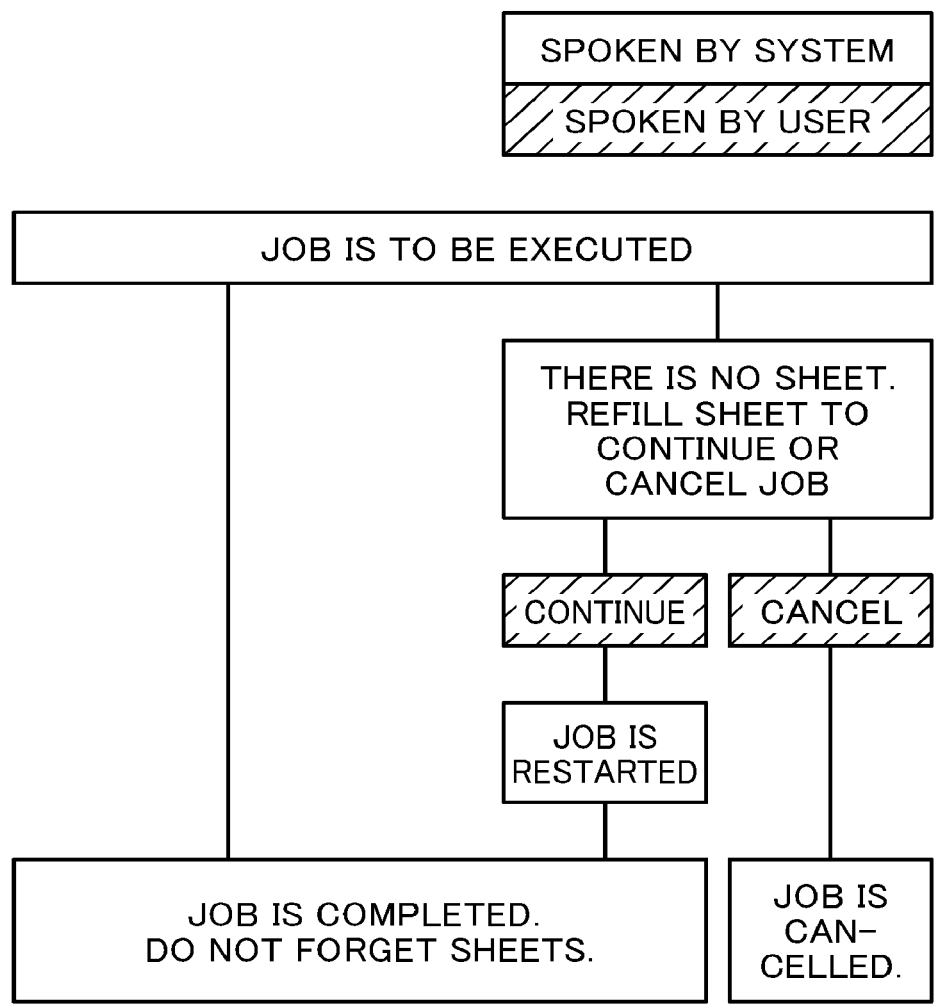
FIG. 15 is a diagram illustrating a flow of an interactive input operation when an error occurs in an audio-based operation system according to the first embodiment.

Interactive Operation when Job is Executed and Error Occurs:

Hereinafter, a description is given of an example of interactive operation when a job is executed and when an error occurs with reference to FIG. 15. FIG. 15 illustrates an example of an interactive operation when a user responds with "YES" to the above described input confirmation feedback such as "job is to be executed. OK?"

At first, if the user responds with "YES" to the above input confirmation feedback such as "job is to be executed. OK?," the job is executed in the MFP 1. If the job is completed without any problems, for example, a completion message (audio and/or text message) such as "Job is completed. Do not forget sheets" is output via the mobile terminal 2.

On the other hand, if an error occurs, such as sheet amount is insufficient, a job confirmation feedback, such as "There is no sheet. Refill sheet to continue or cancel job" is output via the mobile terminal 2.

If the user refills sheets in the MFP 1 and responds with "Continue" to the job confirmation feedback of "There is no sheet. Refill sheet to continue or cancel job," the continuation of job is instructed to the MFP 1 and the job is restarted in the MFP 1.

On the other hand, if the user responds with "Cancel" to the job confirmation feedback of "There is no sheet. Refill sheet to continue or cancel job" to instruct a job cancellation, the MFP 1 is notified with the job cancellation and cancels the job after the error occurred. Then, a confirmation feedback such as "Job is canceled" is output using the audio and/or text via the mobile terminal 2.

Figure 16:
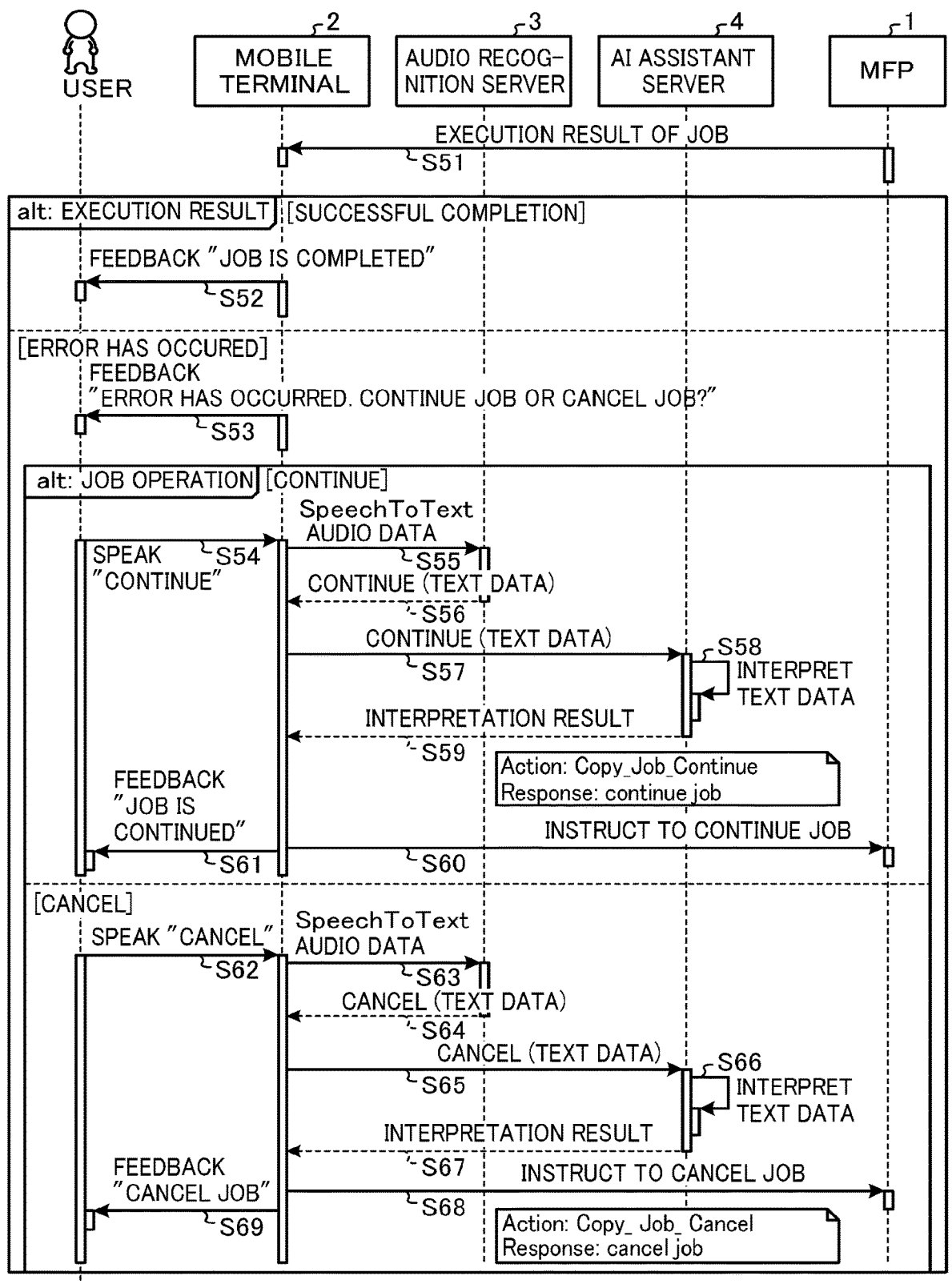
FIG. 16 is a sequence diagram illustrating a flow of an interactive input operation when an error occurs in an audio-based operation system according to the first embodiment.

Flow of Interactive Operation when Job is Executed and Error Occurs:

FIG. 16 is a sequence diagram illustrating a flow of an interactive operation when a job is executed and an error occurs.

When the MFP 1 executes an instructed job, the MFP 1 transmits an execution result indicating that the job has been completed successfully or an execution result indicating that an error has occurred to the mobile terminal 2 (step S51).

If the mobile terminal 2 receives the execution result of a successful completion of job, the feedback unit 55 of the mobile terminal 2 outputs (speaks) an audio message, such as "Job is completed" (step S52).

On the other hand, if the mobile terminal 2 receives the execution result of indicating that the error has occurred, the feedback unit 55 of the mobile terminal 2 outputs (speaks) an audio message of inquiring whether the job is to be continued or not, such as "Error has occurred. Continue job or cancel job?" (step S53).

In FIG. 16, steps S54 to S61 indicate a sequence diagram illustrating a flow of an operation of each unit when the user designates the job continuation.

That is, when the feedback unit 55 of the mobile terminal 2 outputs (speaks) the audio message inquiring "Error has occurred. Continue job or cancel job?" and then the user removes the cause of the error and responds to the inquiring by speaking "Continue" (step S54), audio data of "Continue" is converted into text data, and then the text data is transmitted to the AI assistant server 4 (steps S55, S56, S57).

Then, the AI assistant server 4 sets the Action of "Copy_Job_Continue" and generates an interpretation result setting the response of "continue job," and then transmits the interpretation result to the mobile terminal 2 (steps S58, S59).

Then, the execution instruction unit 54 of the mobile terminal 2 instructs the MFP 1 to continue the job (step S60).

Further, the feedback unit 55 of the mobile terminal 2 outputs (speaks) an input confirmation feedback of "Job is continued" (step S61).

On the other hand, in FIG. 16, steps S62 to S69 indicate a sequence diagram illustrating a flow of operation of each unit when the user designates the job cancellation.

That is, if the feedback unit 55 of the mobile terminal 2 outputs (speaks) the audio message inquiring "Error has occurred. Continue job or cancel job?" and then the user responds with "Cancel job" to the inquiring (step S62), audio data of "Cancel job" is converted into text data, and then the text data is transmitted to the AI assistant server 4 (steps S63, S64, S65).

Then, the AI assistant server 4 sets the Action of "Copy_Job_Cancel" and generates an interpretation result setting the response of "cancel job," and transmits the interpretation result to the mobile terminal 2 (steps S66, S67).

Then, the execution instruction unit 54 of the mobile terminal 2 instructs the MFP 1 to cancel the job (step S68).

Further, the feedback unit 55 of the mobile terminal 2 outputs (speaks) an input confirmation feedback of "cancel job" (step S69).

Figure 17:
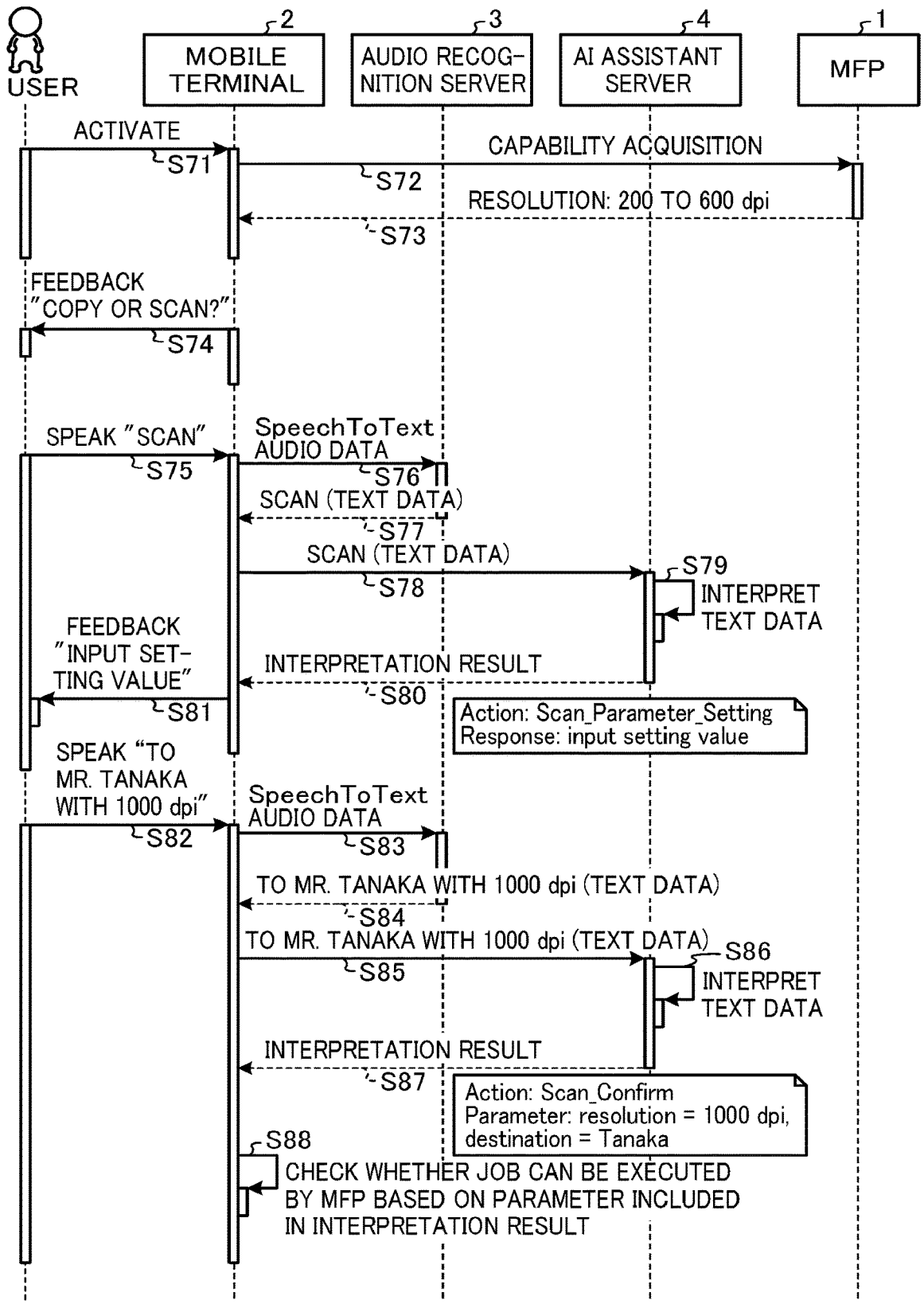
FIG. 17 is a sequence diagram illustrating a flow of a first half of an operation of performing a scanning according to an apparatus capability of an MFP using an interactive input operation in an audio-based operation system according to the first embodiment.
Figure 18:
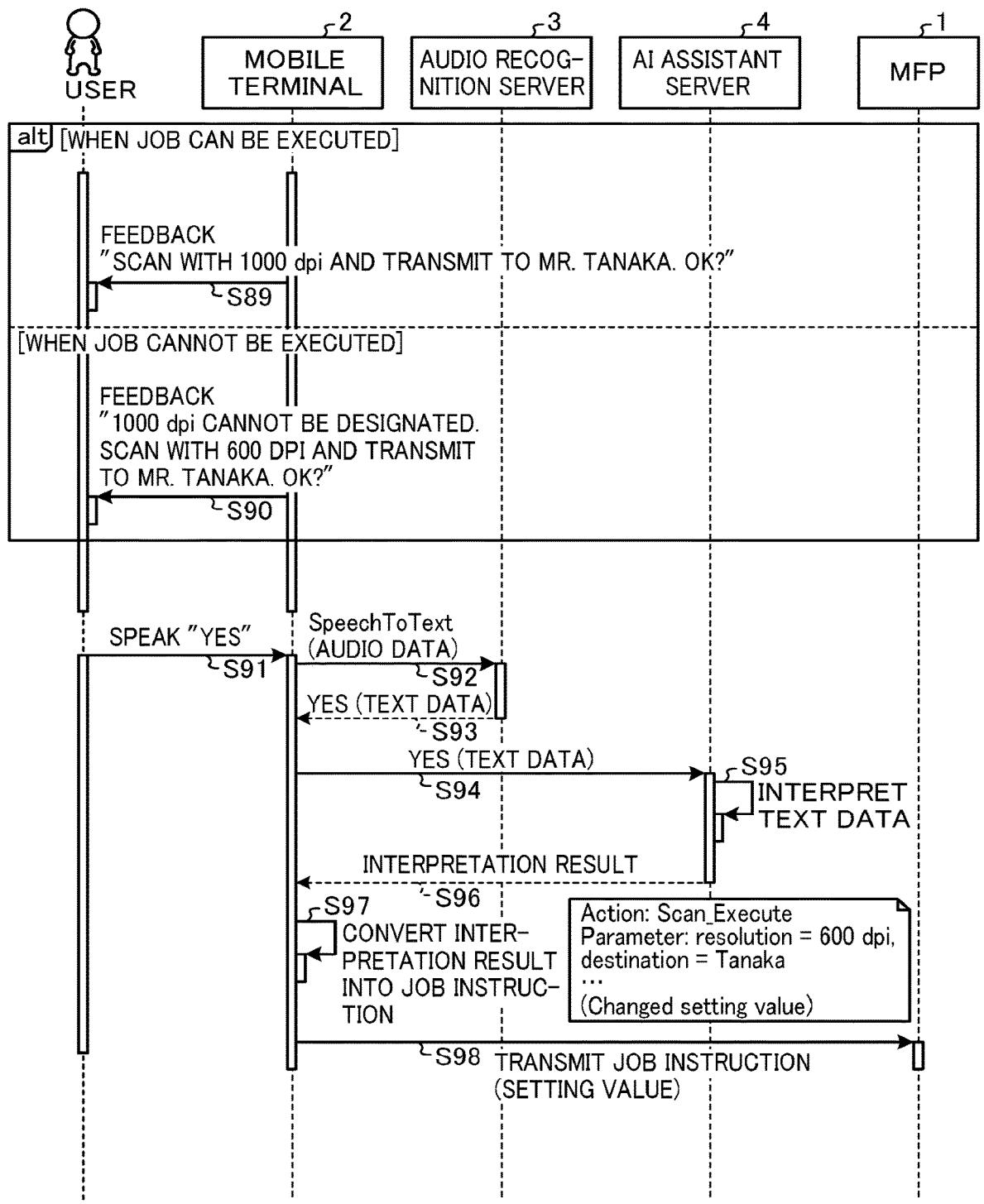
FIG. 18 is a sequence diagram illustrating a flow of a second half of an operation of performing a scanning according to an apparatus capability of an MFP using an interactive input operation in an audio-based operation system according to the first embodiment, continued from FIG. 17.

Adjustment of Parameter Depending on Apparatus Capability of MFP Using Interactive Operation:

In the audio-based operation system according to the first embodiment, the job execution corresponding to an apparatus capability of the MFP 1 is implemented by performing an interactive operation. FIG. 17 is a sequence diagram illustrating a flow of an operation of determining whether the MFP 1 has the apparatus capability required for a job instructed by a user. FIG. 18 is a sequence diagram illustrating a flow of operation when the job can be executed and when the job cannot be executed or performed using the apparatus capability of the MFP 1.

At first, in the sequence diagram of FIG. 17, when a mobile audio processing program of the mobile terminal 2 is activated (step S71), the processing capability acquisition unit 56 of the mobile terminal 2 inquires the MFP 1, for example, a resolution that can be processed by the MFP 1 (step S72: capability acquisition).

In response to receiving this inquiry, the MFP 1 transmits processable resolution such as "resolution: 200 dpi to 600 dpi" to the mobile terminal 2 (step S73), in which "dpi" means "dot per inch". As a result, the resolution that can be processed by the MFP 1 can be recognized at the mobile terminal 2.

The processing capability acquisition unit 56 can acquire information of the processing capability (processing capability information) at a pre-set timing after the communication between the mobile terminal 2 and the MFP 1 has been established. Further, the processing capability information of the MFP 1 can be acquired by executing another program, and then the processing capability acquisition unit 56 can acquire the processing capability information of the MFP 1 from another program indirectly.

Then, the feedback unit 55 of the mobile terminal 2 outputs (speaks) an audio feedback of "copy or scan?" for demanding or prompting the user to enter or input a job instruction (step S74).

If the user speaks "scan" (step S75), audio data of "scan" is converted into text data, and then the text data is transmitted to the AI assistant server 4 (steps S76, S77, S78).

Since the scan instruction alone lacks the required parameter, the interpretation unit 72 transmits an interpretation result setting the Action of "Scan_Parameter_Setting" and the Response of "input setting value" to the mobile terminal 2 (steps S79, S80).

Then, the feedback unit 55 of the mobile terminal 2 outputs (e.g., speaks) an input insufficient feedback of "input setting value" (step S81).

If the user speaks "To Mr. Tanaka with 1000 dpi" to the input insufficient feedback of "input setting value," audio data of "To Mr. Tanaka with 1000 dpi" is converted into text data, and then the text data is transmitted to the AI assistant server 4 (steps S82, S83, S84, S85).

Then, the interpretation unit 72 of the AI assistant server 4 transmits an interpretation result setting the Action of "Scan_Confirm" and the Parameter of "resolution=1000 dpi, destination=Tanaka" to the mobile terminal 2 (steps S86, S87).

Based on the Parameter included in the interpretation result, the execution determination unit 57 of the mobile terminal 2 determines whether the job designated by the user can be executed by the MFP 1 or not (step S88).

If the MFP 1 can perform the image processing using the resolution of 1000 dpi, the feedback unit 55 of the mobile terminal 2 outputs (e.g., speaks) an input confirmation feedback of "scan with 1000 dpi and transmit to Mr. Tanaka. OK?" (step S89) as indicated in FIG. 18.

If the user responds with "YES" to this input confirmation feedback (step S91), audio data of "YES" is converted into text data, and then the text data is transmitted to the AI assistant server 4 (steps S92, S93, S94).

Then, the AI assistant server 4 transmits an interpretation result setting the Action of "Scan_Execute" and the Parameter of "resolution=1000, destination=Tanaka" to the mobile terminal 2 (steps S95, S96).

Then, the interpretation result conversion unit 53 of the mobile terminal 2 converts the interpretation result into a job instruction (step S97).

Then, the communication control unit 52 of the mobile terminal 2 transmits the job instruction to the MFP 1 (step S98).

On the other hand, if the resolution of 600 dpi is the maximum resolution set as the processing capability of the MFP 1, the image processing using the resolution of 1000 dpi designated by the user cannot be executed or performed by the MFP 1. In this case, in step S90, the mobile terminal 2 outputs (e.g., speaks) a confirmation feedback such as "1000 dpi cannot be designated. Scan with 600 dpi and transmit to Mr. Tanaka. OK?"

The execution determination unit 57 of the mobile terminal 2 can select the function or processing capability value that is the closest to the function or processing capability value designated by the user within a range of the processing capability of the MFP 1. For example, if the resolution processable by the MFP 1 is designed in a range of 200 dpi to 600 dpi, the resolution of 600 dpi, which is the closest to 1000 dpi instructed by the user, can be selected. Then, the feedback unit 55 outputs the processing capability value selected by the execution determination unit 57 as a confirmation feedback.

Then, if the user speaks "YES" to this confirmation feedback (step S91), audio data of "YES" is converted into text data, and then the text data is transmitted to the AI assistant server 4 (steps S92, S93, S94).

Then, the AI assistant server 4 transmits an interpretation result setting the Action of "Scan_Execute" and the Parameter of "resolution=600, destination=Tanaka" to the mobile terminal 2 (steps S95, S96).

Then, the interpretation result conversion unit 53 of the mobile terminal 2 converts the interpretation result into a job instruction (step S97).

Then, the communication control unit 52 of the mobile terminal 2 transmits the job instruction to the MFP 1 (step S98). As a result, the MFP 1 can be operated using the audio input operation to execute the job within the processing capability of the MFP 1.

Operation of Transmitting Scanned Image to Transmission Destination Searched from Address Book of Mobile Terminal:

Hereinafter, a description is given of an operation of transmitting a scanned image to a transmission destination retrieved or searched from an address book of the mobile terminal 2. The sequence diagram of FIG. 19 illustrates a flow of a first half of the operation, and the sequence diagram of FIG. 20 illustrates a flow of a second half of the operation.

Figure 19:
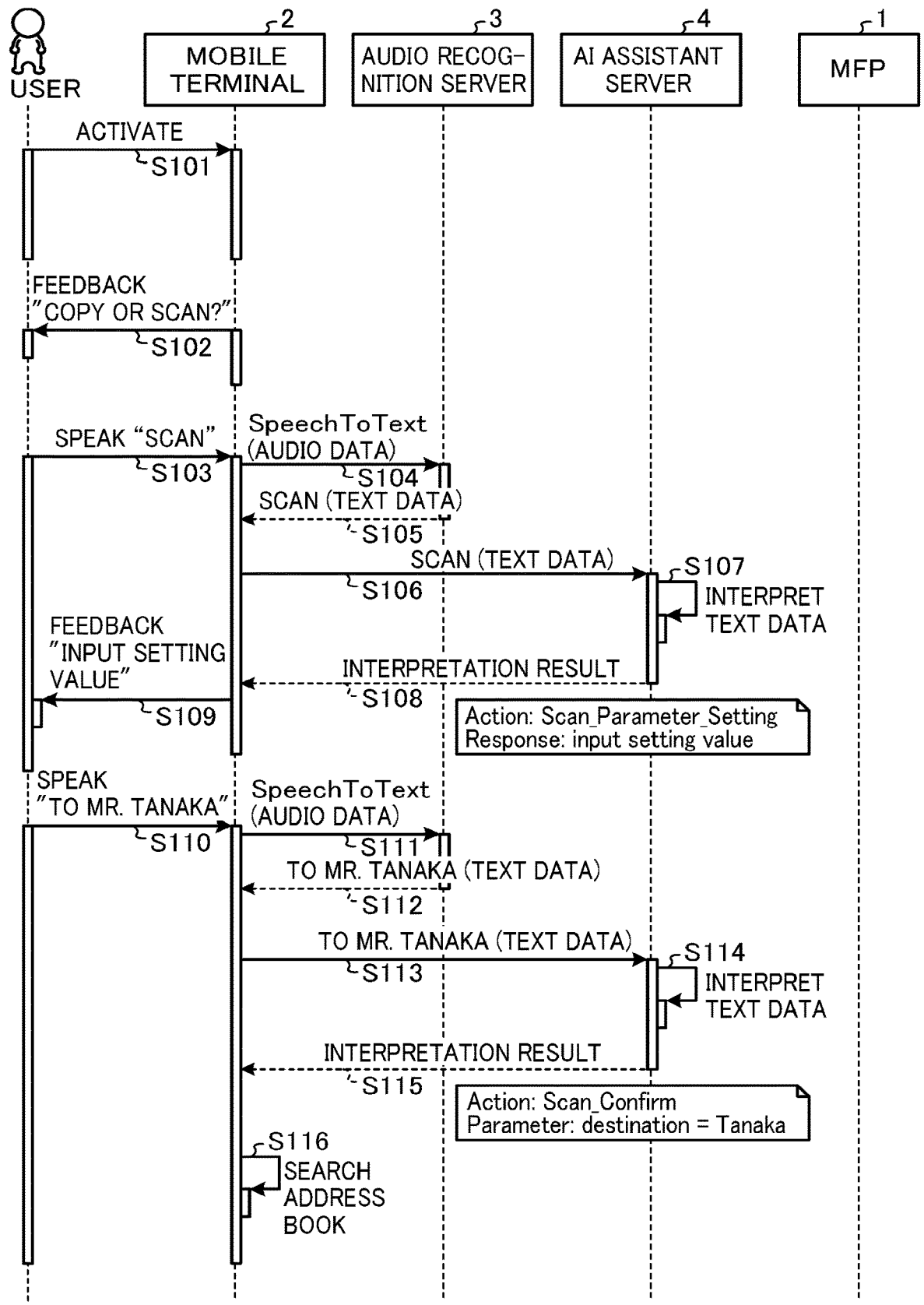
FIG. 19 is a sequence diagram illustrating a flow of a first half of an operation of transmitting a scanned image to a transmission destination retrieved or searched from an address book using an interactive input operation in an audio-based operation system according to the first embodiment.
Figure 20:
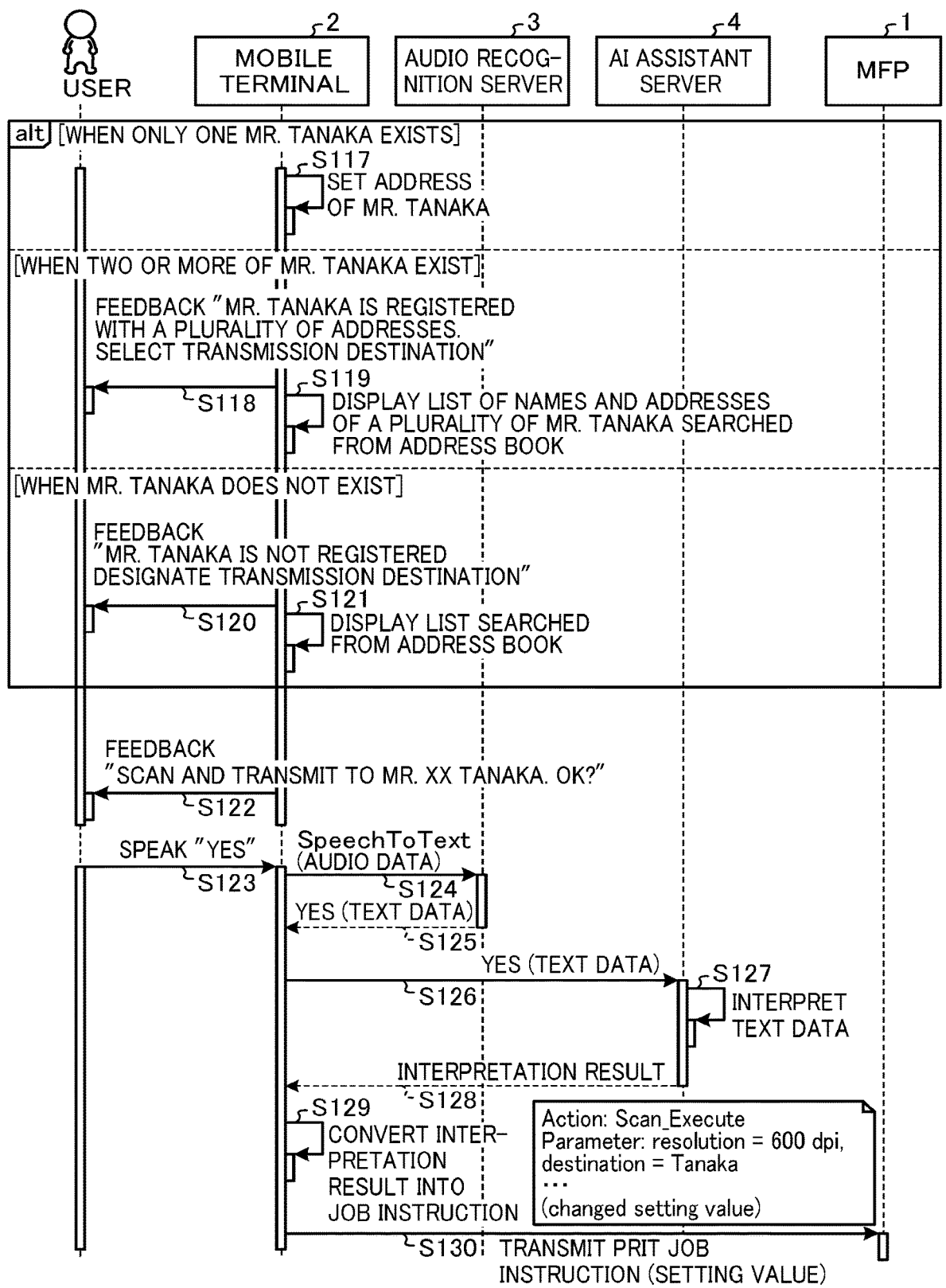
FIG. 20 is a sequence diagram illustrating a flow of a second half of an operation of transmitting a scanned image to a transmission destination retrieved or searched from an address book using an interactive input operation in an audio-based operation system according to the first embodiment, continued from FIG. 19.

In the sequence diagram of FIG. 19, at first, when the mobile audio processing program of the mobile terminal 2 is activated (step S101), the feedback unit 55 outputs, for example, an audio feedback of "copy or scan?" for demanding or prompting a user to enter or input a job instruction (step S102).

If the user speaks "scan" (step S103), audio data of "scan" is converted into text data, and then the text data is transmitted to the AI assistant server 4 (steps S104, S105, S106).

Since the scan instruction alone lacks the required parameter, the interpretation unit 72 transmits an interpretation result setting the Action of "Scan_Parameter_Setting" and the Response of "input setting value" to the mobile terminal 2 (steps S107, S108).

Then, the feedback unit 55 of the mobile terminal 2 outputs (e.g., speaks) an input insufficient feedback of "input setting value" (step S109).

Then, if the user speaks "To Mr. Tanaka" to this input insufficient feedback of "input setting value" (step S110), audio data of "To Mr. Tanaka" is converted into text data, and then the text data is transmitted to the AI assistant server 4 (steps S111, S112, S113).

Then, the interpretation unit 72 of the AI assistant server 4 transmits an interpretation result setting the Action of "Scan_Confirm" and the Parameter of "destination=Tanaka" to the mobile terminal 2 (steps S114, S115).

Then, the search unit 58 of the mobile terminal 2 searches an e-mail address of Mr. Tanaka from a storage area of the address book stored in the RAM 22 based on the parameter included in the interpretation result (step S116).

The search target (e.g., search area) to be searched may not be limited to the RAM 22, but can be a server connected to the mobile terminal 2 via the network, or an inquiry can be transmitted to the MFP 1 to inquire whether or not an appropriate e-mail address exists in the MFP 1.

If only one Mr. Tanaka is recorded in the storage area of the address book, in step S117 in FIG. 20, the communication control unit 52 of the mobile terminal 2 creates an e-mail by setting the e-mail address of Mr. Tanaka stored in the storage area of the address book as a transmission destination. Then, the e-mail is transmitted by attaching the scanned image. As a result, the scanned image is transmitted to Mr. Tanaka.

If two or more of Mr. Tanaka are recorded in the storage area of the address book, that is, if a plurality of transmission destinations including information of "Tanaka" identifying the transmission destination exist, the feedback unit 55 of the mobile terminal 2 outputs (e.g., speaks) an input insufficient feedback of "Mr. Tanaka is registered with a plurality of addresses. Select transmission destination" (step S118).

Then, the search unit 58 of the mobile terminal 2 displays, on the touch panel 27, a list of names and e-mail addresses related to the plurality of Mr. Tanaka retrieved or searched from the storage area of the address book (step S119).

The user can select the desired Mr. Tanaka from the list. Then, the communication control unit 52 of the mobile terminal 2 creates an e-mail setting the e-mail address of Mr. Tanaka selected by the user as a transmission destination. Then, the e-mail is transmitted by attaching the scanned image. As a result, the scanned image is transmitted to Mr. Tanaka, corresponding to the transmission destination desired by the user.

If Mr. Tanaka is not recorded in the storage area of the address book, the feedback unit 55 of the mobile terminal 2 outputs (e.g., speaks) an input insufficient feedback of "Mr. Tanaka is not registered. Designate transmission destination" (step S120).

Then, the search unit 58 of the mobile terminal 2 displays, for example, a list of names and e-mail addresses retrieved or searched from the storage area of the address book, for example, in the alphabetical order, on the touch panel 27 (step S121).

Further, by displaying a keyboard on the touch panel 27, the user can manually input the e-mail address corresponding to the transmission destination using the keyboard, with which the name and the e-mail address can be acquired. Further, the acquired name and e-mail address can be registered in the address book.

The user can select a desired transmission destination from the list. Then, the communication control unit 52 of the mobile terminal 2 creates an e-mail address of the transmission destination selected by the user. Then, the e-mail is transmitted by attaching the scanned image. As a result, the scanned image is transmitted to the transmission destination desired by the user.

That is, when Mr. Tanaka or another person (i.e., transmission destination) who are to be transmitted with the scan image is selected, the feedback unit 55 of the mobile terminal 2 outputs (e.g., speaks), for example, a confirmation feedback of "Scan and transmit to Mr. xxxxx Tanaka. OK?" (step S122).

If the user speaks "YES" to this confirmation feedback (step S123), audio data of "YES" is converted into text data, and then the text data is transmitted to the AI assistant server 4 (steps S124, S125, S126).

Then, the AI assistant server 4 transmits an interpretation result setting the Action of "Scan_Execute" and the Parameter of "resolution=600, destination=Tanaka" to the mobile terminal 2 (steps S127, S128).

Then, the interpretation result conversion unit 53 of the mobile terminal 2 converts the interpretation result into a job instruction (step S129).

Then, the communication control unit 52 of the mobile terminal 2 transmits the job instruction to the MFP 1 together with the transmission destination information such as the name and the e-mail address used as the transmission destination (step S130). As a result, the scanned image is transmitted to the transmission destination desired by the user.

Operation of Printing File Searched from Memory of Mobile Terminal:

Hereinafter, a description is given of an operation of printing a file retrieved or searched from a memory such as the RAM 22 of the mobile terminal 2. The sequence diagram of FIG. 21 illustrates a flow of a first half of the operation, and the sequence diagram of FIG. 22 illustrates a flow of a second half of the operation.

Figure 21:
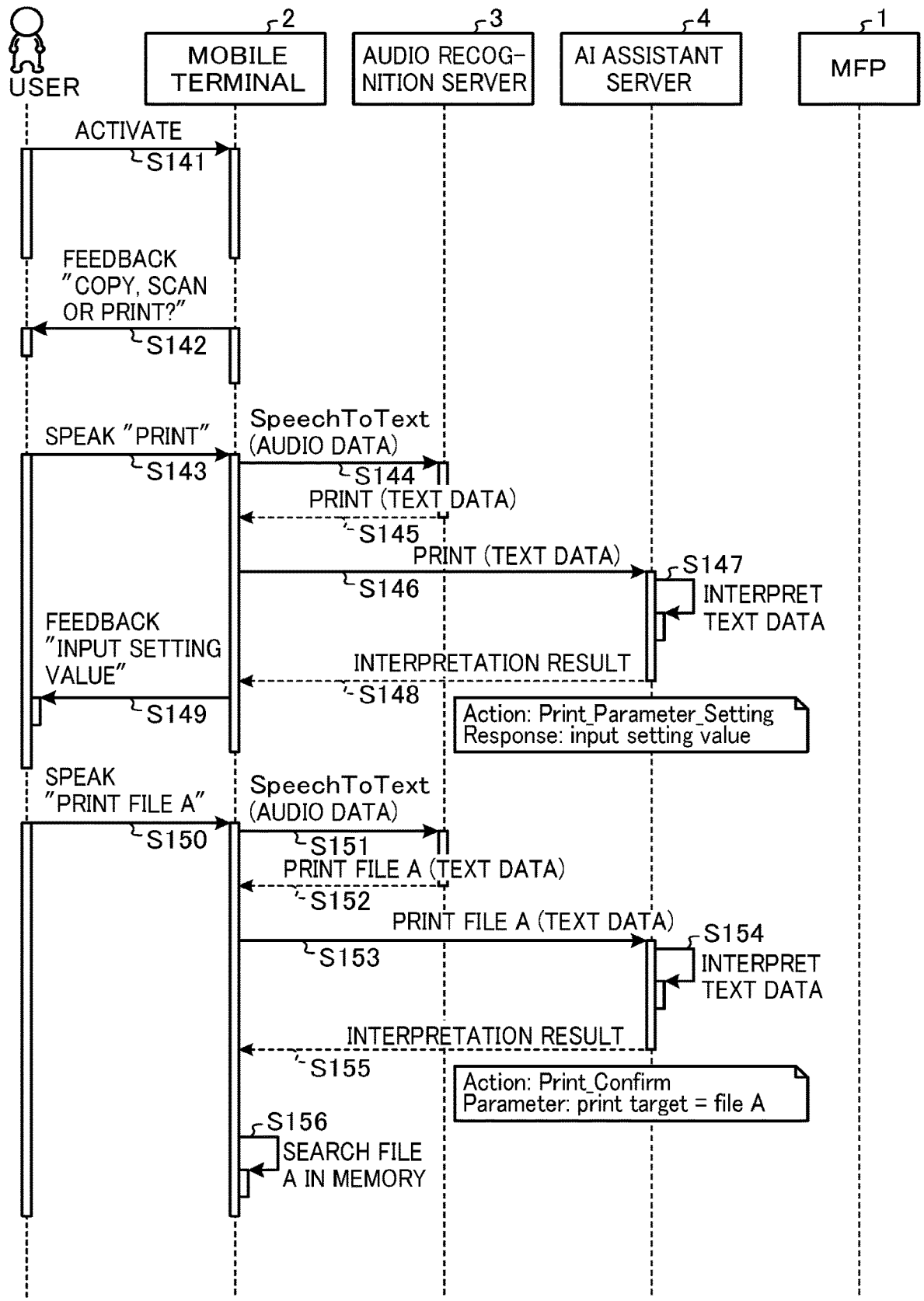
FIG. 21 is a sequence diagram illustrating a flow of a first half of an operation of printing a file designated from a memory using an interactive input operation in an audio-based operation system according to the first embodiment.
Figure 22:
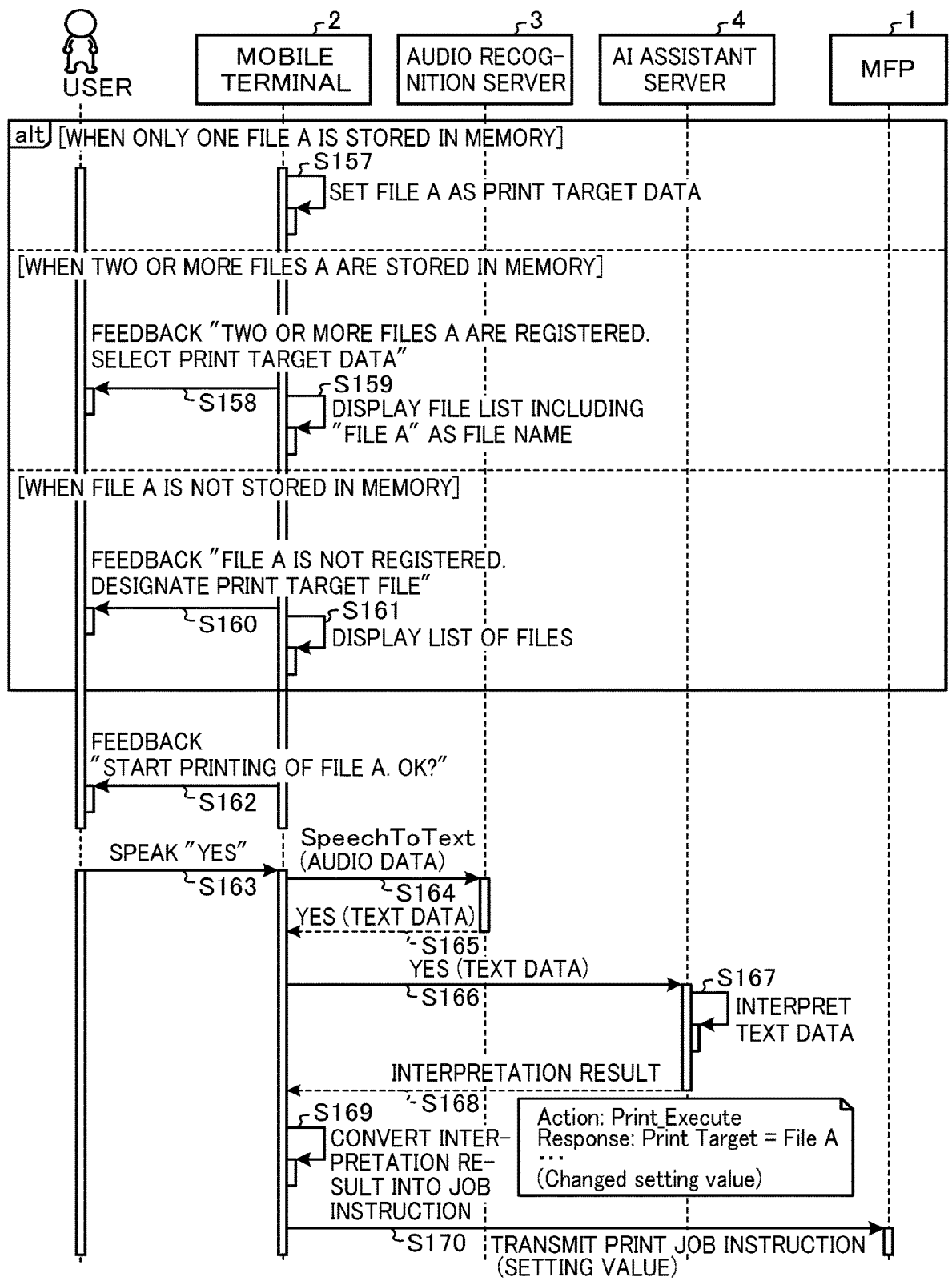
FIG. 22 is a sequence diagram illustrating a flow of a second half of an operation of printing a file designated from a memory using an interactive input operation in an audio-based operation system according to the first embodiment, continued from FIG. 21.

In the sequence diagram of FIG. 21, when the mobile audio processing program of the mobile terminal 2 is activated (step S141), the feedback unit 55 outputs an audio feedback, such as "copy, scan, or print?" for demanding or prompting the user to enter or input a job instruction (step S142).

If the user speaks "print" (step S143), audio data of "print" is converted into text data, and then the text data is transmitted to the AI assistant server 4 (steps S144, S145, S146).

Since the "print" instruction alone lacks the required parameter, the interpretation unit 72 transmits an interpretation result setting the Action of "Print_Parameter_Setting" and the Response of "input setting value" to the mobile terminal 2 (steps S147, S148).

Then, the feedback unit 55 of the mobile terminal 2 outputs (e.g., speaks) an input insufficient feedback of "input setting value" (step S149).

Then, if the user speaks "print file A" to this input insufficient feedback (step S150), audio data of "print file A" is converted into text data, and then the text data is transmitted to the AI assistant server 4 (steps S151, S152, S153).

Then, the interpretation unit 72 of the AI assistant server 4 transmits an interpretation result setting the Action of "Print_Confirm" and the Parameter of "print target=file A" to the mobile terminal 2 (steps S154, S155).

Then, the search unit 58 of the mobile terminal 2 searches the file A in the memory, such as the RAM 22, based on the parameter included in the interpretation result (step S156).

The search target (e.g., search area) to be searched may not be limited to the RAM 22, but can be a server connected to the mobile terminal 2 via the network, or an inquiry whether or not an appropriate e-mail address exists in the MFP 1 can be transmitted to the MFP 1.

If only one file A is stored in the memory, in step S157 in FIG. 22, the communication control unit 52 of the mobile terminal 2 sets the file A as print target data or print target information. Then, the print target data of the file A is transmitted to the MFP 1 and printed.

If two or more files A are stored in the memory, the feedback unit 55 of the mobile terminal 2 outputs (e.g., speaks) an input insufficient feedback of "two or more files A are registered. Select print target data" (step S158).

Then, the search unit 58 of the mobile terminal 2 displays a file list including "file A" as the file name, retrieved or searched from the memory, on the touch panel 27 (step S159). Then, the user selects a desired file A from the file list. To be described later, the communication control unit 52 of the mobile terminal 2 transmits the file A selected by the user to the MFP 1 with a print request.

If the file A is not stored in the memory, the feedback unit 55 of the mobile terminal 2 outputs (e.g., speaks) an insufficient feedback of "file A is not registered in memory designate print target file" (step S160).

Then, the search unit 58 of the mobile terminal 2 display a list of files retrieved or searched from the memory on the touch panel 27 (step S161). Then, the user selects a desired file from the file list. The communication control unit 52 of the mobile terminal 2 transmits the file selected by the user to the MFP 1 with a print request.

That is, when the file A or another file to be printed is selected, the feedback unit 55 of the mobile terminal 2 outputs (e.g., speaks), for example, a confirmation feedback of "start printing of file A. OK?" (step S162).

If the user speaks "YES" to this confirmation feedback (step S163), audio data of "YES" is converted into text data, and then the text data is transmitted to the AI assistant server 4 (steps S164, S165, S166).

Then, the AI assistant server 4 transmits an interpretation result setting the Action of "Print_Execute" and the Response of "print target=file A" to the mobile terminal 2 (steps S167, S168).

Then, the interpretation result conversion unit 53 of the mobile terminal 2 converts the interpretation result into a job instruction (step S169).

Then, the communication control unit 52 of the mobile terminal 2 transmits the job instruction to the MFP 1 together with the file selected by the user (step S170). In this way, the file selected by the user can be printed by the MFP 1.

As above described, the audio-based operation system of the first embodiment installs the operation audio processing program on the mobile terminal 2 as a platform application program, and the platform application program is used to relay the communication between the MFP 1, the audio recognition server 3, and the AI assistant server 4. When the user speaks to the microphone 29 provided to the mobile terminal 2, the platform application program is executed to analyze the user-spoken content and operates the MFP 1 to perform the operation instructed by the user (audio input operation).

With this configuration, a complicated operation can be instructed using the audio input without operating a graphical user interface (GUI) displayed on the touch panel 27 or the like. Therefore, even if a user is familiar with the operation using graphical user interfaces (GUIs) on the touch panel, the input operation can be performed further quickly and easily. Further, even if some persons, such as elder persons or other users, inexperienced in the operation using the GUI on the touch panel are to perform the input operation, the operation desired by the user, such as complicated network setting, advanced job setting and/or installing of a new application can be quickly and easily performed using the interactive operation assistance or support of the above described system.

Further, since the user intention is analyzed based on the text data of the user-spoken content, the AI assistant server 4 can determine the processing content based on the user-spoken content.

Second Embodiment

Figure 23:
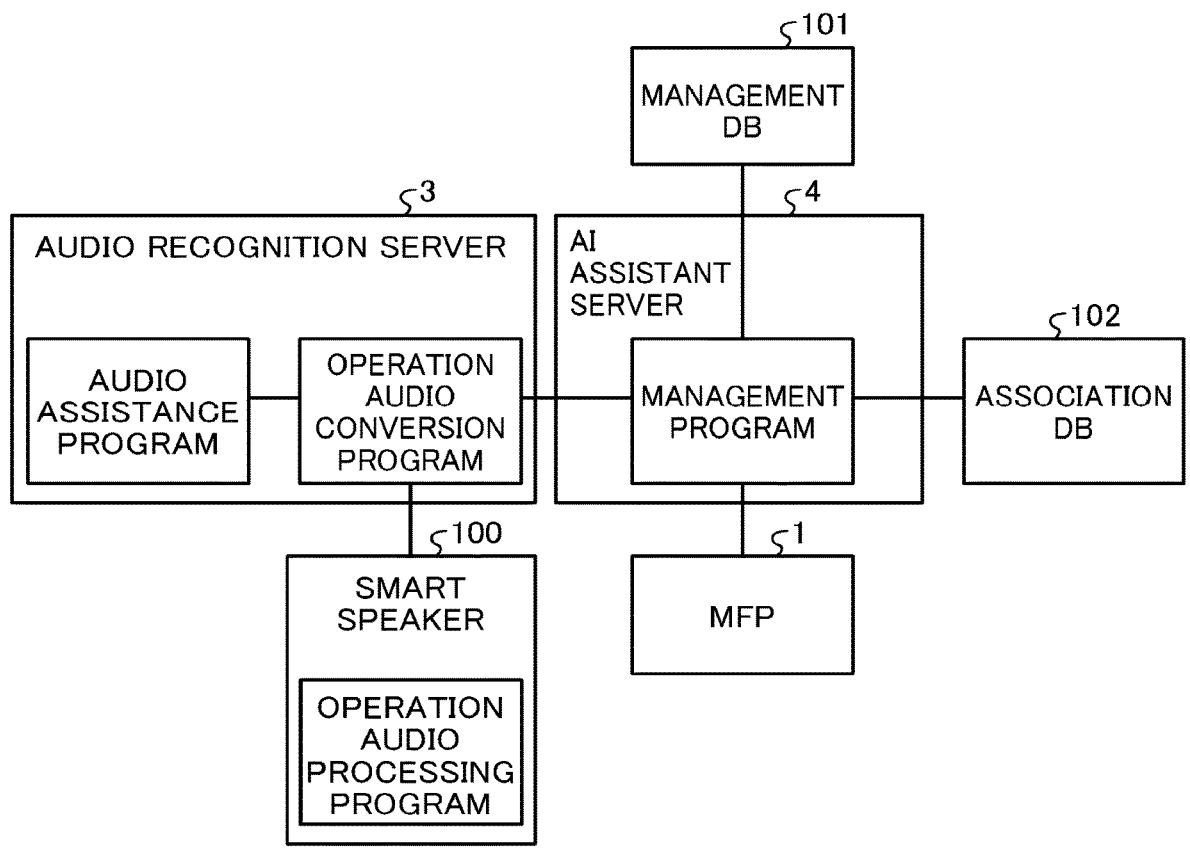
FIG. 23 is an example system configuration of an audio-based operation system according to a second embodiment of the present disclosure.

Hereinafter, a description is given of an audio-based operation system according to a second embodiment.
System Configuration:

FIG. 23 illustrates an example system configuration of an audio-based operation system according to the second embodiment. As illustrated in FIG. 23, the audio-based operation system of the second embodiment includes, for example, one or more MFPs 1, one or more smart speakers 100 (or smart phones, tablet terminals, etc.), one or more audio recognition servers 3, and one or more AI assistant servers 4. The MFP 1, the smart speaker 100 (an example of information processing apparatus), the audio recognition server 3, and the AI assistant server 4 are connected to each other via a network 5, such as local area network (LAN). With this configuration, the audio recognition server 3 and the AI assistant server 4 can provide a cloud service.

Further, as the target apparatus, other electronic devices such as an electronic blackboard or a projector can be provided in addition to the MFP 1 or in place of the MFP 1.

As illustrated in FIG. 23, the AI assistant server 4 is provided with, for example, a management database (DB) 101 and an association database (DB) 102. The management DB 101 stores content (data), such as text data, image data, audio data, or the like providable by the AI assistant server 4 as the cloud service. Further, the association DB 102 stores, for example, device identification (ID) identifying each smart speaker 100 and apparatus identification (ID) identifying the MFP 1 associated with each smart speaker 100, in association with each other. That is, the association DB stores the device ID identifying each smart speaker 100 and the apparatus ID identifying the MFP 1 in association with each other so that the MFP 1, which can be operated using the audio-based operation using each smart speaker 100, can be identified. The device ID identifying each smart speaker 100 is used as first identification information, and the apparatus ID identifying the MFP 1 is used as second identification information in this description.

As to the management DB 101 and the association DB 102, a storage unit such as an HDD on the network 5, usable by the cloud service, can be used. Further, as to the management DB 101 and the association DB 102, one or both of the management DB 101 and the association DB 102 can be stored in another server accessible by the cloud service via the network 5.

The smart speaker 100 includes a microphone (corresponding to the microphone 29 in FIG. 3) to receive an audio input performed by a user, which is to be used for the audio-based operation of the MFP 1. Further, the smart speaker 100 includes a speaker (corresponding to the speaker 28 in FIG. 3) used for performing an audio feedback in response to receiving an operation of the user to the smart speaker 100. Further, the smart speaker 100 performs data communication with the audio recognition server 3 and the AI assistant server 4, which provide the cloud service, to communicate, for example, audio data, text data, image data, or the like.

The audio recognition server 3 analyzes audio data received from the smart speaker 100, and converts the audio data into text data. Further, the audio recognition server 3 interprets a user intention based on text data and dictionary information registered in advance, and transmits an interpretation result to the AI assistant server 4.

The AI assistant server 4 converts the interpretation result received from the audio recognition server 3 into a job execution instruction using a format interpretable by the MFP 1, and transmits the job execution instruction to the MFP 1. The MFP 1 executes the job execution instruction transmitted from the cloud service.

Hardware Configuration of MFP:

The MFP 1 includes a plurality of image processing functions, such as a printer function and a scanner function. That is, as described with reference to FIG. 2, the MFP 1 includes the controller 7, the communication unit 15, the operation unit 16, the scanner engine 17, and the printer engine 18.

The controller 7 includes the CPU 10, the ASIC 11, the memory 12, the hard disk drive (HDD) 13, and the timer 14. The CPU 10 to the timer 14 are connected to each other via the bus line to enable communication with each other.

The communication unit 15 is connected to the network 5, and, to be described later, acquires a job execution instruction, such as a scan instruction or a print instruction, input by audio using the mobile terminal 2.

The operation unit 16 is, for example, a touch panel, in which a liquid crystal display unit (LCD) and a touch sensor are integrally formed. When an operator performs an execution instruction of a desired operation using the operation unit 16, the operator can designate the desired operation by performing a touch operation on one or more operation buttons (software keys) displayed by using the operation unit 16.

The scanner engine 17 controls the scanner unit to optically read document. The printer engine 18 controls the image writing unit to print an image on, for example, a transfer sheet. The CPU 10 controls the image forming apparatus entirely. The ASIC 11 is a large-scale integrated circuit (LSI), and performs various image processing necessary for images to be processed by the scanner engine 17 and the printer engine 18. The scanner engine 17 and the printer engine 18, which are engines for executing the job execution instruction acquired from the mobile terminal 2, correspond to the functional units.

The memory 12 stores various applications to be executed by the CPU 10 and various data to be used when executing various applications. The HDD 13 stores image data, various programs, font data, various files, or the like. A solid state drive (SSD) can be provided in place of the HDD 13 or along with the HDD 13.

Hardware Configuration of Smart Speaker:

Similar to the mobile terminal 2 illustrated in FIG. 3, the smart speaker 100 includes, for example, the CPU 21, the RAM 22, the ROM 23, the interface (I/F) 24, and the communication unit 25 connected with each other via the bus line 26.

The ROM 23 stores the operation audio processing program. By executing the operation audio processing program, the CPU 21 acquires audio information from the microphone 29 and transmits the audio information to the cloud service. Further, the CPU 21 controls the touch panel 27 to display data (e.g., audio data, text data, image data) acquired from the cloud service, and controls an audio output via the speaker 28.

The I/F 24 is connected to the touch panel 27, the speaker 28, and the microphone 29. The microphone 29 collects (acquires) an input audio indicating a job execution instruction to the MFP 1 in addition to communication audio, such as voice. The input audio is transmitted to the cloud service via the communication unit 25.

Hardware Configuration of Cloud Service:

As illustrated in FIG. 4 (and FIG. 5), the audio recognition server 3 (and the AI assistant server 4), which configure the cloud service, include, for example, the CPU 31 (41), the RAM 32 (42), the ROM 33 (43), the HDD 34 (44), the interface (I/F) 35 (45), and the communication unit 36 (46) connected to each other via the bus line 37 (47).

The I/F 35 is connected to the display unit 38 and the operation unit 39. The HDD 34 stores the operation audio conversion program to convert audio data into text data, determine whether the text data matches pre-set dictionary information, and, if the text data matches the pre-set dictionary information, to convert the text data into an intent indicating a user intention and one or more parameters indicating variables of job conditions. Further, the HDD 34 stores an audio assistant program for storing the dictionary information, and a management program. The management program converts the intent and parameter into a job execution instruction with a format interpretable by the MFP 1, and transmits the job execution instruction to the registered MFP 1.

The CPU 31 executes these programs. The operation audio conversion program, the audio assistant program, and the management program can be executed by one server, or can be executed by different servers, respectively. Further, these programs can be executed by cooperating a plurality of servers.

Figure 24:
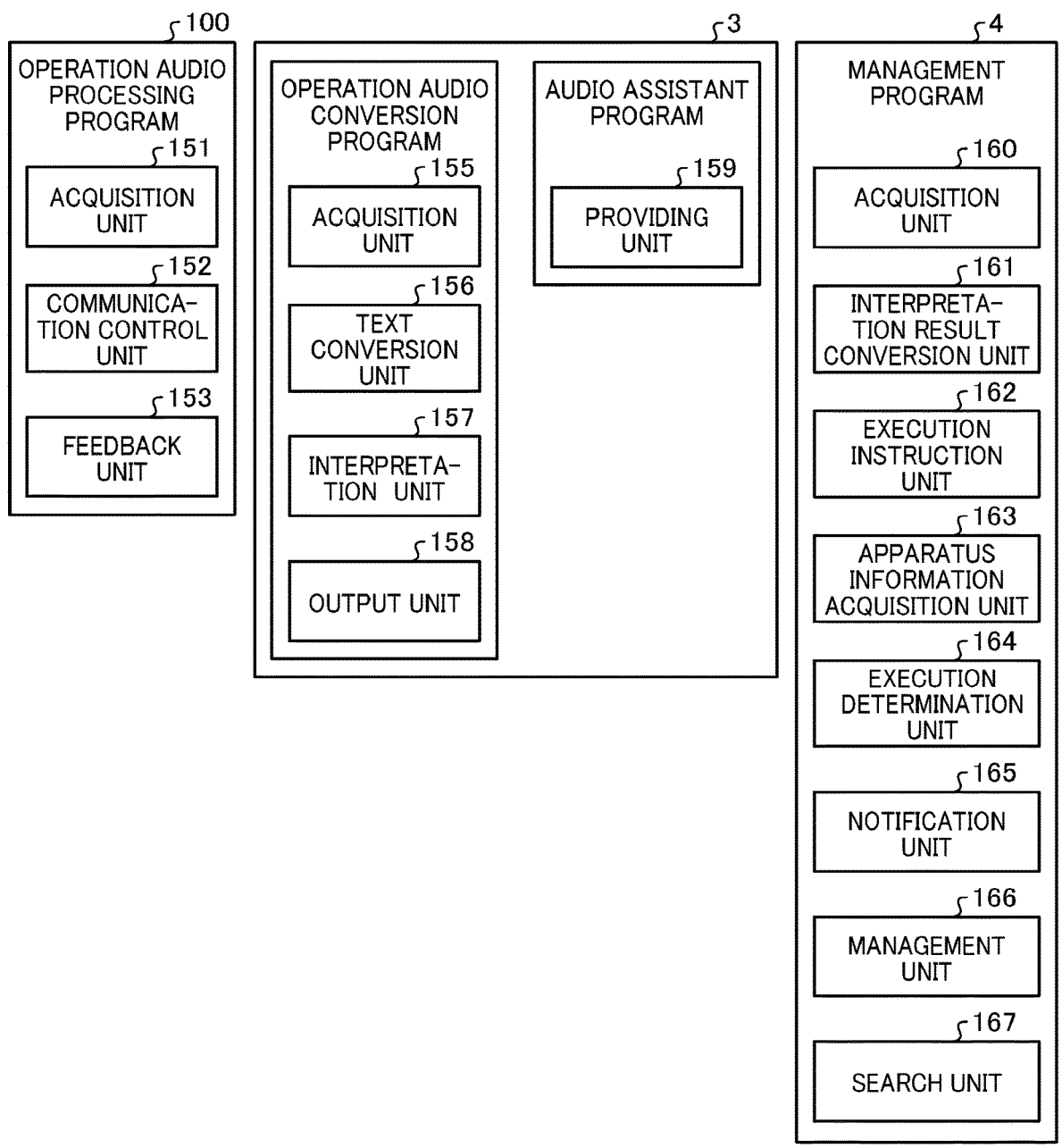
FIG. 24 is a diagram illustrating functions implemented by a smart speaker by executing an operation audio processing program, functions implemented by an audio recognition server by executing an operation audio conversion program and an audio assistant program, and functions implemented by an AI assistant server by executing a management program according to the second embodiment.

Function Implementable by Program:

FIG. 24 is an example of a functional block diagram illustrating each functional unit implemented by the CPU 21 of the smart speaker 100 by executing the operation audio processing program. FIG. 24 is also an example of a functional block diagram illustrating each functional unit implemented by the CPU 31 of the audio recognition server 3 by executing the operation audio conversion program and the audio assistant program. FIG. 24 is also an example of a functional block diagram illustrating each functional unit implemented by the CPU 41 of the AI assistant server 4 by executing the management program.

Function of Operation Audio Processing Program:

The CPU 21 of the smart speaker 100 executes the operation audio processing program stored in a storage such as the ROM 23 to implement functions, such as an acquisition unit 151, a communication control unit 152, and a feedback unit 153.

The acquisition unit 51 acquires an audio instruction (i.e., audio information) input by a user, which is to be used for the audio-based operation of the MFP 1, via the microphone 29. Further, the acquisition unit 151 can obtain or acquire a user operation and instruction via a touch panel or a physical switch.

The communication control unit 152 controls communication between the smart speaker 100 and the cloud service. The communication control unit 152 transmits information acquired by the acquisition unit 151 to the cloud service, and acquires text data, image data, and audio data from the cloud service. Further, when transmitting information acquired by the acquisition unit 151 to the cloud service, the communication control unit 152 transmits the device ID identifying the smart speaker 100.

In order to implement an interactive audio input operation, for example, the feedback unit 153 feeds back audio information that demands or prompts an operation of inputting or entering the missing data (insufficient data), and feeds back audio information that is used to confirm the input operation. Further, the feedback unit 153 can provide text and/or image as the feedback to a user, using the display function of the touch panel 27.

In this example case, the acquisition unit 151 to the feedback unit 153 are implemented by the software, but a part or all of the acquisition unit 151 to the feedback unit 153 can be implemented by hardware such as integrated circuit (IC). Further, the acquisition unit 151 to the feedback unit 153 can be implemented by the operation audio processing program alone, or a part of the acquisition unit 151 to the feedback unit 153 can be implemented by another program, or the acquisition unit 151 to the feedback unit 153 can be implemented indirectly by another program.

Function of Operation Audio Conversion Program:

The CPU 31 of the audio recognition server 3 executes the operation audio conversion program stored in the HDD 34 to implement functions, such as an acquisition unit 155, a text conversion unit 156, an interpretation unit 157, and an output unit 158.

The acquisition unit 155 acquires audio data input by a user, which is to be transmitted from the smart speaker 100. Further, the acquisition unit 155 can also acquire a user operation on a touch panel, a button, a switch, or the like of the smart speaker 100.

The text conversion unit 156 converts the audio data input by the user into text data.

The interpretation unit 157 interprets a user instruction based on the text data. Specifically, based on the dictionary information provided by the audio assistant program, the interpretation unit 157 checks or confirms whether a phase (e.g., word, term) included in the text data matches the dictionary information. If the phase (e.g., word, term) included in the text data matches the dictionary information, the interpretation unit 157 converts the text data into an intent indicating a user intention, and one or more parameters indicating variables of job conditions. The interpretation unit 157 transmits the intent and parameter to the management program together with the device ID of the smart speaker 100 identifying the smart speaker 100 that is used to acquire the audio data.

The output unit 158 controls the communication unit 36 to transmit data, such as text data, audio data, image data, or the like to the smart speaker 100.

In this example case, the acquisition unit 155 to the output unit 158 are implemented by the software, but a part or all of the acquisition unit 155 to the output unit 158 can be implemented by hardware such as integrated circuit (IC).

Further, the acquisition unit 155 to the output unit 158 can be implemented by the operation audio conversion program alone, or a part of the acquisition unit 155 to the output unit 158 can be implemented by another program, or the acquisition unit 155 to the output unit 158 can be implemented indirectly by another program. For example, a part or all of the functions of the interpretation unit 157 of the operation audio conversion program can be executed using the audio assistant program. In this case, for example, the confirmation of whether or not the phase (e.g., word, term) included in the text data matches the dictionary information can be performed using the audio assistant program, and if the phase (e.g., word, term) included in the text data matches the dictionary information, the conversion of the text data into the intent indicating the user intention and the parameter indicating variables of job conditions can be performed using the audio assistant program, and then the interpretation unit 157 can acquire the intent and the parameters from the audio assistant program.

Function of Audio Assistant Program:

The CPU 31 of the audio recognition server 3 executes the audio assistant program stored in the HDD 34 to implement a providing unit 159. The providing unit 159 manages or controls the dictionary information, defining the relationship between the text data, intent and parameters in advance, stored in the HDD 34, and provides the dictionary information to the operation audio conversion program. Further, an operation instruction input by a user can be interpreted based on the text data. Specifically, the text data is acquired from the operation audio conversion program, and then it is determined whether a phase (e.g., word, term) included in the text data matches the dictionary information, and if the phase (e.g., word, term) included in the text data matches the dictionary information, the text data is converted into the intent and parameter. Thereafter, the intent and the parameter are provided to the operation audio conversion program.

In this example case, the providing unit 159 is implemented by the software, but a part or all of the providing unit 159 can be implemented by hardware such as integrated circuit (IC) as similar to other programs described above.

Function of Management Program:

The CPU 41 of the AI assistant server 4 executes the management program stored in the HDD 44 to implement functions, such as an acquisition unit 160, an interpretation result conversion unit 161, an execution instruction unit 162, an apparatus information acquisition unit 163, an execution determination unit 164, a notification unit 165, a management unit 166, and a search unit 167.

The acquisition unit 160 acquires the intent, the parameter and the device ID of the smart speaker 100, which are transmitted from the audio recognition server 3. The interpretation result conversion unit 161 converts the interpretation result such as the intent and parameter, converted by the operation audio conversion program, into a job execution instruction using a format interpretable by the MFP 1. The execution instruction unit 162 transmits the job execution instruction to the MFP 1 to instruct the MFP 1 to execute the job.

The execution instruction unit 162 refers to the association DB 102 and transmits the job execution instruction to the MFP 1 associated with the smart speaker 100. That is, the execution instruction unit 162 acquires the device ID identifying the smart speaker 100 used by the user together with the intent and parameter, searches the MFP 1 associated with the acquired device ID identifying the smart speaker 100 from the association DB 102, and transmits the job execution instruction to the searched MFP 1.

The apparatus information acquisition unit 163 acquires, from the MFP 1, apparatus information indicating processing capability, such as the maximum number of pixels processable by the MFP 1. Further, the apparatus information acquisition unit 163 stores and manages the apparatus information acquired from a plurality of target apparatuses, such as the MFP 1, in a storage unit such as an HDD, in association with identification information such as the device ID identifying each target apparatus.

Further, the apparatus information acquisition unit 163 acquires apparatus state information including connection state information indicating whether a communication connection with the MFP 1 has been established, power state information such as ON and OFF state of the power supply of the MFP 1 or sleep mode of the power supply of the MFP 1, information on existence/non-existence of error and type of error, residual state information of consumable such as sheet and toner, user login state information, and access right information indicating one or more functions that are allowed to be used by a log-in user, or the like.

The execution determination unit 57 compares the processing capability of the MFP 1 indicated by the apparatus information with a job designated by a user (i.e., intent and parameter generated by the operation audio conversion program) to determine whether the job designated by the user can be executed by using the processing capability of the MFP 1. If the execution determination unit 57 determines that the job designated by the user is executable by using the processing capability of the MFP 1, the execution determination unit 57 transmits the job execution instruction to the MFP 1. Further, if the execution determination unit 57 determines that the job designated by the user is not executable by using the processing capability of the MFP 1, the execution determination unit 57 feeds back response information such as an error message to the smart speaker 100 via the operation audio conversion program.

The notification unit 165 notifies the text data, audio data, image data, or the like to the operation audio conversion program as the response to the job execution instruction by the user. Further, if the parameter indicating the job condition to be used for executing the job is determined to be insufficient, the notification unit 165 provides a feedback to the terminal (e.g., smart speaker 100) via the operation audio conversion program to demand or prompt the user to input the parameter determined to be insufficient. In this case, the parameter information can be transmitted as the information that is necessary to check and confirm the missing parameter (insufficient parameter), or the text data, audio data, and image data can be transmitted as the information necessary to demand or prompt the user to designate the parameter.

The management unit 166 associates and registers the device ID of the smart speaker 100 and the apparatus ID of the MFP 1 in the association DB 102 based on information and instruction input to a client device connected to the cloud service via the MFP 1, the smart speaker 100, or the network. The association DB 102 stores information associating the device ID of the smart speaker 100 and the apparatus ID of the MFP 1 in, for example, a management table or the like.

In this example case, the acquisition unit 160 to the search unit 167 are implemented by the software, but a part or all of the acquisition unit 160 to the search unit 167 can be implemented by hardware such as integrated circuit (IC) as similar to other programs described above.

Further, the operation audio processing program, the operation audio conversion program, the audio assistant program, and the management program may be recorded on a recording medium readable by a computer device such as a compact disk ROM (CD-ROM), a flexible disk (FD) or the like in a file of an installable format or an executable format. Further, the operation audio processing program, the operation audio conversion program, the audio assistant program, and the management program may be recorded on a recording medium readable by a computer device such as CD-R, digital versatile disk (DVD), Blu-ray Disc (registered trademark), semiconductor memory, or the like. Further, the operation audio processing program, the operation audio conversion program, the audio assistant program, and the management program may be installed from a network such as the Internet or the like, or may be provided in advance in a ROM or the like.

Figure 25:
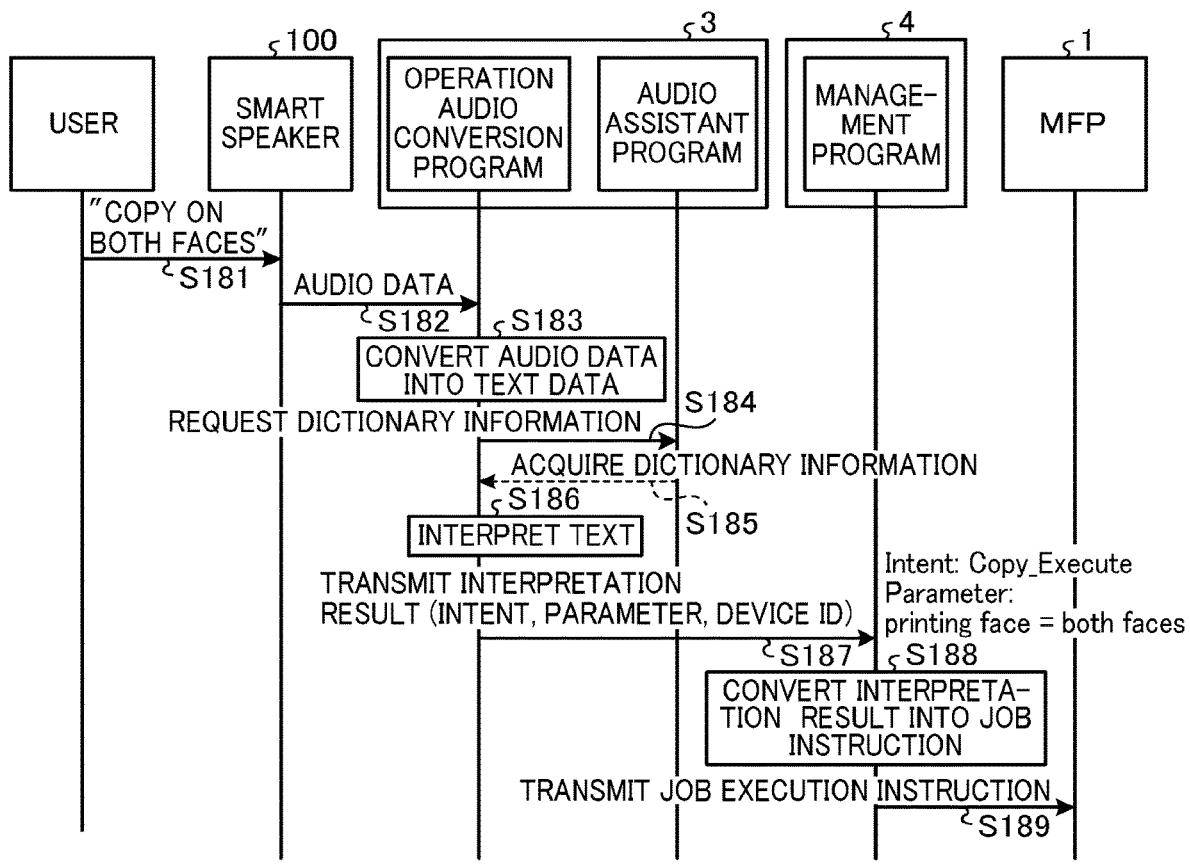
FIG. 25 is a diagram illustrating an overall operation of an audio input operation in an audio-based operation system according to the second embodiment.

Operation of Audio Input:

Hereinafter, a description is given of an overall operation of audio input operation in the audio-based operation system according to the second embodiment with reference to FIG. 25. In example case in FIG. 25, the both-face copying function of the MFP 1 is operated using an audio input via the smart speaker 100.

In this example case, a user activates the operation audio processing program of the smart speaker 100 and outputs (e.g., speaks), for example, "copy on both faces" (step S181). The audio (e.g., voice) of the user is collected by the microphone 29 of the smart speaker 100 and is then acquired by the acquisition unit 151. The operation audio processing program may be activated simultaneously with activation of the smart speaker 100, or may be activated when a given operation or a given audio input is performed on the smart speaker 100.

Then, the communication control unit 152 of the smart speaker 100 transmits audio data of "copy on both faces" to the audio recognition server 3 used as the cloud service (step S182). In step S182, the communication control unit 152 transmits the device ID of the smart speaker 100 identifying the smart speaker 100 to the audio recognition server 3.

Then, the text conversion unit 156 of the audio recognition server 3 converts the audio data of "copy on both faces" into text data (step S183) using the operation audio conversion program.

Then, based on the dictionary information acquired from the audio assistant program (steps S184, S185), the interpretation unit 157 checks or confirms whether a phase (e.g., word, term) included in the text data matches the dictionary information (step S186).

If the phase (e.g., word, term) included in the text data matches the dictionary information, the interpretation unit 157 converts the text data into an intent indicating an operation instructed by the user and one or more parameters indicating variables of job conditions, and transmits the intent and the parameter to the AI assistant server 4 together with the device ID identifying the smart speaker 100 that is used to acquire the audio data (step S187).

Specifically, in this example case, the interpretation unit 157 interprets an operation to be requested to the MFP 1 is "copy (Intent: Copy_Execute)" and interprets that "printing face is both faces (printing face=both faces) (step S186) In this manner, based on the text data, the interpretation unit 157 generates an interpretation result indicating the type (Intent) and the content (Parameter) of the job designated by the user.

Then, the interpretation unit 157 transmits the interpretation result to the management program (step S187). In step S187, the interpretation unit 157 can transmit the device ID identifying the smart speaker 100, used as a transmission source of the audio data, to the AI assistant server 4 in association with the interpretation result.

Then, the interpretation result conversion unit 161 implemented by the management program of the AI assistant server 4 converts the interpretation result acquired from the smart speaker 100 into a job instruction of the MFP 1 (step S188). Examples of the interpretation result and the job instruction converted from the interpretation result are described above with reference to Table 1. Further, the interpretation result conversion unit 161 may store the information corresponding to Table 1 in a storage unit such as the HDD 44 of the AI assistant server 4, and refers to Table 1 to convert the interpretation result into the job instruction.

In the above example case of Table 1, "COPY_EXECUTE," "SCAN_EXECUTE," "PRINT_EXECUTE," and "FAX_EXECUTE" are examples of the Intent. Further, "printing face," "number of copies," or the like are examples of the Parameter. The Parameter includes all parameters that can be designated as the job setting values.

The interpretation result conversion unit 161 of the AI assistant server 4 converts an interpretation result of "COPY_EXECUTE" into a job instruction of the MFP 1, such as "execution of copy job." Similarly, the interpretation result conversion unit 161 converts an interpretation result of "SCAN_EXECUTE" into a job instruction of the MFP 1, such as "execution of scan job." Similarly, the interpretation result conversion unit 161 converts an interpretation result of "PRINT_EXECUTE" into a job instruction of the MFP 1, such as "execution of print job." Similarly, the interpretation result conversion unit 161 converts an interpretation result of "FAX_EXECUTE" into a job instruction of the MFP 1, such as "execution of FAX job."

Although the above description is an example of basic jobs executable in the MFP 1, the jobs that can be interpreted by the cloud service are not limited to the basic jobs. For example, a job that causes a communication target apparatus (control target apparatus, target apparatus) to collect and transmit apparatus information to the cloud service, or a job that causes the communication target apparatus to display given information stored in a storage unit of the communication target apparatus on a display of the communication target apparatus can be instructed and executed.

Further, if the interpretation result includes the parameter of "printing face," the interpretation result conversion unit 161 generates a job instruction of the MFP 1, which performs "change setting value of printing face." Similarly, if the interpretation result includes the parameter of "number of copies," the interpretation result conversion unit 161 generates a job instruction of the MFP, which performs "change setting value of the number of copies."

That is, the interpretation result conversion unit 161 determines the user intention, such as a type of job to be executed by the MFP 1, based on the information included in the "Intent" of the interpretation result, and determines the value included in the "Parameter" as the job setting value, and then converts the interpretation result into the job instruction.

Then, the interpretation result conversion unit 161 of the AI assistant server 4 transmits the job instruction, generated as above described, to the MFP 1 via the communication unit 36 (step S189). In this example case, the job instruction of "copy job execution (printing face=both faces)" is transmitted to MFP 1. The communication control unit 52 transmits the job instruction to the MFP 1 identified by the management unit 166. That is, the user can instruct the MFP 1 identified by the apparatus ID, associated with the device ID identifying the terminal (e.g., smart speaker 100) used as the transmission source of audio data, to execute the job. As a result, the duplex printing is executed in the MFP 1.

Interpretation in Cloud Service:

The dictionary information is stored, for example, in the HDD 34 of the audio recognition server 3. The operation audio conversion program generates the intent and parameter based on the dictionary information. More specifically, the operation audio conversion program determines whether a phase (e.g., word, term) included in the text data converted from the audio data matches the dictionary information, and, if the phase (e.g., word, term) included in the text data converted from the audio data matches the dictionary information, the operation audio conversion program generates an interpretation result including the intent and parameter defined in the dictionary information.

The dictionary information can be any form as long as the Intent and Parameter can be generated. For example, in this description, the dictionary information includes entity information (Entity), intent information (Intent), and association information.

The entity information is information that associates parameters of job with natural language, and a plurality of synonyms can be registered for one parameter.

The intent information is information indicating the type of job.

The association information is information that associates the user-spoken phrases (natural language) and the entity information, and the user-spoken phrases (natural language) and the intent information, respectively. The association information enables a correct interpretation even if the spoken order of the parameter and/or nuance of the parameter are slightly changed. Further, based on the associated information, text of response (interpretation result) can be generated based on the input content.

FIG. 10 is an example of the entity information corresponding to print color. FIG. 10 indicates entity information corresponding to "Print Color." In FIG. 10, characters of "printColor" indicates an entity name. Further, in FIG. 10, characters such as "auto_color," "monochrome," "color," or the like in the left column indicate specific parameter names, respectively. Further, in FIG. 10, characters such as "auto_color," "monochrome, black and white," "color, full color," or the like in the right column indicate specific synonyms, respectively.

As indicated in FIG. 10, the parameters and synonyms can be associated with each other as the entity information and stored. By registering the associated parameters and synonyms, for example, if a copying of monochrome is to be instructed, the parameter can be set even if a user speaks "Please copy by black and white" or "Please copy by monochrome."

FIG. 11 is an example of entity information that is registered based on a spoken phrase. FIG. 11A illustrates spoken phrases of user according to the embodiment. FIG. 11B illustrates an action name according to the embodiment. FIG. 11C illustrates the entity information according to the embodiment. As indicated in FIGS. 11A to 11C, by operating the operation unit 49 on a screen displayed on the display unit 48 provided for the AI assistant server 4, the user-spoken content can be dragged. Alternatively, if another apparatus is connected to the AI assistant server 4, by operating an operation unit of another apparatus that have accessed the AI assistant server 4 via the network, the user-spoken content can be dragged.

With this configuration, the entity information, which is a target of association, can be selected. Further, when a value ("VALUE" in FIG. 11C) is set for the selected entity information, the parameter, which is entered as the response, is changed. For example, if the user speaks "Please copy by black and white," and the value is "SprintColor," a return value of "printColor=monochrome" is returned. In contrast, if the value is "SprintColor.original," a return value of "printColor=black and white" is returned. In this case, if the value is "SprintColor.original," the user-spoken content itself can be returned as the parameter of the response.

Interactive Operation:

Hereinafter, a description is given of an interactive operation implemented in the audio-based operation system of the second embodiment, in which the system performs the interactive operation based on content input by a user, such as audio (e.g., voice) input by the user. In the audio-based operation system of the second embodiment, in addition to responding to standard phrases necessary for the interactive operation, the system performs the interactive operation using the MFP 1 by performing two types of responses, such as "input insufficient feedback" and "input confirmation feedback" as the responses specifically set for the operation using the MFP 1.

The "input insufficient feedback" is a response that is output when information required to execute a job is not enough. If the information content input by the user cannot be recognized by the system, or if the required parameter is determined to be insufficient, the "input insufficient feedback" is output. That is, for parameters other than the required parameters (hereinafter, non-relevant parameter), it is not necessary to provide insufficient feedback even if the non-relevant parameter is not instructed. Further, in addition to the parameters, a process of checking to-be-used functions, such as a copying function and a scanning function, can be also included in the "input insufficient feedback."

For example, depending on the type of target apparatus connected to a cloud service apparatus for communication, the functions and the parameters to be checked by the user can be changed. In this case, the apparatus information acquisition unit 163 acquires information indicating the type and function of the target apparatus at a given timing after the communication with the target apparatus is established, and then the feedback unit 153 determines which function and parameter are to be checked or confirmed by the user based on the acquired information.

For example, if the type of target apparatus is MFP 1, the functions included in MFP 1 such as copying, printing, scanning, facsimile can be confirmed by the user, and the functions, such as copying, printing, scanning, facsimile, included only in the MFP 1 can be confirmed by the user.

Further, the required parameter can be changed in accordance with the setting condition designated by the user. That is, if the printing condition designated by the user is variable magnification printing, the setting of to-be-printed sheet size is set as the required parameter, if the printing condition designated by the user is the duplex printing, the setting of one face or both faces is set as the required parameter, and if the printing condition designated by the user is the magazine binding, the setting of the finishing size and the setting of the number of pages to be included in one page are set as the required parameter.

The "input confirmation feedback" is a response that is output when the information required to execute the job is sufficiently or completely prepared. That is, the input confirmation feedback is output only when all of the required parameters are instructed. Further, the input confirmation feedback is performed to demand or prompt the user to select whether to execute the job using the current setting values or to change the current setting values. In order to confirm whether or not to execute the job using the current setting values, all of the parameters (any required parameter and any non-required parameter) instructed by the user can be output as an audio sound so that the parameters can be confirmed by the user.

Interactive Operation when MFP Performs Copying of Plurality of Copies on Both Faces:

FIGS. 26 to 34 are sequence diagrams illustrating a flow of an interactive operation using the MFP 1.

Figure 26:
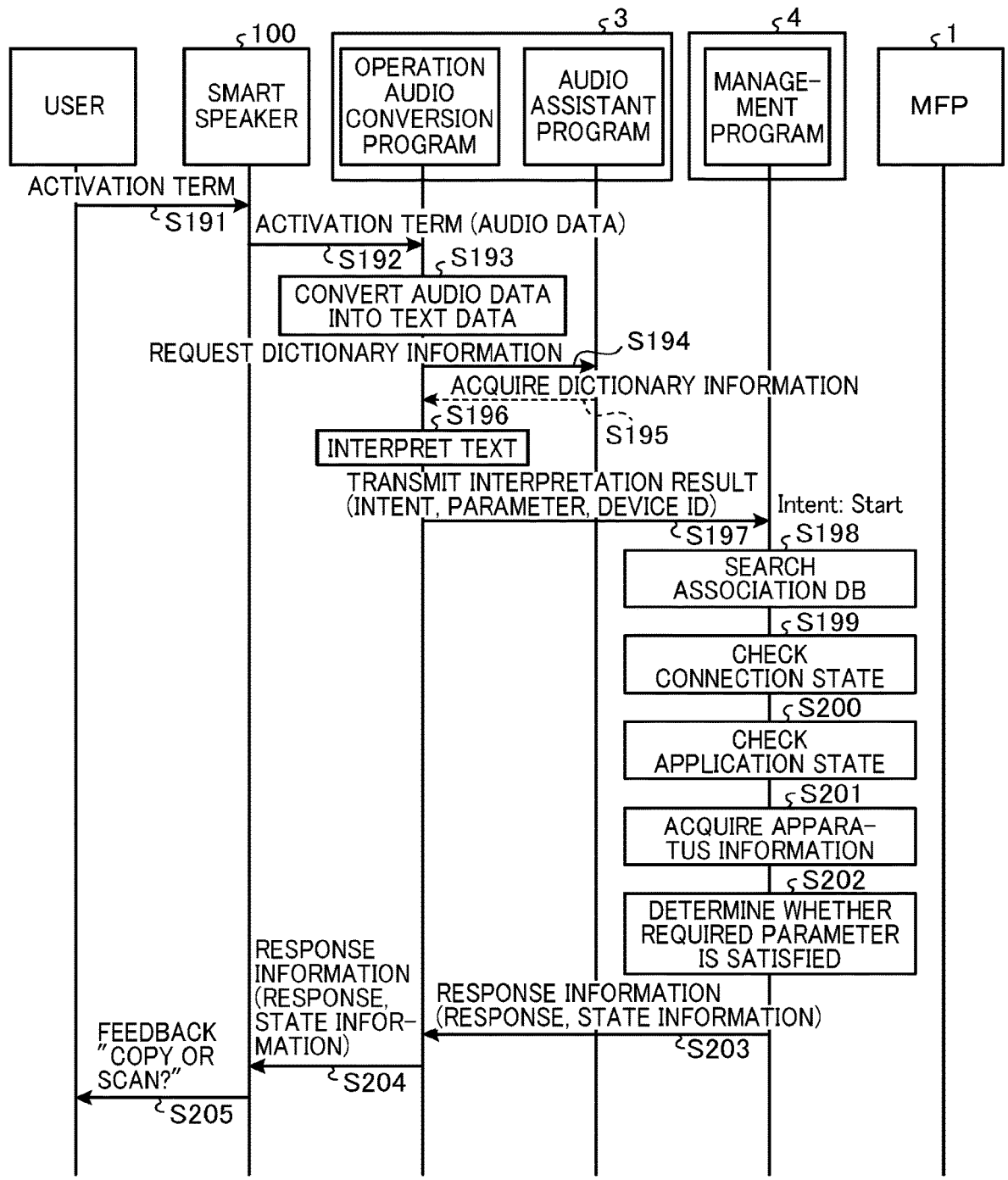
FIG. 26 is a sequence diagram illustrating a flow of an activation operation of an audio assistant program according to the second embodiment.

Flow of Activation Operation of Audio Assistant Program:

A sequence diagram of FIG. 26 illustrates a flow of an activation operation of the audio assistant program.

In FIG. 26, at first, a user activates the operation audio processing program of the smart speaker 100, and then instructs an activation of the audio assistant program using, for example, by an audio input. For example, if the user speaks an activation phrase (e.g., word, term) to activate the audio assistant program, the audio assistant program of the audio recognition server 3 can be activated (step S191).

Then, the communication control unit 152 of the smart speaker 100 transmits audio data of the activation phrase (e.g., word, term) to the audio recognition server 3 (step S192).

Then, the text conversion unit 156 of the audio recognition server 3 converts the audio data of the activation phrase (e.g., word, term) into text data (step S193).

Then, the interpretation unit 157 of the audio recognition server 3 refers to the dictionary information (e.g., dictionary information stored in the HDD 34) provided by the audio assistant program (steps S194, S195) to convert the text data of the activation phrase (e.g., word, term) into an intent and parameter (step S196: text data interpretation), and then transmits the intent and parameter to the AI assistant server 4 together with the device ID of the smart speaker 100 (step S197).

Then, the execution determination unit 164 of the AI assistant server 4 determines whether or not all conditions necessary for the job execution are set based on the intent and parameter (steps S198, S199, S200, S201, S202).

For example, the execution determination unit 164 determines whether the required parameter is satisfied or sufficient (step S202). If the required parameter is not satisfied in step S202, the execution determination unit 164 transmits response information to the smart speaker 100 via the operation audio conversion program of the audio recognition server 3 (steps S203, S204).

The response information includes, for example, text data, audio data, image data, or the like. In this example case, text data of "copy or scan?" is transmitted to the smart speaker 100. The content is not limited to this message if the message demands or prompts the user to enter or input the job type or the job setting condition. Further, if the smart speaker 100 cannot convert the text data into the audio data, the audio data can be transmitted to the smart speaker 100. Further, the feedback to the user can be performed not only by outputting an audio but also by displaying text or image on the touch panel 27. As a result, the feedback unit 153 of the smart speaker 100 performs an audio feedback of "copy or scan?" (step S205).

Further, if the job type and the job setting condition are designated when the audio assistant program of the audio recognition server 3 is instructed to be activated, the above described steps can be omitted.

Further, prior to transmitting the response information in step S203, the execution determination unit 164 of the AI assistant server 4 can search the MFP 1, associated with the acquired device ID of the smart speaker 100, from the association DB 102 (step S198).

In this case, if the MFP 1 associated with the device ID of the smart speaker 100 is not stored in the association DB 102, the execution determination unit 164 notifies the user that the smart speaker 100 is not associated with the communication target apparatus. For example, the execution determination unit 164 generates response information including a response that "this device is not associated with a communication target apparatus." In this case, the execution determination unit 164 can include a method of associating the device and the communication target apparatus in the response. Further, the searching of the MFP 1 from the association DB 102 and generation of the response information can be performed at any timing, such as when the device ID of the smart speaker 100 is acquired.

Further, prior to transmitting the response information in step S203, the execution determination unit 164 can be configured to check an apparatus state of the communication target apparatus (step S199). By obtaining or acquiring the apparatus information using the apparatus information acquisition unit 163, or by referring to the apparatus information acquired in advance by the apparatus information acquisition unit 163, the execution determination unit 164 determines whether the communication can be performed with the communication target apparatus (e.g., MFP 1), and determines whether the communication target apparatus (e.g., MFP 1) can be used. At this stage, if the communication connection with the MFP 1 associated with the device ID of the smart speaker 100 is not established, or if the MFP 1 cannot be used due to the activation of MFP 1, the execution determination unit 164 notifies a given response to the user.

For example, the execution determination unit 164 generates response information including a response that "apparatus is offline" or "apparatus is being prepared." Further, the execution determination unit 164 can include a countermeasure method in the response. Further, checking of the apparatus status can be performed at any timing when the intent, parameter, and device ID are acquired from the operation audio conversion program of the audio recognition server 3.

Further, prior to transmitting the response information in step S203, the execution determination unit 164 can be configured to check the state of application that is used to execute the function designated by the user at the communication target apparatus (step S200). By obtaining or acquiring the apparatus information using the apparatus information acquisition unit 163, or by referring to the apparatus information acquired in advance by the apparatus information acquisition unit 163, the execution determination unit 164 determines whether the application is installed, or whether the application is in a state that the application can be executed.

For example, if the application related to the copy function, which is instructed to be executed, is not installed on the MFP 1 associated with the device ID of the smart speaker 100, or if the application related to the copy function cannot be used due to the activation of the application, the execution determination unit 164 notifies a given response to the user. For example, the execution determination unit 164 generates response information including a response of "application is not installed" or "application is not currently available." Further, the execution determination unit 164 can include a countermeasure method in the response.

Further, the checking of the state of application can be performed at any timing when the intent, the parameter and the device ID are acquired from the operation audio conversion program.

Further, prior to transmitting the response information in step S203, the execution determination unit 164 can be configured to acquire the apparatus information by using the apparatus information acquisition unit 163, or by reading the apparatus information acquired in advance by the apparatus information acquisition unit 163 (step S201). For example, the acquired apparatus information is used to determine whether the job type and job condition instructed by the user can be executed at the communication target apparatus.

Figure 27:
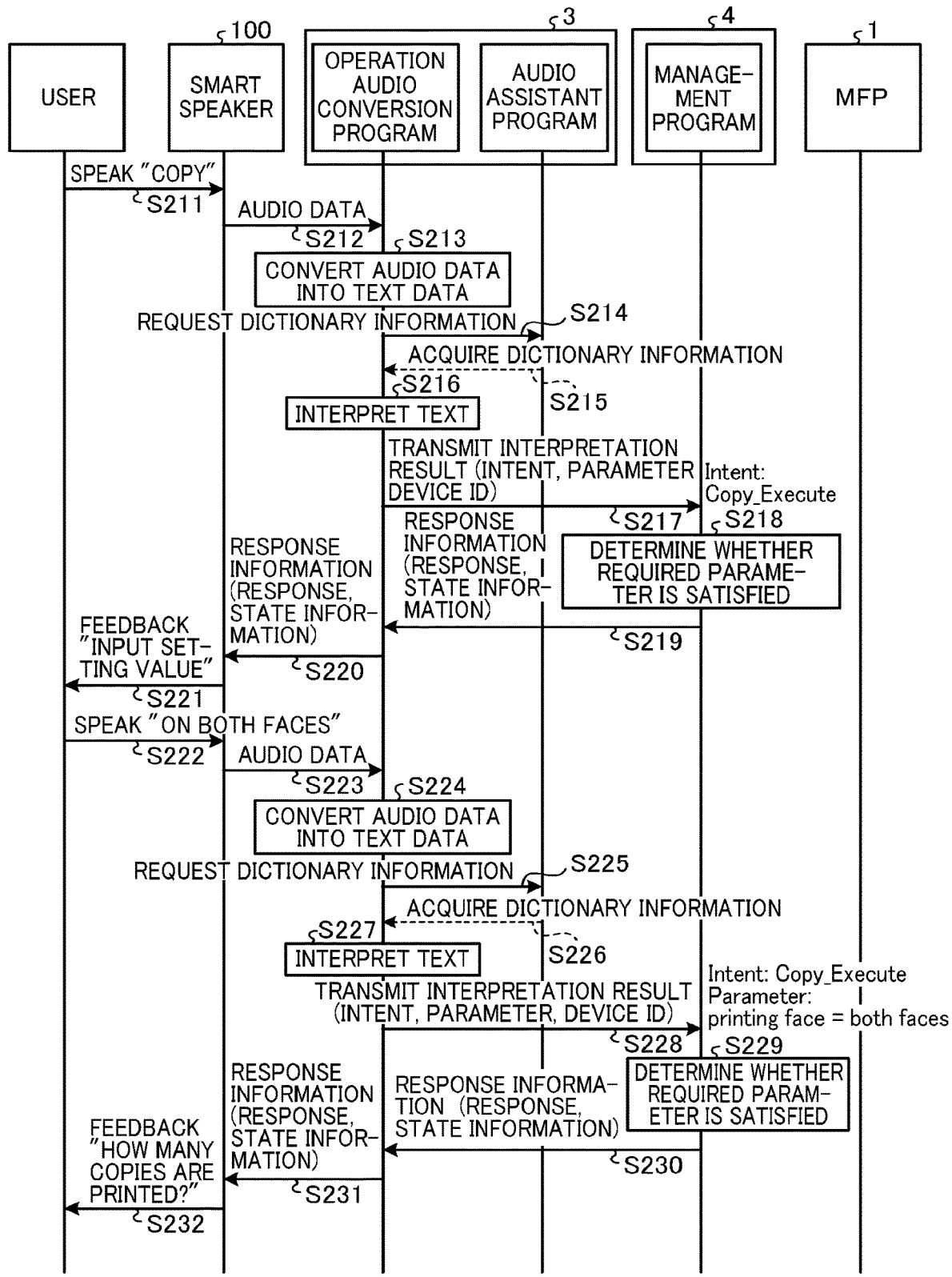
FIG. 27 is a sequence diagram illustrating a flow of an operation when a copy function is instructed according to the second embodiment.

Flow of Activation Operation of Audio Assistant Program:

FIG. 27 is a sequence diagram illustrating a flow of an operation when a copy function is instructed.

If the user speaks "copy" (step S211) in response to the audio feedback of "copy or scan?" in step S205 in FIG. 26, or if the user speaks "copy" when instructing the activation of the audio assistant program, the communication control unit 152 of the smart speaker 100 transmits audio data of "copy" to the audio recognition server 3 (step S212).

Then, the text conversion unit 156 implemented by the operation audio conversion program of the audio recognition server 3 converts the audio data of "copy" into text data (step S213).

As described with reference to FIGS. 10 and 11, the interpretation unit 157 of the audio recognition server 3 interprets a phrase spoken by the user indicated by the text data (steps S214, S215, S216), and then transmits an intent and one or more parameters as an interpretation result to the AI assistant server 4 together with the device ID of the smart speaker 100 (step S217). In this example case, an intent of "Copy_Execute" is generated as the interpretation result and then transmitted to the management program in step S217.

In this example case, since the user only speaks "copy," the number of copies and the copying face such as one face or both faces are not instructed (input insufficient). Therefore, the execution determination unit 164 implemented by the management program of the AI assistant server 4 determines that the required parameter is not satisfied (step S218).

As a result, the AI assistant server 4 inquires the insufficient parameter to the smart speaker 100 (steps S219, S220).

Specifically, the execution determination unit 164 of the AI assistant server 4 generates response information (Response), such as "input setting value" (step S219).

Then, the notification unit 165 implemented by the management program of the AI assistant server 4 transmits the response information to the smart speaker 100 via the audio conversion program of the audio recognition server 3 (step S220).

Then, the feedback unit 153 of the smart speaker 100 outputs (speaks) an audio of "input setting value" via the smart speaker 100 and also instructs the touch panel 27 to display the text of "input setting value" (step S221: input insufficient feedback). Further, any one of the audio output and the text display on the touch panel can be omitted.

Further, when transmitting the response information to the operation audio conversion program, the notification unit 165 implemented by the management program of the AI assistant server 4 can transmit state information indicating that a session is being continued. The state information is information indicating the state of session. For example, if the transmission of a job execution instruction to a target apparatus such as the MFP 1 has not yet performed and the job setting processing by the user is being continued, the state information indicating that the session is being continued is transmitted. Further, if the transmission of the job execution instruction to the target apparatus is completed, the state information indicating that the session has completed is transmitted.

However, the state information is not limited to thereto, but can be changed to any information indicating the state of session in more details. Specifically, the interpretation unit 157 implemented by the operation audio conversion program of the audio recognition server 3 determines whether the session is to be continued or terminated in accordance with the state information. That is, even if a user designates the job setting condition using a plurality of user-spoken contents, separately spoken, while the session is being continued, the interpretation unit 157 of the operation audio conversion program determines that the plurality of job setting conditions belongs to one job, and if the session is terminated, the interpretation unit 157 determines that the job setting condition included in the user-spoken content belongs to a new job. With this configuration, even if the instruction of the job type and the job setting condition are performed based on a plurality of user-spoken phrases, the operation audio conversion program of the audio recognition server 3 can determine whether or not the user-spoken phrases belong to the same job or another new job.

Further, the operation audio conversion program of the audio recognition server 3 can determine that the session is terminated if a state not receiving a signal from the smart speaker 100 continues for a given period of time or longer. Even if the audio recognition server 3 manages or controls the session, the communication target apparatus (e.g., MFP 1) can execute the job regardless of the session. In this case, in response to acquiring the job execution instruction, the communication target apparatus (e.g., MFP 1) overwrites and sets the job condition included in the job execution instruction onto the job condition currently stored in the MFP 1. At this stage, the communication target apparatus (e.g., MFP 1) can delete all of job conditions stored in the communication target apparatus (e.g., MFP 1) or return all of job conditions stored in the communication target apparatus (e.g., MFP 1) to the default condition to set the job condition included in the job execution instruction.

Further, if the job condition included in the job execution instruction is not consistent with the job condition stored in the communication target apparatus (e.g., MFP 1), the communication target apparatus (e.g., MFP 1) may overwrite the job condition included in the job execution instruction onto the job condition stored in the communication target apparatus (e.g., MFP 1) with a higher priority. If the job condition included in the job execution instruction is consistent with the job condition stored in the communication target apparatus (e.g., MFP 1), the communication target apparatus (e.g., MFP 1) retains the job condition stored in the communication target apparatus (e.g., MFP 1). Further, after the job is executed, the communication target apparatus (e.g., MFP 1) can delete the job condition included in the job execution instruction to set the default condition registered for the communication target apparatus (e.g., MFP 1) in advance.

Then, in response to receiving the input insufficient feedback output from the smart speaker 100 (step S221), the user speaks an instruction of copying face, such as "on both faces" (step S222).

Then, the communication control unit 152 of the smart speaker 100 transmits audio data of "on both faces" to the audio recognition server 3 with an audio-to-text conversion request (step S223).

Then, the text conversion unit 156 implemented by the operation audio conversion program of the audio recognition server 3 converts the audio data of "on both faces" into text data (step S224).

Then, the interpretation unit 157 of the audio recognition server 3 interprets a phrase spoken by the user indicated by the text data (steps S225, S226, S227), and then transmits an intent and parameter as an interpretation result to the AI assistant server 4 together with the device ID of the smart speaker 100 (step S228).

In this example case, the Parameter of "printing face=both faces" is generated as the interpretation result. Then, the interpretation unit 157 transmits the interpretation result including the Intent of "Copy_Execute" and the Parameter of "printing face=both faces" to the AI assistant server 4 together with the intent and parameter included in the previously spoken content.

In this example case, since the user only speaks "copy" and "on both faces," the number of copies is unknown (again, the required parameter is insufficient). In the above description, the operation audio conversion program of the audio recognition server 3 integrates the interpretation result of the previous spoken content and the interpretation result of the currently spoken content to generate the intent and the parameter, but not limited thereto. That is, the management program of the AI assistant server 4 can store the interpretation result of the previous spoken content and integrate the interpretation result of the previous spoken content and the interpretation result of the currently spoken content to generate the intent and the parameter. In this example case, the interpretation unit 157 of the audio recognition server 3 can transmit only the parameter of "printing face=both faces" newly acquired by the currently spoken content to the management program of the AI assistant server 4.

Further, among a plurality of parameters, the required parameters can be stored in the storage unit such as the HDD 44 of the AI assistant server 4 in advance. In this case, based on information of the required parameters stored in the storage unit, the execution determination unit 164 of the AI assistant server 4 can determine whether the parameters acquired from the smart speaker 100 are sufficient to set all of the required parameters, and can demand or prompt the user, via the smart speaker 100, to set the required parameter if the setting of required parameter has not been completed (step S229).

Therefore, the execution determination unit 164 implemented by the management program of the AI assistant server 4 generates response information (Response) of "How many copies are printed" (step S229).

Then, the notification unit 165 of the AI assistant server 4 transmits the response information to the smart speaker 100 via the operation audio conversion program of the audio recognition server 3 (steps S230, S231).

Then, the feedback unit 153 of the smart speaker 100 outputs an audio of "How many copies are printed?" via the speaker 28, and also instructs the touch panel 27 to display the text of "How many copies are printed?" (step S232: input insufficient feedback).

Figure 28:
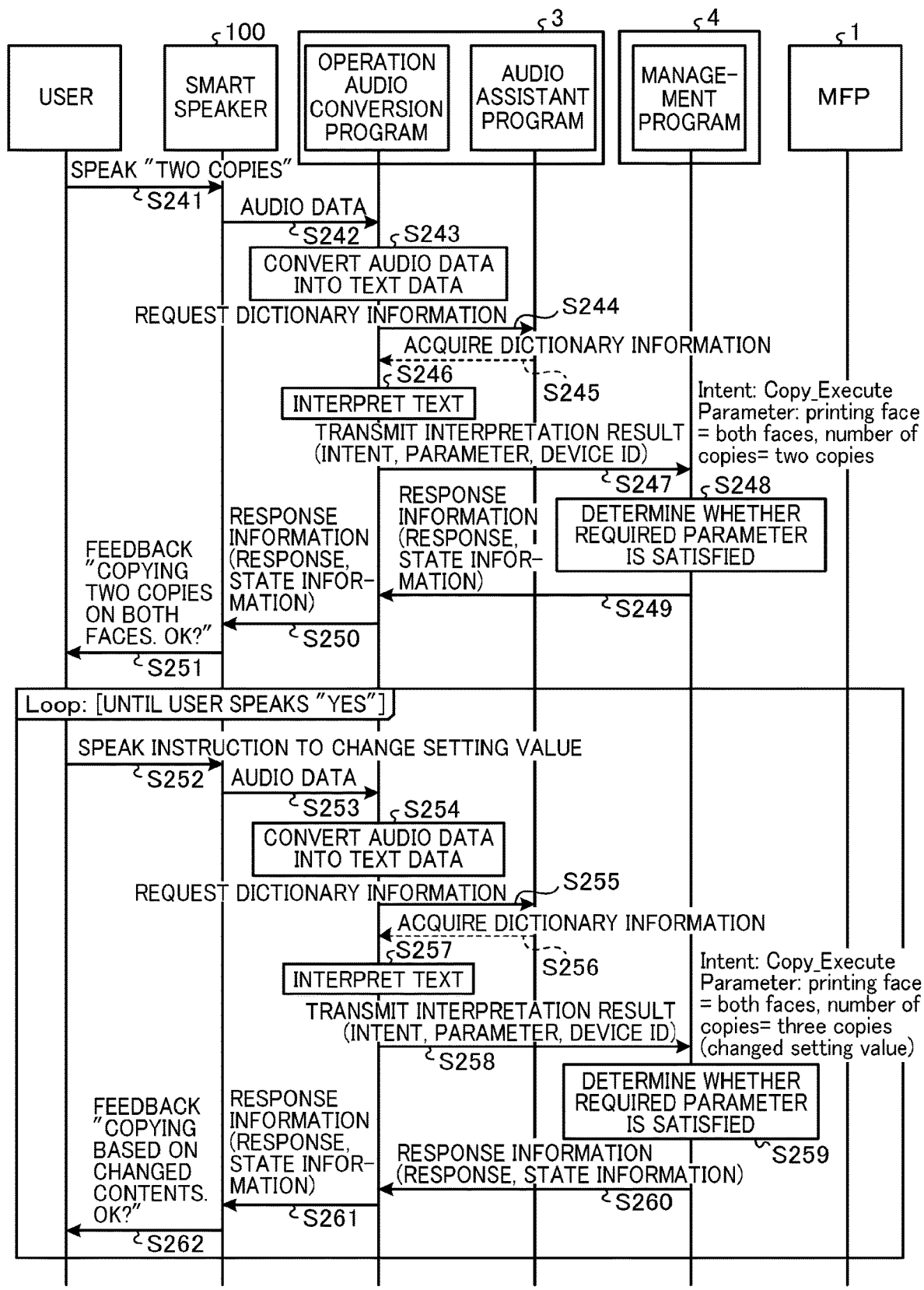
FIG. 28 is a sequence diagram illustrating a flow of an operation of setting a number of copies according to the second embodiment.

Setting of Number of Copies:

FIG. 28 is an example of a sequence diagram illustrating a flow of an operation of setting the number of copies.

Since the input insufficient feedback of "How many copies are printed?" is output again via the smart speaker 100 in step S232 of the sequence diagram of FIG. 27, the user speaks, for example, "two copies" (step S241).

Then, the communication control unit 152 of the smart speaker 100 transmits audio data of "two copies" to the audio recognition server 3 with an audio-to-text conversion request (step S242).

Then, the text conversion unit 156 implemented by the operation audio conversion program of the audio recognition server 3 converts the audio data of "two copies" into text data (step S243).

Then, the interpretation unit 72 of the operation audio conversion program interprets a phrase spoken by the user indicated by the text data based on the dictionary information (steps S244, S245, S246). In this example case, the interpretation unit 72 generates an interpretation result setting the parameter of "number of copies=two copies."

Then, the interpretation unit 72 transmits the interpretation result including the Intent of "Copy_Execute" and the Parameter of "printing face=both faces, number of copies=two copies" to the AI assistant server 4 together with the intent and parameter included in the previous spoken content (step S247).

If the execution determination unit 164 of the AI assistant server 4 receives the Parameter of "printing face=both faces, number of copies=two copies," the execution determination unit 164 determines that the state of insufficient parameter required for the copy job has been solved by determining that the required parameter is satisfied or sufficient (step S248).

Then, the execution determination unit 164 generates response information of "Copying two copies on both faces. OK?" and then transmits the response information to the smart speaker 100 via the notification unit 165 and the audio recognition server 3 (steps S249, S250).

Based on the Response included in the response information, the feedback unit 55 of the smart speaker 100 outputs an audio and text of the input confirmation feedback such as "copying two copies on both faces. OK?" indicating that the state of insufficiency of required parameter has been solved and it is ready to start the copying (step S251).

Instead of outputting the text data and audio data included in the response information, text data, which is generated from the text data stored in the storage unit of the smart speaker 100 and the information included in the response information, can be output as an audio or displayed as a text image. In response to receiving this input confirmation feedback, the user instructs a change of the setting value or a start of copying.

Changing of Setting Value:

When a change of setting value is instructed, the user performs an audio input of to-be-changed setting value to the smart speaker 100 (step S252). For example, when the number of copies is to be changed from two to three, the user speaks "three copies" to input an audio of "three copies." Further, when the printing face is changed from both faces to one face, the user "one face" to input an audio of "one face."

Based on this audio input, the AI assistant server 4 determines whether the required parameter is satisfied or sufficient, and then, based on the response information from the AI assistant server 4, the smart speaker 100 outputs (speaks), for example, an input confirmation feedback of "copying based on changed contents. OK?" (steps S253, S254, S255, S256, S257, S258, S259, S260, S261, S262).

The operation of changing the setting value (steps S252 to S262) is repeated until the user speaks an audio of the setting value in response to receiving the "input insufficient feedback" and then allows or accepts the setting value notified as the input confirmation feedback, in which the user can also input an instruction allowing or accepting the setting value using a text input or a button input. That is, the operation of changing the setting value is repeated until the user speaks an audio of "YES" that allows or accepts the setting value fed back as the input confirmation feedback.

Figure 29:
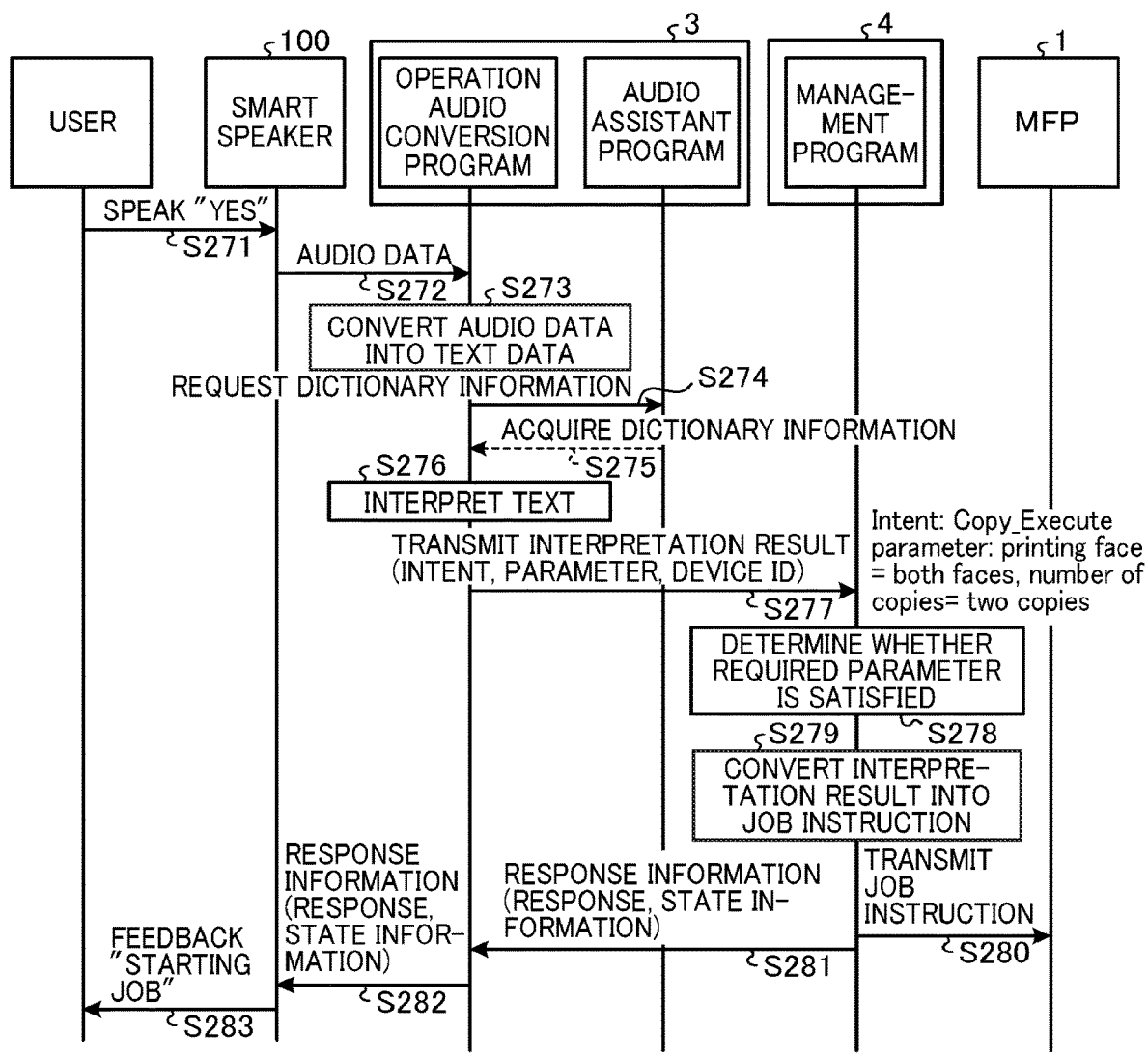
FIG. 29 is a sequence diagram illustrating a flow of an operation of transmitting a job execution instruction to an MFP according to the second embodiment.

Flow of Operation of Job Execution Instruction to MFP:

FIG. 29 is a sequence diagram illustrating a flow of operation of transmitting the job execution instruction to the MFP 1.

If the user speaks "YES" to the above described input confirmation feedback (step S271), audio data of "YES" is converted into text data by the operation audio conversion program of the audio recognition server 3 (steps S272, S273).

If the interpretation unit 157 implemented by the operation audio conversion program of the audio recognition server 3 recognizes a copy start instruction based on the text data, the interpretation unit 157 generates an interpretation result adding the Parameter of "printing face=both faces, number of copies=two copies" to the Intent of "Copy_Execute," and transmits the interpretation result to the management program (steps S274, S275, S276, S277).

If the execution determination unit 164 implemented by the management program of the AI assistant server 4 determines that the interpretation result satisfies the required parameter (step S278), the interpretation result conversion unit 161 converts the interpretation result into a job instruction of the MFP 1 (step S279).

Then, the execution instruction unit 162 transmits the job instruction information to the MFP 1 (step S280). As a result, the functions of the MFP 1 such as copying, scanning, the number of copies such as one copy and two copies, and the execution mode of one face or both faces can be set by performing the audio input, with which the operation of the MFP 1 can be controlled.

When the job execution is instructed to the MFP 1 (step S280), the execution instruction unit 162 of the AI assistant server 4 generates response information including information indicating that the job execution is instructed to the MFP 1 and the current job execution state (the current state of the MFP), and then, the notification unit 165 of the AI assistant server 4 transmits the response information to the smart speaker 100 via the audio recognition server 3 (steps S281, S282).

When the smart speaker 100 detects the information indicating that the job execution is instructed from the response information, the smart speaker 100 outputs (speaks), for example, an audio feedback and/or a text feedback, such as "starting (designated job)" (step S283). Thus, the user can recognize that the execution of the designated job has been started in the MFP 1.

Further, if the execution determination unit 164 implemented by the management program of the AI assistant server 4 determines that the interpretation result satisfies the required parameter (step S278), the feedback operation to the smart speaker 100 can be omitted.

Feedback Information from AI Assistant Server:

As above described, the feedback unit 153 of the smart speaker 100 outputs the text data and/or audio data included in the response information. However, the feedback unit 153 can generate the text data corresponding to the response information based on the text data stored in the storage unit of the smart speaker 100, and can output a feedback, such as audio output and text output.

Specifically, as described above with reference to Table 2, for example, the Intent of "Copy_Parameter_Setting" for demanding or prompting the input of job setting value and "Copy_Confirm" for demanding or prompting the confirmation of the job setting value can be included in the response information, and then the response information is fed back to the smart speaker 100 from the AI assistant server 4.

The feedback unit 153 of the smart speaker 100 determines a feedback to a user in accordance with the Intent, Parameter, and Response included in the response information. The feedback unit 153 can be configured to store the information corresponding to Table 2 in the storage unit of the smart speaker 100, and refer to Table 2 to determine the feedback content.

Table 2 describes a case of copying, but "Parameter_Setting" for demanding or prompting the user to input the job setting value and "Confirm" for demanding or prompting the user to confirm the job setting value can be used as the Action of "printing, scanning, and facsimile" as similar to Table 2. The response information includes the Intent and at least one of the Parameter and Response.

Further, the parameter, such as the setting value of printing face indicating both faces or one face, and the number of copies, can be included in the response information and fed back to the mobile terminal 2. Further, if the required parameter is determined to be insufficient, a message for demanding or prompting the input of the missing parameter (insufficient parameter) can be included in the response, and then the response is fed back to the smart speaker 100.

Operation when Error Occurs in MFP:

Hereinafter, a description is given of an operation when a job is executed and an error occurs in the MFP 1. When the MFP 1 executes the job and the job is completed without any problems, a completion message (audio and/or text message), such as "Job is completed. Do not forget sheets" is output via the smart speaker 100.

On the other hand, when an error occurs due to a lack of sheet, the AI assistant server 4 provides a job confirmation feedback, such as "There is no sheet. Refill sheet to continue or cancel job" to the smart speaker 100. If the user refills sheets in the MFP 1 and responds with "Continue" in response to receiving this job confirmation feedback, the execution instruction unit 162 of the audio recognition server 3 instructs the MFP 1 to continue the job, and the job is restarted in the MFP 1.

On the other hand, if the user speaks "Cancel" in response to receiving this job confirmation feedback, the execution instruction unit 162 of the AI assistant server 4 instructs the MFP 1 to cancel the job, and the execution of the job in the MFP 1 after the error occurrence is canceled. In this case, the job confirmation feedback, such as "Job is cancelled" is output via the smart speaker 100 using audio data and text data.

Figure 30:
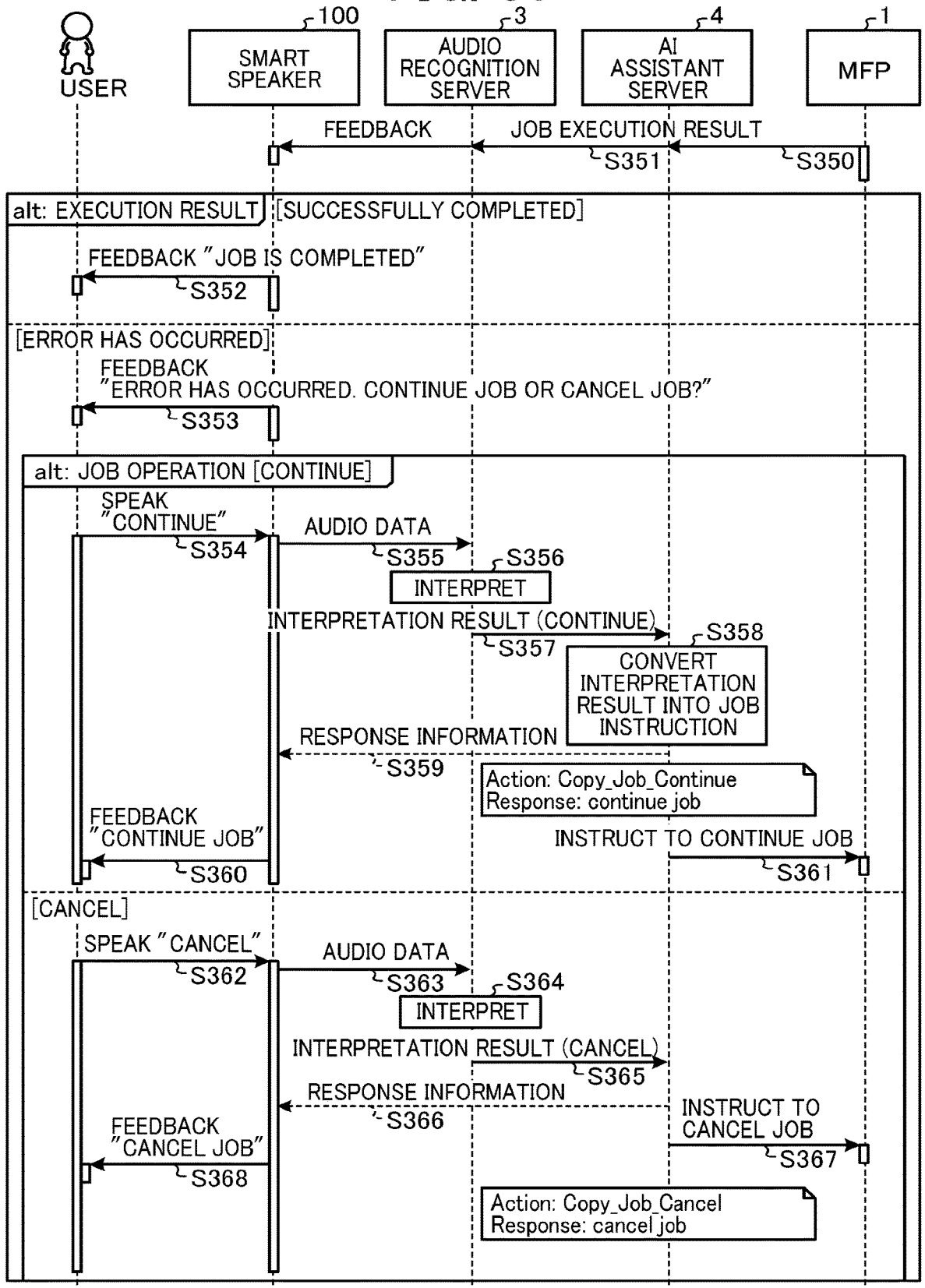
FIG. 30 is a sequence diagram illustrating a flow of an interactive operation when a job is executed and when an error occurs according to the second embodiment.

FIG. 30 is a sequence diagram illustrating a flow of an interactive operation when a job is executed and an error occurs.

At first, the MFP 1 notifies a job execution result to the AI assistant server 4 (step S350).

Then, the audio recognition server 3 receives the job execution result at the MFP 1 via the AI assistant server 4, and then the audio recognition server 3 transmits a feedback to the smart speaker 100 (step S351).

Then, the smart speaker 100 outputs one feedback indicating that the job has been successfully completed (step S352) or another feedback indicating that an error has occurred (step S353).

If the smart speaker 100 receives the execution result indicating that the job has been successfully completed, the feedback unit 153 of the smart speaker 100 outputs, for example, an audio message of "Job is completed" (step S352).

On the other hand, if the smart speaker 100 receives the execution result indicating that the error has occurred, the feedback unit 153 of the smart speaker 100 outputs, for example, an audio message of "Error has occurred. Continue job or cancel job?" (step S353).

Specifically, when the job is completed, the MFP 1 transmits a completion notification to the management program of the AI assistant server 4. Further, when the error has occurred, the MFP 1 transmits error information related to the error, such as error content, to the AI assistant server 4. Further, in response to receiving the information acquired from the MFP 1, the management program of the AI assistant server 4 generates response information including, for example, "Job is completed" or "Error has occurred. Continue job or cancel job?" and transmits the response information to the smart speaker 100 via the audio recognition server 3.

In FIG. 30, steps S354 to S361 indicate a sequence diagram illustrating a flow of operation of each unit when the user designates a continuation of job.

That is, if the user notices an inquiry of "Error has occurred. Continue job or cancel job?" and the user removes the cause of error and speaks "continue" (step S354), audio data of "continue" is transmitted to the audio recognition server 3 (step S355), and converted into text data by the operation audio conversion program of the audio recognition server 3 as above described, and interpreted by the audio recognition server 3 (step S356).

Then, the operation audio conversion program of the audio recognition server 3 generates an interpretation result setting the Intent of "Copy_Job_Continue," and then transmits the interpretation result to the management program of the AI assistant server 4 (step S357).

Then, the interpretation result conversion unit 161 implemented by the management program of the AI assistant server 4 converts the interpretation result into a job instruction, and generates response information setting "continue job" (step S358), and transmits the response information to the smart speaker 100 via the audio recognition server 3 (step S359).

Further, the feedback unit 153 of the smart speaker 100 outputs an input confirmation feedback of "continue job" (step S360).

Further, the execution instruction unit 162 implemented by the management program of the AI assistant server 4 instructs the MFP 1 to continue the job by transmitting the job instruction (step S361).

On the other hand, in FIG. 30, steps S362 to S368 indicate a sequence diagram illustrating a flow of operation of each unit when the user designates cancellation of job.

That is, if the user notices an inquiry of "Error has occurred. Continue job or cancel job?" and the user speaks "Cancel" as a response (step S362), audio data of "Cancel" is transmitted to the audio recognition server 3 (step S363).

Then, the interpretation unit 157 implemented by the operation audio conversion program of the audio recognition server 3 converts the audio data into text data and interprets the text data (step S364).

Then, the interpretation unit 157 generates an interpretation result setting the Intent of "Copy_Job_Cancel" and transmits the interpretation result to the management program of the AI assistant server 4 (step S365). Then, the execution determination unit 164 implemented by the management program of the AI assistant server 4 generates response information of "cancel job."

Then, the notification unit 165 transmits the response information to the smart speaker 100 (step S366).

As a result, the feedback unit 153 of the smart speaker 100 outputs an input confirmation feedback of "cancel job" (step S368).

Figure 31:
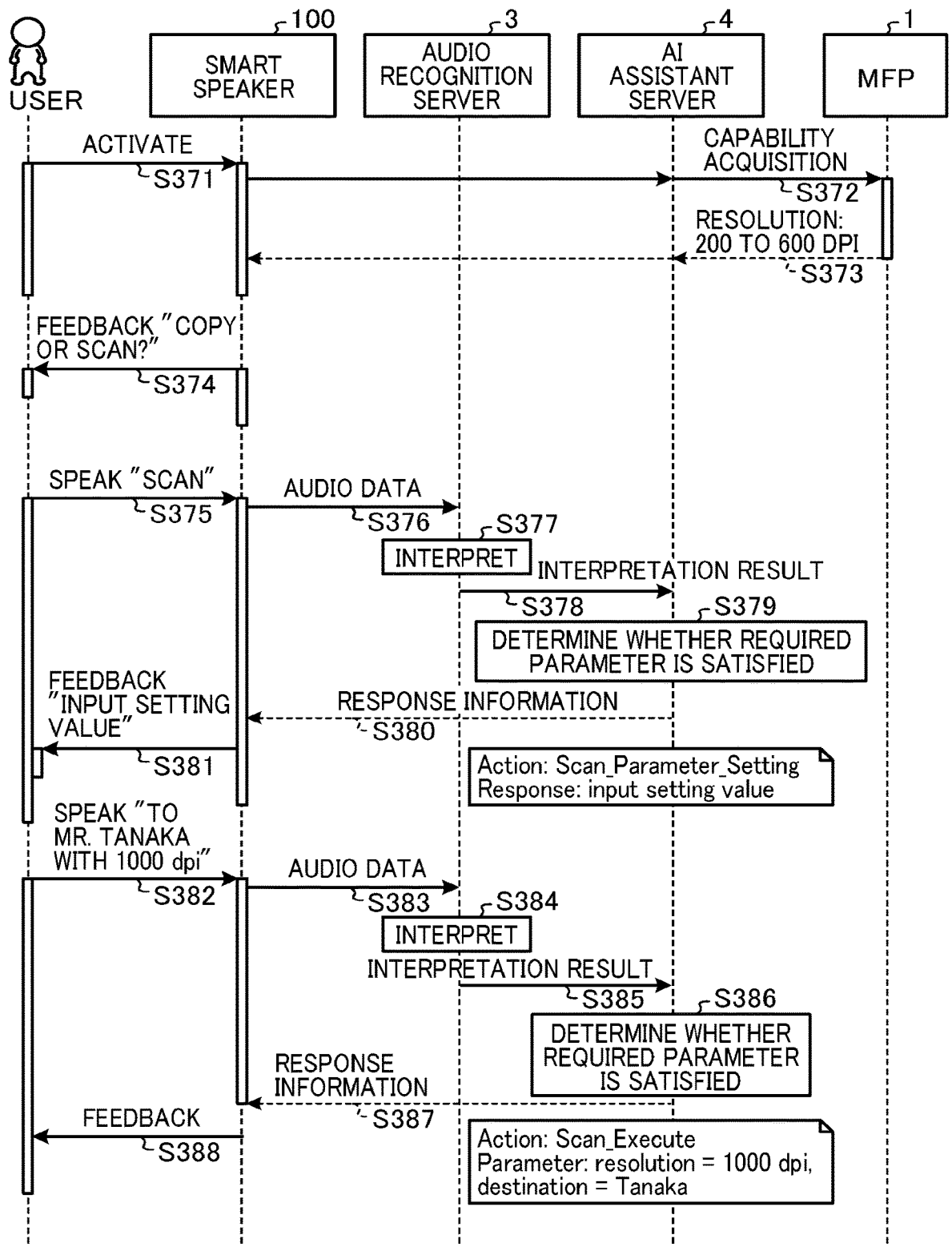
FIG. 31 is a sequence diagram illustrating a flow of an operation of determining whether an MFP has apparatus capability required for a job instructed by a user according to the second embodiment.
Figure 32:
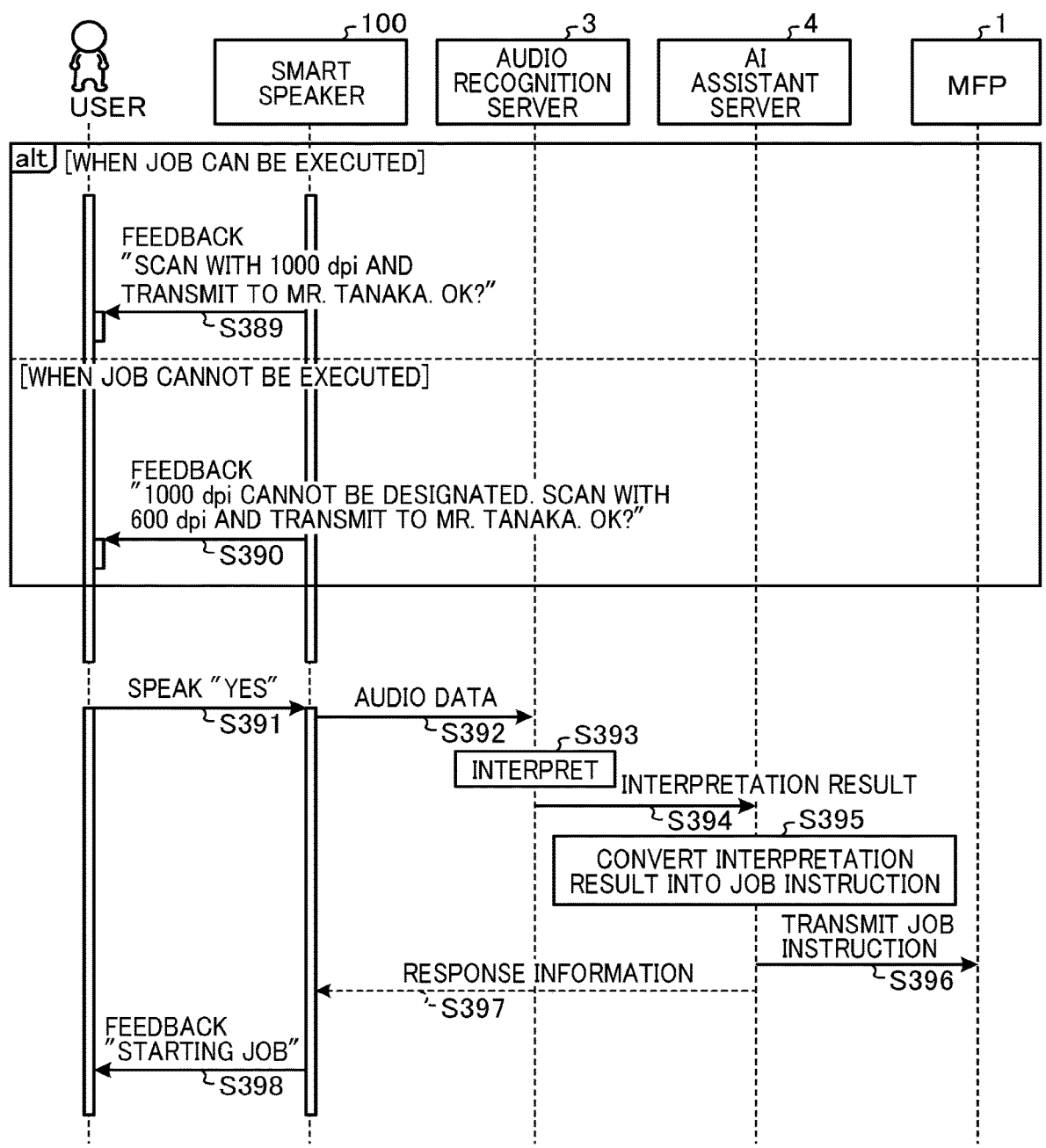
FIG. 32 is a sequence diagram illustrating a flow of operation when a job can be executed and when a job cannot be executed using apparatus capability of an MFP according to the second embodiment.

Further, the execution instruction unit 54 implemented by the management program of the AI assistant server 4 instructs the MFP 1 to cancel the job (step S367). Adjustment of Parameter based on Apparatus Capability of MFP:

Hereinafter, a description is given of an example of implementing an interactive operation for executing a job based on apparatus capability of the MFP 1 with reference to sequence diagrams of FIGS. 31 and 32. FIG. 31 is a sequence diagram illustrating a flow of an operation of determining whether the MFP 1 has the apparatus capability required for a job instructed by a user. FIG. 32 is a sequence diagram illustrating a flow of operation when the job can be executed and when the job cannot be executed using the apparatus capability of the MFP 1.

In the sequence diagram illustrated in FIG. 31, if a user instructs "activate" (step S371) to the smart speaker 100, the apparatus information acquisition unit 163 implemented by the management program of the AI assistant server 4 transmits, for example, an inquiry of a processable resolution to the MFP 1 (step S372: capability acquisition).

In response to receiving this inquiry (step S372), the MFP 1 transmits the processable resolution, such as "200 dpi to 600 dpi," to the AI assistant server 4 (step S373). Then, the AI assistant server 4 transmits the information indicating the processable resolution of the MFP 1 to the smart speaker 100. As a result, the resolution of the MFP 1 can be recognized at the smart speaker 100.

Further, the apparatus information acquisition unit 163 of the AI assistant server 4 can acquire the processing capability information from the MFP 1 at a given timing after the communication with the MFP 1 has been established. Further, when registering the smart speaker 100 and the MFP 1 in the management table of the association DB 102, the processing capability information of the MFP 1 can be acquired and registered. Further, the apparatus information acquisition unit 163 of the AI assistant server 4 can be configured to acquire the processing capability information periodically from the MFP 1. Further, the apparatus information acquisition unit 163 can be configured to acquire the processing capability information from the MFP 1 at a timing when the audio recognition server 3 receives the activation of the audio assistant program from the smart speaker 100, or at a timing when the job execution instruction is received from the smart speaker 100.

The acquired processing capability information can be stored in the storage unit such as the HDD 44 of the AI assistant server 4, or can be stored in the management table of the association DB 102 in association with the MFP 1.

Further, the processing capability information can be acquired by another program, and then the apparatus information acquisition unit 163 can acquire the processing capability information from another program, in which the apparatus information acquisition unit 163 acquires the processing capability information of the MFP 1 indirectly.

Further, the information acquired by the apparatus information acquisition unit 163 from the MFP 1 is not limited to the processing capability information. For example, the apparatus information acquisition unit 163 can acquire information on the type of job and the job setting conditions executable by the MFP 1, such as type and version of application installed on the MFP 1, printing speed, processable file format, connection state of optional devices including a finisher, or the like.

If the user has activated the operation audio processing program of the smart speaker 100 and then the user speaks, for example, an audio of "activate" (an instruction performed by audio input), the communication control unit 152 of the smart speaker 100 transmits audio data of "activate" to the audio recognition server 3. Then, the audio data of "activate" is converted into text data by the audio recognition server 3, and an interpretation result of the text data is notified to the AI assistant server 4. Then, the execution determination unit 164 of the AI assistant server 4 determines whether the required parameter is satisfied or sufficient.

At this stage, since the job type is not yet designated and the required parameter is not satisfied, the AI assistant server 4 transmits response information for demanding or prompting an input of the job type, such as "copy or scan?" to the smart speaker 100.

Then, the feedback unit 153 of the smart speaker 100 outputs an audio feedback of "copy or scan?" for demanding or prompting the user to enter or input a job instruction (step S374).

Then, if the user speaks "scan" (step S375), the smart speaker 100 transmits audio data of "scan" to the audio recognition server 3 (step S376)

Then, the audio recognition server 3 converts the audio data of "scan" into text data using the operation audio conversion program and interprets the text data (step S377).

Then, the interpretation unit 377 of the audio recognition server 3 generates an interpretation result setting the Intent of "Scan_Execute" and transmits the interpretation result to the management program of the AI assistant server 4 (step S378).

Then, the execution determination unit 164 of the AI assistant server 4 determines whether the required parameter is satisfied or sufficient based on the received interpretation result (step S379), in which the scan instruction alone lacks the required parameter.

Therefore, the execution determination unit 164 generates response information of "input setting value" and transmits the response information to the smart speaker 100 (step S380).

Based on this response information, the feedback unit 153 of the smart speaker 100 outputs an input insufficient feedback of "input setting value" (step S381).

Then, if the user speaks "to Mr. Tanaka with 1000 dpi" (step S382) in response to receiving the input insufficient feedback in step S381, the smart speaker 100 transmits audio data of "to Mr. Tanaka with 1000 dpi" to the audio recognition server 3 (step S383).

Then, the audio data of "to Mr. Tanaka with 1000 dpi" is converted into text data and interpreted by the audio recognition server 3 (step S384).

Then, the interpretation unit 157 of the audio recognition server 3 generates an interpretation result setting the Intent of "Scan_Execute" and the Parameter of "resolution=1000 dpi, destination=Tanaka," and transmits the interpretation result to the management program of the AI assistant server 4 (step S385).

Then, the execution determination unit 164 implemented by the management program of the AI assistant server 4 refers to the parameter included in the interpretation result and the processing capability information of the MFP 1 acquired in advance by the apparatus information acquisition unit 163 to determine whether the job can be executed at the MFP 1, which is the communication target apparatus, using the settings designated by the user (step S386).

Then, the execution determination unit 164 generates response information corresponding to a determination result, and the notification unit 165 notifies the response information to the smart speaker 100 (step S387).

Then, a feedback corresponding to the determination result is performed via the smart speaker 100 (step S388).

Specifically, in the sequence diagram illustrated in FIG. 32, if the MFP 1 has the capability of processing the resolution of 1000 dpi, the execution determination unit 164 generates response information of "Scan with 1000 dpi and transmit to Mr. Tanaka. OK?" Then, the notification unit 165 transmits the response information to the smart speaker 100.

Then, the feedback unit 153 of the smart speaker 100 outputs an input confirmation feedback of "Scan with 1000 dpi and transmit to Mr. Tanaka. OK?" (step S389).

If the user speaks "YES" to the input confirmation feedback (step S391), the smart speaker 100 transmits audio data of "YES" to the audio recognition server 3 (step S392).

Then, the interpretation unit 157 of the audio recognition server 3 converts the audio data of "YES" into text data and interprets the text data (steps S393).

Then, the interpretation unit 157 generates an interpretation result setting the Intent of "Scan_Execute" and the Parameter of "resolution=1000, destination=Tanaka," and then transmits the interpretation result to the management program of the AI assistant server 4 (step S394).

Then, the interpretation result conversion unit 161 implemented by the management program of the AI assistant server 4 converts the interpretation result into a job instruction (step S395).

Then, the execution instruction unit 162 implemented by the management program transmits the job instruction of "transmit image scanned with 1000 dpi to Mr. Tanaka" to the MFP 1 (step S396). As a result, the designated job is executed in the MFP 1.

Then, the execution determination unit 164 of the AI assistant server 4 generates response information of "starting job" indicating that an execution of the instructed job has been started, and the notification unit 165 transmits the response information to the smart speaker 100 (step S397).

Then, the feedback unit 153 of the smart speaker 100 outputs an input confirmation feedback of "starting job" to the user (step S398).

On the other hand, if the resolution of 600 dpi is the upper limit of processing capability of the MFP 1, the image processing using the resolution of 1000 dpi designated by the user cannot be executed or performed in the MFP 1. Specifically, based on the processing capability information of the MFP 1 acquired in advance by the apparatus information acquisition unit 163, the execution determination unit 164 of the AI assistant server 4 determines that the image processing designated by the user cannot be executed or performed at the MFP 1.

In this case, the execution determination unit 164 generates response information of "1000 dpi cannot be designated. Scanning is performed with 600 dpi and then transmitted to Mr. Tanaka. OK?" (step S390). Then, the notification unit 165 transmits the response information to the smart speaker 100. With this configuration, the smart speaker 100 outputs a confirmation feedback of "1000 dpi cannot be designated. Scanning is performed with 600 dpi and then transmitted to Mr. Tanaka. OK?" to the user.

More specifically, the execution determination unit 164 of the AI assistant server 4 can select the function or processing capability value that is the closest to the function or processing capability value designated by the user, within a range of processing capability of the MFP 1. For example, if the resolution processable by the MFP 1 is in a range of 200 to 600 dpi, the execution determination unit 164 selects 600 dpi closest to 1000 dpi instructed by the user. Then, the feedback unit 153 of the smart speaker 100 outputs the capability or value selected by the execution determination unit 57 as a confirmation feedback.

That is, if the execution determination unit 164 determines that the job, indicated by the Intent and Parameter included in the interpretation result corresponding to the user instruction, cannot be executed or performed at the MFP 1, the execution determination unit 164 selects the setting condition that can be executed at the MFP based on the processing capability information of the MFP 1. Then, the response information is generated based on the selected setting condition.

Further, the management program of the AI assistant server 4 acquires the device ID (audio-input source device ID) identifying the smart speaker 100 used as the audio-input source in addition to the interpretation result received from the interpretation unit 157 implemented by the operation audio conversion program of the audio recognition server 3. Therefore, the execution determination unit 164 can refer to the association DB 102 to identify the MFP 1 associated with the audio-input source device ID identifying the smart speaker 100, and then can determine whether the job execution can be performed by referring to the processing capability of the identified MFP 1.

Further, if the user instructs the execution of function that is not provided in the identified MFP 1, the execution determination unit 164 can transmit response information indicating that the job cannot be executed to the smart speaker 100.

Further, the execution determination unit 164 can transmit information related to the selected setting condition to the operation audio conversion program of the audio recognition server 3.

If the user speaks "YES" (step S391) in response to receiving the confirmation feedback in step S390, the smart speaker 100 transmits audio data of "YES" to the audio recognition server 3 (step S392)

Then, the text conversion unit 156 of the audio recognition server 3 converts the audio data of "YES" into text data and interprets the text data (step S393).

Then, the interpretation unit 157 of the audio recognition server 3 generates an interpretation result setting the Intent of "Scan_Execute" and the Parameter of "resolution=600, destination=Tanaka" based on the text data, and transmits the interpretation result to the management program of the AI assistant server 4 (step S394).

Then, the interpretation result conversion unit 161 implemented by the management program of the AI assistant server 4 converts the interpretation result into a job execution instruction of the MFP 1 (step S395).

Then, the execution instruction unit 162 implemented by the management program of the AI assistant server 4 transmits the job execution instruction to the MFP 1 (step S396). As a result, even if the instruction of the user deviates from the processing capability of the MFP 1 and thereby the job designated by the initial instruction of the user cannot be executed, the content of the initial instruction can be automatically changed to another instruction that can be executed within the processing capability of the MFP 1, and then the job instructed by the user can be executed.

In the MFP 1, by referring to the address book stored in the storage unit such as the HDD 13 in the MFP 1, the transmission destination information corresponding to "Tanaka" is searched. The transmission destination information includes information, such as e-mail address, facsimile number, or the like. If the transmission destination information corresponding to "Tanaka" exists in the address book, the image data scanned by the MFP 1 can be transmitted to the transmission destination.

Further, the transmission destination information can be displayed using the operation unit 16 of the MFP 1 for demanding or prompting the user to confirm whether there is an error in the transmission destination, and then the scanned image data can be transmitted to the transmission destination when the user operates an OK button. Further, if there are two or more transmission destinations exist for "Tanaka" in the address book, all of the relevant transmission destination information can be displayed using the operation unit 16 of the MFP 1 and then selected by the user.

Figure 33:
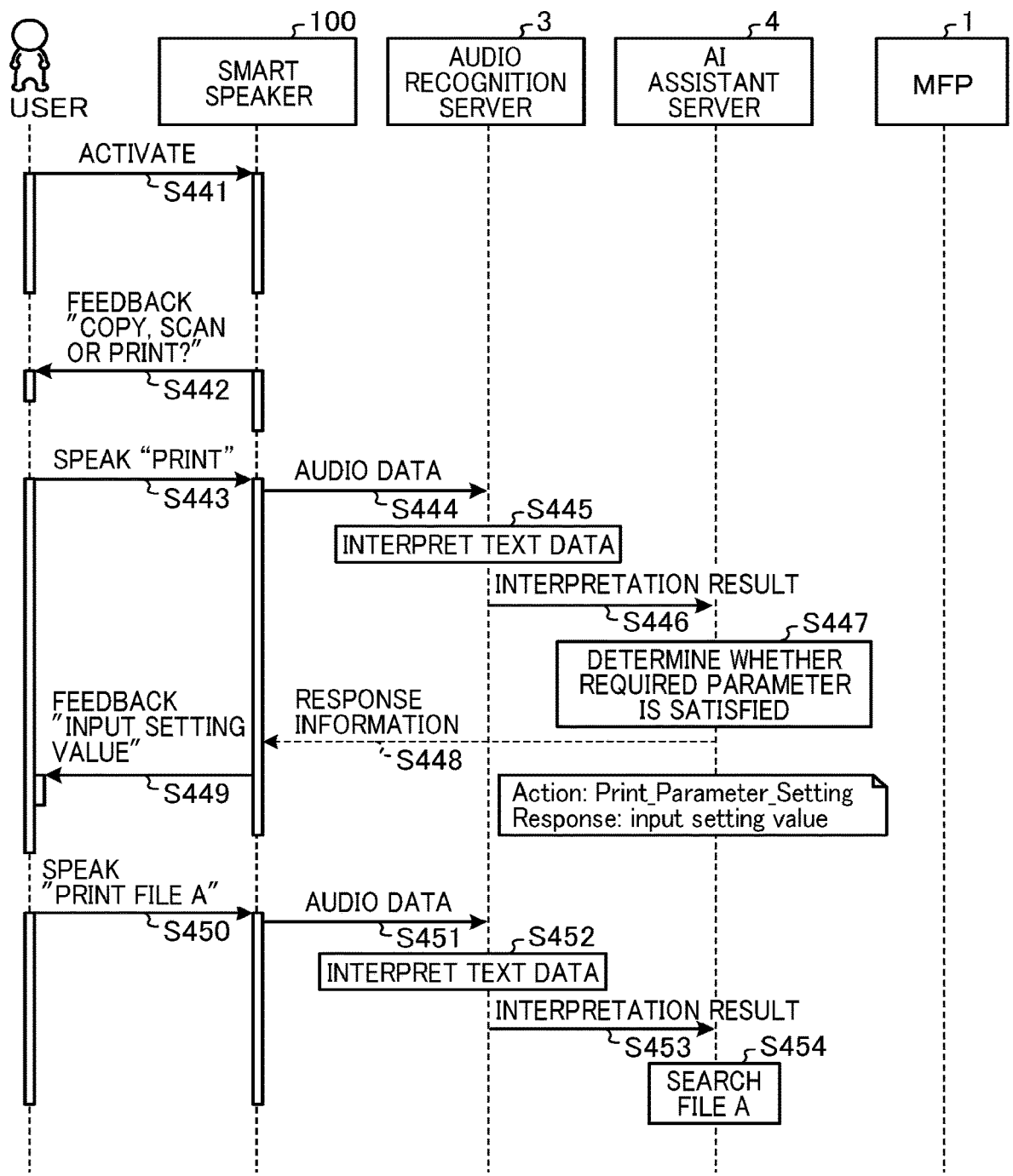
FIG. 33 is a sequence diagram illustrating an operation of searching a file designated by a user according to the second embodiment.
Figure 34:
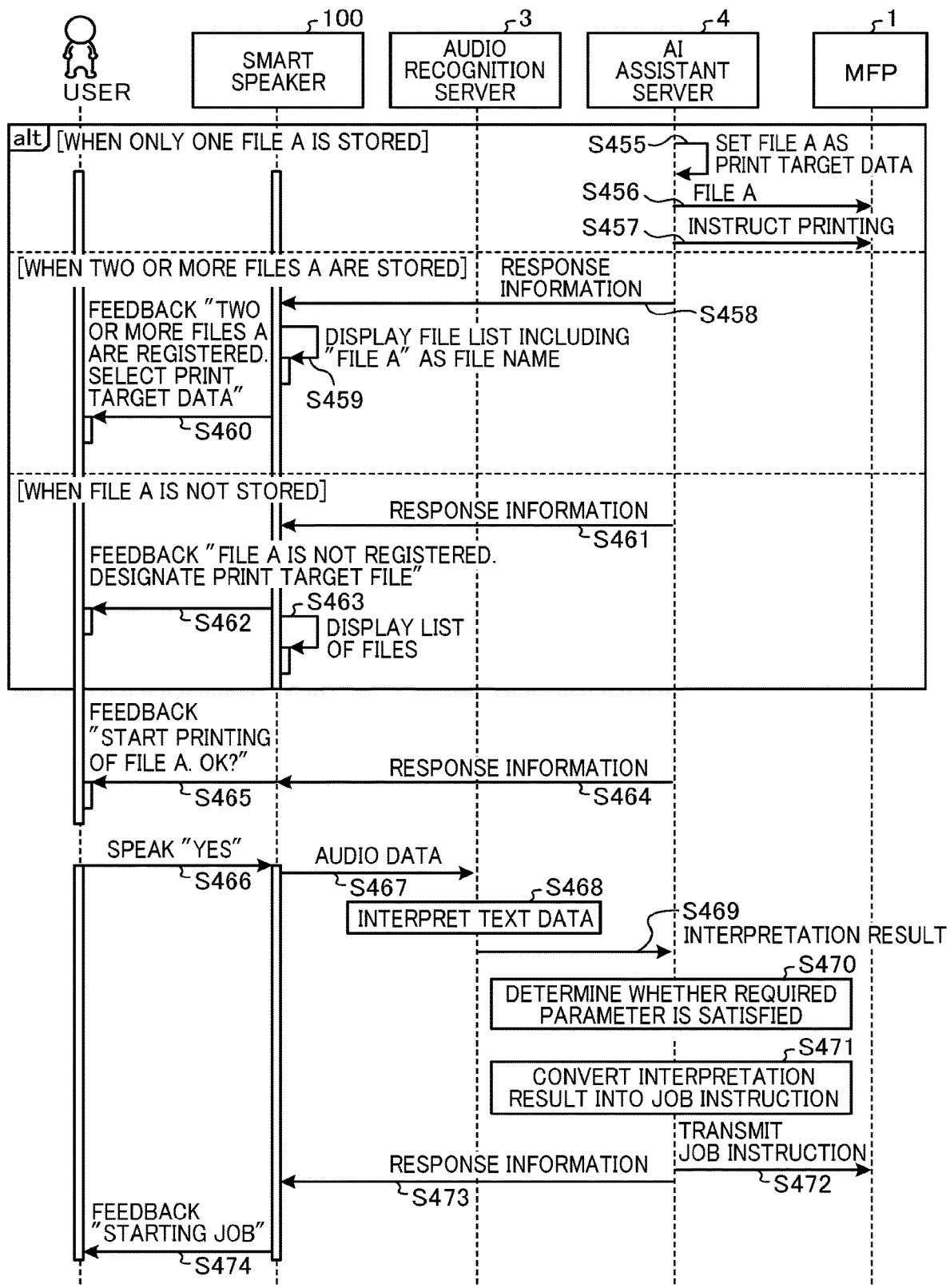
FIG. 34 is a sequence diagram illustrating an operation of printing a file designated by a user according to the second embodiment.

Operation of Searching and Printing Print Target:

Hereinafter, a description is given of an operation of printing a file designated by a user using a sequence diagram of FIGS. 33 and 34. FIG. 33 is a sequence diagram illustrating an operation of searching a file designated by the user. FIG. 34 is a sequence diagram illustrating an operation of printing the file designated by the user.

At first, in the sequence diagram of FIG. 33, after the operation audio processing program of the smart speaker 100 is activated, a user instructs, for example, an activation of the audio assistant program by performing, for example, an audio input of "activate" (step S441). Then, the communication control unit 152 of the smart speaker 100 transmits audio data of "activate" to the audio recognition server 3. Then, the text conversion unit 156 of the audio recognition server 3 converts the audio data of "activate" into text data, converts the text data into the intent and parameter, and transmits the intent and parameter to the management program of the AI assistant server 4.

Then, the execution determination unit 164 implemented by the management program of the AI assistant server 4 determines whether the required parameter is satisfied or sufficient. When the audio data of "activate" is input, for example, the required parameter such as the job type is not yet satisfied, and thereby the execution determination unit 164 generates response information of "copy, scan or print?" for demanding or prompting the user to enter or input a job instruction. Then, the notification unit 165 transmits the response information to the smart speaker 100.

Then, the feedback unit 153 of the smart speaker 100 outputs an audio feedback of "copy, scan or print?" for demanding or prompting the user to enter or input the job instruction (step S442).

Then, if the user speaks "print" (step S443), the smart speaker 100 transmits audio data of "print" to the audio recognition server 3 (step S444), and then the audio data of "print" is converted into text data by the text conversion unit 156 implemented by the operation audio conversion program of the audio recognition server 3, and interpreted by the interpretation unit 157 (step S445).

Then, the interpretation unit 157 generates an interpretation result setting the Intent of "Print_Execute," and then transmits the interpretation result to the management program of the AI assistant server 4 (step S446).

Then, the execution determination unit 164 implemented by the management program of the AI assistant server 4 determines whether the required parameter is satisfied or sufficient based on the received interpretation result (step S447).

Then, since the "print" instruction alone lacks the required parameter, the execution determination unit 164 generates response information of "input setting value" and transmits the response information to the smart speaker 100 via the notification unit 165 (step S448).

Based on this response information, the feedback unit 153 of the smart speaker 100 outputs an input insufficient feedback of "input setting value" (step S449).

Then, if the user speaks "print file A" to the input insufficient feedback (step S450), audio data of "print file A" is transmitted to the audio recognition server 3 (step S451).

Then, the audio recognition server 3 convers the audio data into text data and interprets the text the data (step S452).

Then, the audio recognition server 3 generates an interpretation result setting the Intent of "Print_Exetute" and the Parameter of "print target=file A" and transmits the interpretation result to the AI assistant server 4 (step S453).

Then, the search unit 167 implemented by the management program of the AI assistant server 4 searches the file A from the management DB 101 based on the parameter included in the interpretation result (step S454).

The search target (e.g., search area) to be searched may be not limited to the management DB 101, but can be a database connected to a cloud service apparatus, such as the audio recognition server 3 and/or the AI assistant server 4, via a network. Further, in addition to searching a file name containing a character string included in the parameter, the search unit 167 can search a file containing the character string, included in the parameter, in the file data. Further, the search unit 167 can search a file based on attributes of file, such as file creation date and file creator.

When Only One File is Stored:

If the above described searching is performed when only one file A is recorded or stored in the management DB 101, the search unit 167 of the AI assistant server 4 sets the file A as print target data (step S455) in the sequence diagram illustrated in FIG. 34.

Then, the execution instruction unit 162 of the AI assistant server 4 transmits the print target data of the file A to the MFP 1 (step S456) and instructs the MFP 1 to print the print target data of the file A (step S457). As a result, the MFP 1 executes printing of the print target data of the file A.

When Two or More Files are Stored:

On the other hand, if two or more files A are searched from the management DB 101, that is, if a plurality of files is searched as a result of searching by the search unit 167, the execution determination unit 164 of the AI assistant server 4 generates response information of "two or more files A are registered. Select print target data."

Then, the notification unit 165 transmits the response information to the smart speaker 100 (step S458). In step S458, the response information can include information identifying each file, such as file creation date, file creator, and thumbnail image.

Then, the feedback unit 153 of the smart speaker 100 displays a list of searched files on the touch panel 27 based on the response information (step S459).

Further, the feedback unit 153 outputs an input insufficient feedback of "two or more files A are registered. Select print target file" (step S460).

Further, to facilitate the selection of a desired file from the searched files displayed as the file list, the file creation and file creator can be fed back using audio, or the file creation and file creator can be displayed on the touch panel 27. Further, the thumbnail images can be displayed as the file list to demand or prompt the user to select the desired thumbnail image.

Further, when the file A is selected, the desired file can be selected by speaking information related to the file, such as file creation date or file creator, or the desired file can be selected by a touching operation on the file list displayed on the touch panel 27.

When File is not Stored:

Further, if the file A designated by the user is not stored in the management DB 101 (the search unit 167 cannot search the file A), the execution determination unit 164 of the AI assistant server generates response information of "file A is not registered in memory." Further, the execution determination unit 164 acquires list information of files stored in the management DB 101 from the management DB 101, and then adds the list information of files in the response information. Then, the notification unit 165 transmits the response information to the smart speaker 100 (step S461).

Then, the feedback unit 153 of the smart speaker 100 outputs a feedback of "file A is not registered. Designate print target file" based on the response information (step S462).

Concurrently, the feedback unit 153 displays a list of files stored in the management DB 101 on the touch panel 27 based on the list information of files included in the response information (step S463). Then, the user selects a file to be printed based on the list of files to designate the print target file.

Printing of Selected File:

Further, if only one file A exists in the management DB 101 and the user instructs to print the file A, the execution determination unit 164 generates response information of "start printing of file A. OK?" and transmits the response information to the smart speaker 100 (step S464).

Then, the feedback unit 153 of the smart speaker 100 outputs a confirmation feedback of "start printing of file A. OK?" (step S465).

If the user speaks "YES" to the confirmation feedback (step S466), the audio data of "YES" is transmitted from the smart speaker 100 to the audio recognition server 3 (step S467).

Then, the text conversion unit 156 of the audio recognition server 3 converts the audio data into text data, and the interpretation unit 157 interprets the text data converted from the audio data (step S468).

Then, the interpretation unit 157 generates an interpretation result setting the Intent of "Print_Execute" and the Parameter of "print target=file A, file identification information X," and then transmits the interpretation result to the management program of the AI assistant server 4 (step S469). The file identification information X is added as information identifying the file A selected by the user when two or more files A exist in the management DB 101, and the file identification information X includes, for example, information of file creation date and/or file creator, or the like.

Then, the execution determination unit 164 implemented by the management program of the AI assistant server 4 determines whether the required parameter is satisfied or sufficient based on the interpretation result (step S470).

In this case, since the required parameters have been set sufficiently or completely, the interpretation result conversion unit 161 converts the interpretation result into a job instruction of the MFP 1 (step S471).

Then, the execution instruction unit 162 transmits the file A selected by the user to the MFP 1 and instructs the MFP 1 to execute the printing of the file A (step S472). As a result, the MFP 1 executes the printing of the file A desired by the user.

When the print execution instruction is transmitted to the MFP 1 (step S472), the notification unit 165 of the AI assistant server 4 transmits response information of "starting job" indicating that the printing has been started to the smart speaker 100 (step S473).

Then, the feedback unit 153 of the smart speaker 100 outputs a feedback of "starting job," and the user is notified that the printing has been started (step S474).

In the above description, the search unit 167 of the AI assistant server 4 searches the print target data (e.g., file data) and transmits the searched file data to the MFP 1, but not limited thereto. For example, the search unit 167 of the AI assistant server 4 can transmit a job instruction setting the "print target=file A" to the MFP 1, and the file A can be searched in the HDD 13 or the management DB 101 in the MFP 1, and printed. Further, if two or more files are searched and exist, the file list can be displayed on a display of the MFP 1, and the user can select one or more files from the file list.

As to the above described second embodiment, the audio-based operation system installs the operation audio processing program as a platform application program on the smart speaker 100, and the platform application program is executed to communicate with the cloud service apparatus. When the user speaks to the microphone 29 provided for the smart speaker 100, the cloud service apparatus analyzes the content of the user-spoken content and instructs the MFP 1 to perform the operation instructed by the user (audio input operation).

With this configuration, a complicated operation can be instructed using the audio input without operating a graphical user interface (GUI) displayed on the touch panel 27 or the like. Therefore, even if a user is familiar with the operation using graphical user interfaces (GUIs) on of the touch panel, the input operation can be performed further quickly and easily. Further, even if some persons, such as elder persons or other users, inexperienced in the operation using the GUI of the touch panel are to perform the input operation, the operation desired by the user, such as complicated network setting, advanced job setting and/or installing of a new application can be quickly and easily performed using the interactive operation assistance or support of the above described system.

Further, since the user intention is analyzed based on the text data of the user-spoken content, the AI assistant server 4 can determine the processing content based on the user-spoken content.

Third Embodiment

Figure 35:
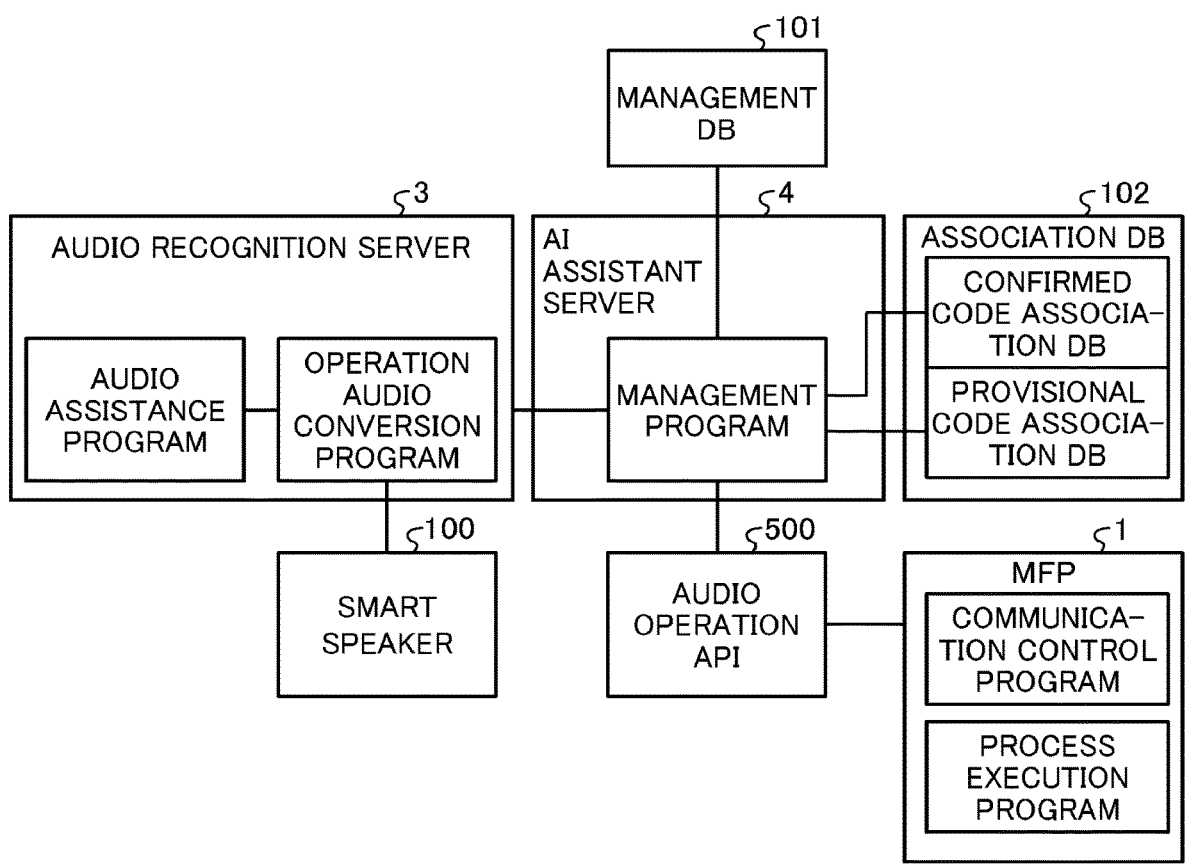
FIG. 35 is an example system configuration of an audio-based operation system according to a third embodiment of the present disclosure.

Hereinafter, a description is given of an audio-based operation system of a third embodiment with reference to FIG. 35. The third embodiment describes an operation of registering the smart speaker 100 and the MFP 1 in association with each other to the association DB 102. FIG. 35 illustrates an example system configuration of an audio-based operation system according to the third embodiment. As indicated in FIG. 35, the audio-based operation system of the third embodiment includes, for example, the MFP 1, the audio recognition server 3, the AI assistant server 4, the smart speaker 100, the management DB 101, the association DB 102, and an audio operation application interface (API) 500, used for the audio-based operation or audio-use operation.

As illustrated in FIG. 35, the association DB 102 stores, for example, a confirmed code association DB and a provisional code association DB. Further, the MFP 1 is installed with a communication control program that is operated when associating with the smart speaker 100, and a process execution program.

Figure 36:
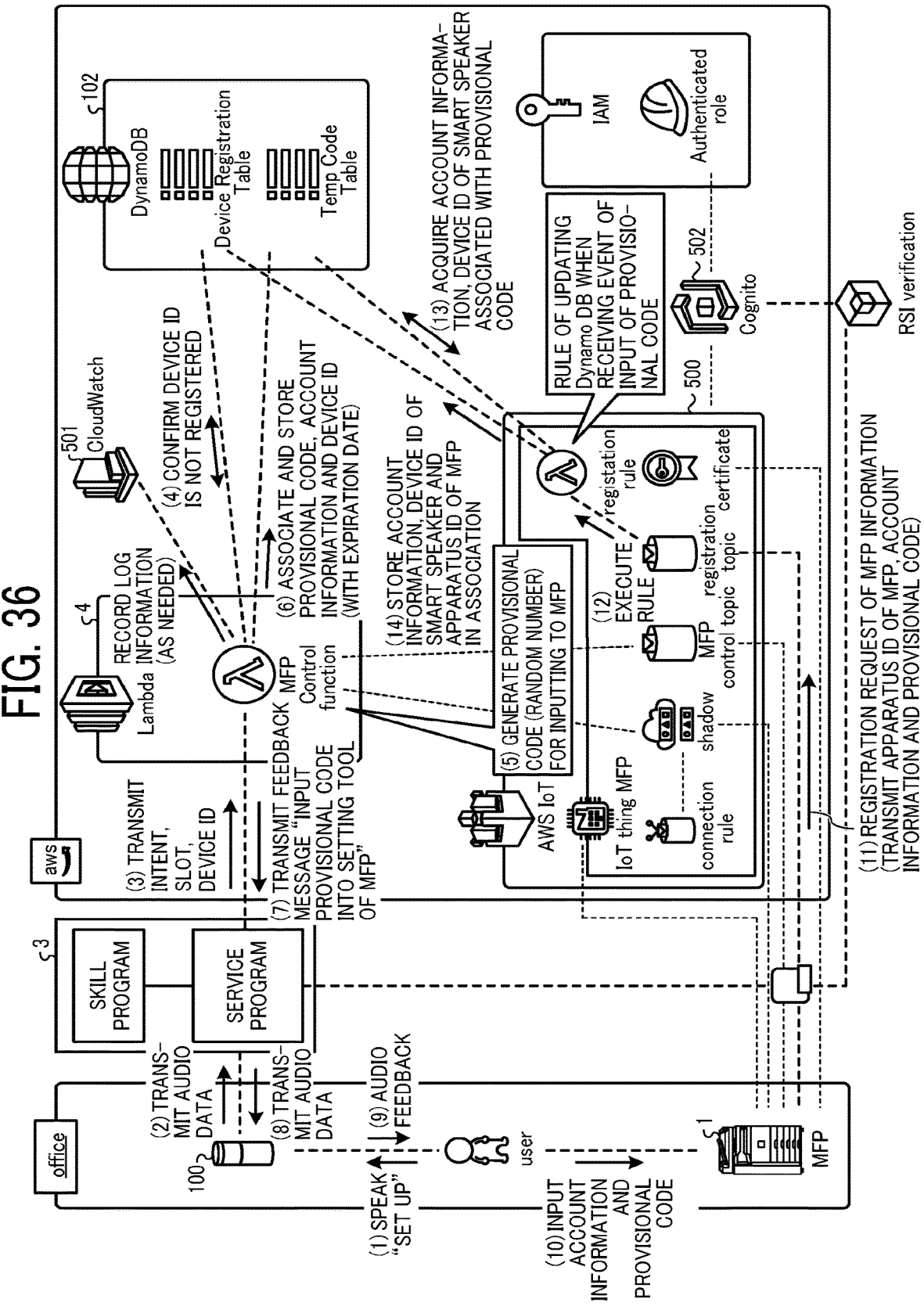
FIG. 36 is an example system configuration of a specific audio-based operation system according to the third embodiment.

FIG. 36 is an example system configuration of the audio-based operation system of the third embodiment. FIG. 36 is an example of the audio-based operation system of the third embodiment using a cloud service, such as Amazon Web Services (registered trademark). Hereinafter, the cloud service is described using Amazon Web Services (registered trademark) as indicated in FIG. 36, but other cloud services can be used for the audio-based operation system of the third embodiment.

In FIG. 36, the audio assistant program of the audio recognition server 3 corresponds to a skill program of a manufacturer providing the MFP 1 and the smart speaker 100. Further, the operation audio conversion program of the audio recognition server 3 corresponds to a service program. Further, the AI assistant server 4 is implemented, for example, using Lambda, which is a platform that runs applications on the cloud of Amazon Web Services (registered trademark). Further, the association DB 102 is implemented, for example, using Dynamo DB, which is a database on the cloud of Amazon Web services (registered trademark).

Further, the audio operation API 500 is implemented, for example, using the Internet of Things (IoT) of Amazon Web Services (registered trademark). The IoT of Amazon Web services (registered trademark) allows secured bi-directional communication between Amazon Web Services (registered trademarks), and the speaker 100 and MFP 1 connected via the Internet.

Further, Amazon Web Services (registered trademark) includes, for example, CloudWatch 501 that monitors Amazon Web Services (registered trademarks) and applications running on Amazon Web Services (registered trademarks) in real time. Further, Amazon Web service (registered trademark) includes, for example, Cognito 502 that controls or manages adding of user sign-up and user authentication function on mobile applications or web applications.

Association Between Smart Speaker and MFP:

Hereinafter, a description is given of an outline of an association operation between the smart speaker 100 and the MFP 1 with reference to FIG. 36.

(1), (2): At first, when a user speaks "set up" to the smart speaker 100, audio data of "set up" is transmitted to the audio recognition server 3 from the smart speaker 100.

(3): The service program (operation audio conversion program) of the audio recognition server 3 interprets the received audio data by converting the audio data into text data, and then transmits the intent, the slot, and the device ID of the smart speaker 100 to Lambda (AI assistant server 4), which is used as the platform of the Amazon Web Services (registered trademark).

(4), (5): Lambda inquires Dynamo DB (association DB 102) based on the device ID of the smart speaker 100. If the device ID of the smart speaker 100 is not yet registered in Dynamo DB (association DB 102), Lambda generates a provisional code (e.g., random number) to be input to the MFP 1.

(6): Then, Lambda associates and stores the generated provisional code, the user account information and the device ID of the smart speaker 100 in Dynamo DB (provisional code association DB of the association DB 102) by adding expiration date information.

(7), (8): Then, Lambda uses the notification unit 165 of the management program to generate data to be used as an audio feedback message, such as "input provisional code into setting tool of MFP," and transmits the generated data to the smart speaker 100 via the audio recognition server 3.

(9): Then, the smart speaker 100 outputs (speaks) the audio feedback, such as "input provisional code into setting tool of MFP."

(10): In response to receiving the audio feedback performed in (9), the user inputs the user account information and the feedbacked provisional code into the MFP 1.

(11): The MFP 1 assigns the apparatus ID of the MFP 1 to the user account information and the provisional code input by the user, and transmits the apparatus ID of the MFP 1, the user account information and the provisional code to the IoT (audio operation API 500) of Amazon Web Services (registered trademark) to request for registration of information of the MFP 1.

(12), (13): In response to receiving the registration request of the information of the MFP 1, the IoT (audio operation API 500) of Amazon Web Services (registered trademark) acquires, from Dynamo DB (provisional code DB of association DB 102), the user account information, the provisional code and the device ID of the smart speaker 100 stored in association with each other in Dynamo DB.

(14): The IoT (audio operation API 500) of Amazon Web Services (registered trademark) compares "user account information and provisional code input by the user" received from the MFP 1 and "user account information and provisional code" acquired from Dynamo DB (provisional code DB of the association DB 102). If the "user account information and provisional code" received from the MFP 1 and the "user account information and provisional code" acquired from Dynamo DB match, the IoT (audio operation API 500) stores the user account information, the device ID of the smart speaker 100 used by the user, and the apparatus ID of the MFP 1 operated by the smart speaker 100 in Dynamo DB (confirmed code association DB of association DB 102) in association with each other. With this configuration, the smart speaker 100 used by the user and the MFP 1 operated using an audio input to the smart speaker 100 can be associated and controlled with a relationship of one-to-one.

Hereinafter, a description is given of the association operation in detail with reference to the system configuration of FIG. 35, and the sequence diagrams of FIGS. 37 to 39.

Figure 37:
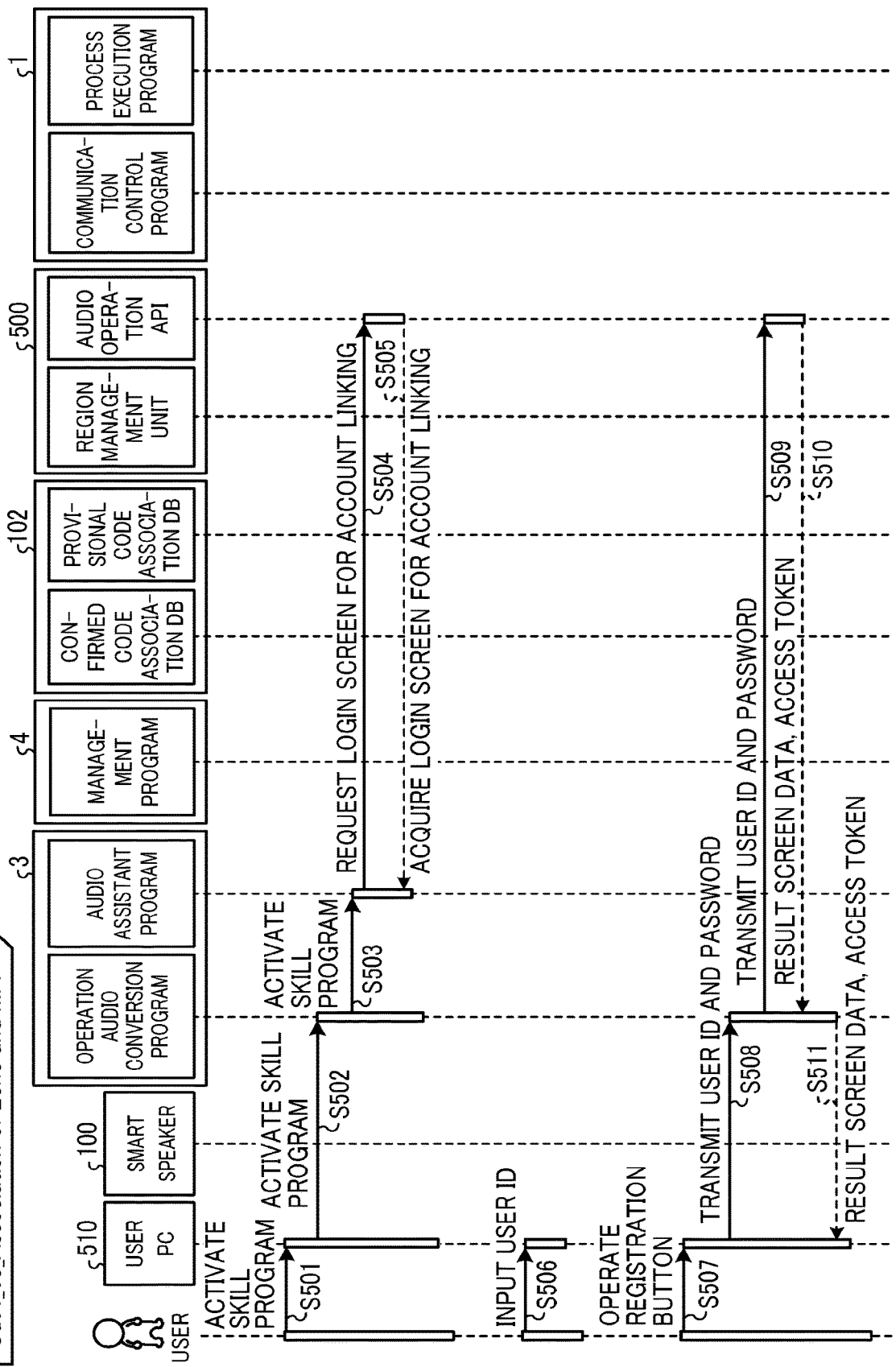
FIG. 37 is a sequence diagram illustrating a flow of an operation of a flow of account linking operation in an audio-based operation system according to the third embodiment.

Account Linking Operation:

FIG. 37 is a sequence diagram of an account linking operation. By performing the account linking indicated in FIG. 37, an account required for a login of a control target apparatus, such as the MFP 1, can be associated with one or more services provided by the cloud service (e.g., audio recognition server 3 and AI assistant server 4). The account linking indicated in FIG. 37 can be omitted if the account linking is not to be performed.

In the sequence diagram of FIG. 37, a user activates the operation audio processing program installed on a personal computer (user PC 510) or a mobile terminal to activate the audio assistant program (skill program) of the audio recognition server 3 (steps S501, S502, S503). With this configuration, the audio assistant program of the audio recognition server 3 is activated.

Then, the CPU 31 of the audio recognition server 3 acquires a login screen for the account linking from the audio operation API 500 based on the activated audio assistant program (steps S504, S505). As indicated in FIG. 36, the audio operation API 500 is a API group at the server, related to the audio-based operation function. The audio operation API 500 provides an account linking function for the operation audio conversion program, and one or more application interfaces (APIs) for associating the smart speaker 100 and the MFP 1.

Further, it is assumed that the user has an account in advance to use one or more services provided by a manufacturer of the control target apparatus, such as the MFP 1. The account represents information associating the user ID and the password identifying the user, and is managed or controlled by one or more servers of a service provider, such as manufacturer or the like.

Then, the acquired account linking login screen is displayed on a display of the user PC 510 in response to receiving relevant data via the audio assistant program of the audio recognition server 3 from the audio operation API 500.

Then, the user inputs or enters the user ID and the password to the account linking login screen displayed on the user PC 510 (step S506), and then operates an audio conversion program registration button (step S507). Then, the user PC 510 transmits the user ID and the password to the audio recognition server 3 (step S508).

Then, the audio recognition server 3 stores the input user ID and password in a storage unit, such as the HDD 34 that is accessible by the audio assistant program. The cloud service apparatus, configured by the audio recognition server 3 and the AI assistant server 4, can control or manage the account of service provided by the cloud service apparatus and the account of service provided by a manufacturer by associating these information. Therefore, by storing the user ID and the password in the audio recognition server 3, the audio recognition server 3 can use the one or more services provided by the manufacturer via the audio assistant program.

Then, the audio recognition server 3 transmits the user ID and password to the audio operation API 500 (step S509).

Then, the audio operation API 500 performs the account linking based on the user ID, and returns to the user PC 510, for example, result screen data with an access token, such as the hashed user ID, via the audio recognition server 3 (steps S510, S511).

To ensure or enhance the security when the account linking is not performed, a configuration of acquiring an access token by inputting the user ID can be used. In this case, when the skill program is activated, a screen for inputting the user ID is transmitted to the user PC 510 from the audio operation API 500 and displayed on the user PC 510. Then, the user ID input at the user PC 510 is transmitted to the audio operation API 500, converted to an access token, and then the access token is transmitted to the user PC 510. In this processing, the user ID may not be the ID of the account of the service provided by the manufacturer, but can be an arbitrary character string.

Figure 38B:
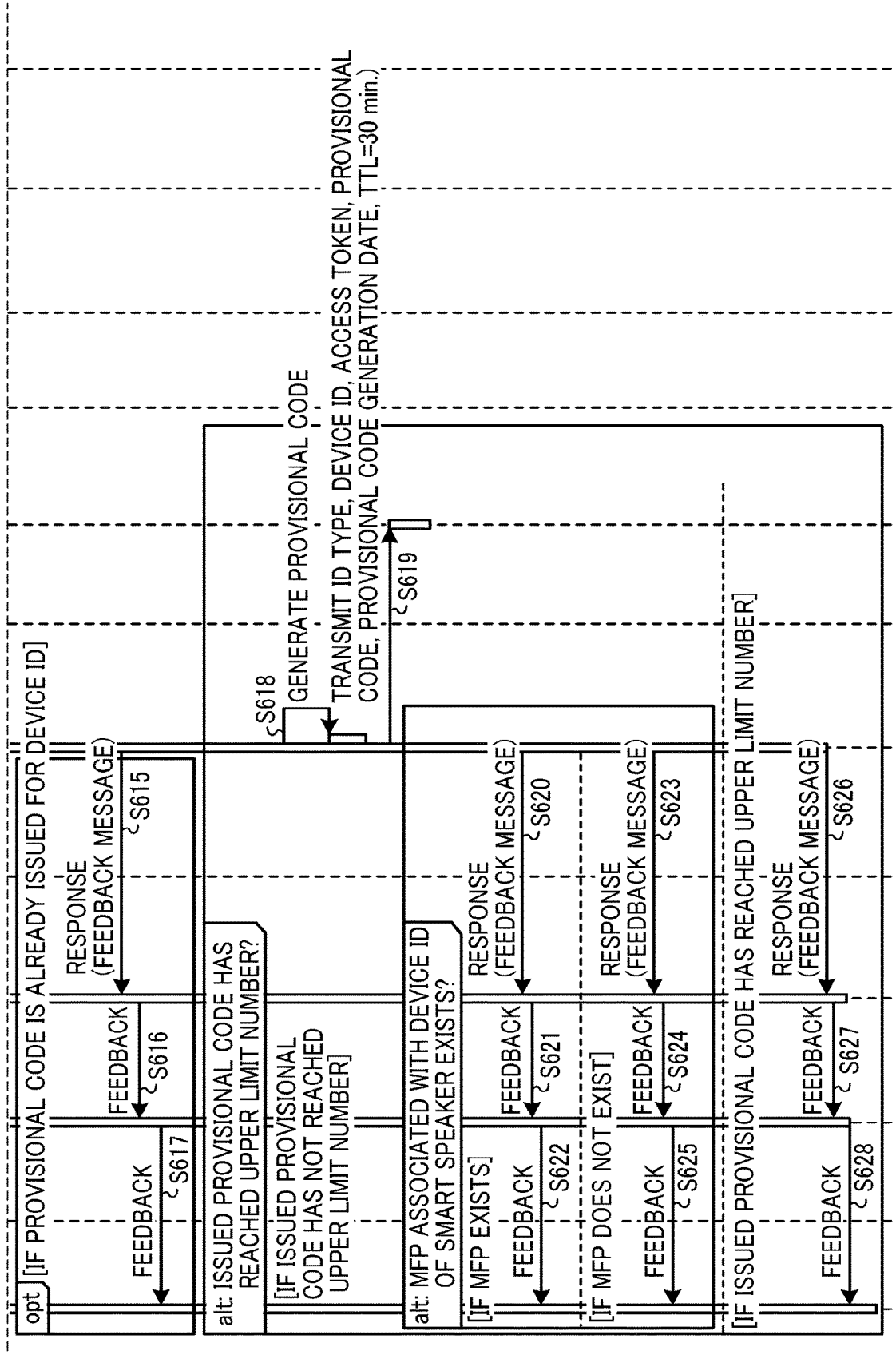

Flow of First Half of Association Operation Between Smart Speaker and MFP:

Hereinafter, a description is given of a flow of a first half of the association operation between the smart speaker 100 and the MFP 1 with reference to the sequence diagram indicated in FIGS. 38A and 38B (FIG. 38).

At first, a user speaks a setup request to the smart speaker 100 (step S601). For example, the user speaks a given calling name in accordance with the audio assistant program.

Then, audio data, generated from the given calling name spoken by the user, is transmitted from the smart speaker 100 to the audio recognition server 3 (step S602).

Then, the CPU 31 of the audio recognition server 3 refers to the dictionary information provided by the audio assistant program (skill program in FIG. 36) to interpret the audio data (steps S603, S604). As a result, the CPU 31 of the audio recognition server 3 can determine which audio assistant program is requested based on the operation audio conversion program.

Then, the CPU 31 of the audio recognition server 3 transmits an access token to the audio operation API 500 via the operation audio conversion program to update the access token (steps S605, S606). That is, if the expiration date of the access token has been passed, the audio operation API 500 generates the access token having the same value of the received access token and returns the access token.

Then, the CPU 31 of the audio recognition server 3 transmits, to the management program of the AI assistant server 4, the intent, the parameter (slot), the device ID of the smart speaker 100 that is used as the input source of audio instruction, and the user information based on the operation audio conversion program (step S607).

The intent represents information indicating the setup request, and in a case of the setup request, the parameter may not be included in the setup request. Further, the user information includes the user ID identifying the user of the smart speaker 100 and the access token acquired as described above.

Then, if the access token does not exist, the CPU 41 of the AI assistant server 4 transmits audio feedback information, such as "access token cannot be confirmed. check account linking settings," to the smart speaker 100 (used by the user) via the audio recognition server 3, based on the management program (steps S608, S609).

Then, the smart speaker 100 outputs (speaks) the audio feedback such as "access token cannot be confirmed. check account linking settings" (step S610).

Further, based on the management program, the CPU 41 of the AI assistant server 4 checks or confirms whether or not the control target apparatus, such as the MFP 1, which is associated with the device ID of the smart speaker 100 or the user information, has been already registered in the provisional code association DB of the association DB 102 (steps S611, S612).

Further, the CPU 41 of the AI assistant server 4 acquires a provisional code list from the provisional code association DB (steps S613, S614). The provisional code association DB is stored in a storage unit accessible by the management program, such as an HDD of the cloud service apparatus. The CPU 41 of the AI assistant server 4 determines whether or not the provisional code associated with the device ID of the smart speaker 100 or the user information is included in the acquired provisional code list.

If the device ID of the smart speaker 100 or the user information is included in the provisional code list, there is no need to generate the provisional code, in which the CPU 41 of the AI assistant server 4 generates audio feedback information, such as "Provisional code has been registered. Please input provisional code," and transmits the audio feedback information to the smart speaker 100 (used by the user) via the audio recognition server 3 (steps S615, S616). Then, the smart speaker 100 outputs (speaks) the audio feedback such as "Provisional code has been registered. Please input provisional code." (step S617).

On the other hand, if the device ID of the smart speaker 100 or user information is not included in the provisional code list, it is required to generate a provisional code. Therefore, the CPU 41 of the AI assistant server 4 determines whether or not the number of issued provisional codes has reached the upper limit number by inquiring the provisional code association DB.

If Issued Provisional Code has Reached Upper Limit Number:

If the number of issued provisional code has already reached the upper limit number, the CPU 41 of the AI assistant server 4 generates audio feedback information, such as "Provisional code cannot be issued. Please apply again after 30 minutes or more," and transmits the audio feedback information to the smart speaker 100 (used by the user) via the audio recognition server 3 (steps S626, S627). Then, the smart speaker 100 outputs (speaks) the audio feedback such as "Provisional code cannot be issued. Please apply again after 30 minutes or more" (step S628).

In the third embodiment, the upper limit is set for the number of provisional codes that the management program (Lambda in FIG. 36) of the AI assistant server 4 can issue. However, the provisional code can be deleted after a pre-set period of time, such as 30 minutes after issuing the provisional code. Therefore, for example, after at least 30 minutes, the issued provisional code can be deleted and then a new provisional code can be issued. Therefore, the audio feedback information includes information indicating when the provisional code can be issued again. The issue timing of provisional code varies depending on the settings of "Time-To-Live (TTL)." Therefore, the management program generates a response message in accordance with the settings of TTL.

If Issued Provisional Code has not Yet Reached Upper Limit Number:

If the number of issued provisional code has not yet reached the upper limit number, the CPU 41 of the AI assistant server 4 generates a provisional code (step S618), and registers the generated provisional code in the provisional code association DB of the association DB 102 (step S619). Specifically, the CPU 41 of the AI assistant server 4 transmits the ID type, the device ID, the access token, the provisional code, the provisional code generation date (code generation date), and the TTL information indicating a period for retaining the provisional code, to the provisional code association DB based on the management program (step S619).

The ID type represents information indicating the type of transmitted ID information, and in this example case, the ID type represents information indicating the device ID. Other than the device ID, the ID type can include a user ID, a room ID (information identifying a location or building where the smart speaker and the control target apparatus is installed or used). If the ID type is the user ID, the management program transmits the user ID to the provisional code association DB. If the ID type is the room ID, the management program transmits the room ID to the provisional code association DB. The user ID or room ID can be, for example, included in the setup request described above, or the user ID or room ID registered in association with the device ID included in the setup request can be identified or specified by the operation audio conversion program. In this case, a table associating the device ID and the user ID, a table associating the device ID and the room ID are stored in a storage unit, such as the HDD 44 of the AI assistant server 4.

If MFP Associated with Device ID of Smart Speaker Exists:

Then, the CPU 41 of the AI assistant server 4 determines whether or not the MFP already associated with the device ID of the smart speaker 100 exists by referring to the association DB 102.

If the MFP that is already associated with the device ID of the smart speaker 100 exists, the CPU 41 of the AI assistant server 4 generates audio feedback information, such as "This device is already associated with MFP. In case of re-setting, please input provisional code," and transmits the audio feedback information to the smart speaker 100 (used by the user) via the audio recognition server 3 (steps S620, S621). Then, the smart speaker 100 outputs (speaks) the audio feedback such as "This device is already associated with MFP. In case of re-setting, please input provisional code" (step S622).

If MFP Associated with Device ID of Smart Speaker does not Exist:

On the other hand, if the MFP that is associated with the device ID of the smart speaker 100 does not exist, the CPU 41 of the AI assistant server 4 generates audio feedback information, such as "Please input provisional code," and transmits the audio feedback information to the smart speaker 100 (used by the user) via the audio recognition server 3 (steps S623, S624). Then, the smart speaker 100 outputs (speaks) the audio feedback such as "Please input provisional code" (step S625) for prompting a setup operation, and then the user inputs or enters the provisional code.

Figure 39B:
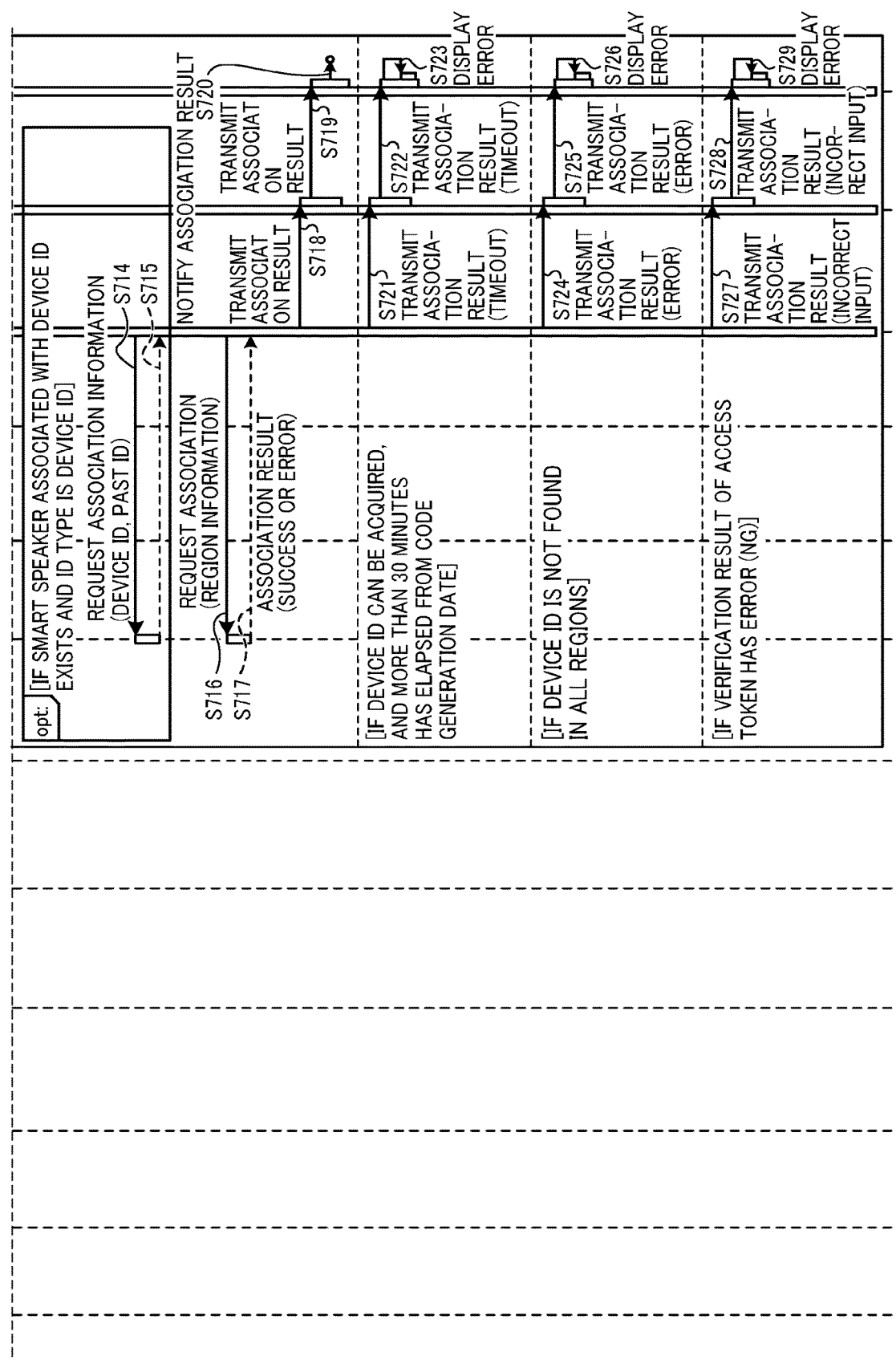

Flow in Second Half of Association Operation Between Smart Speaker and MFP:

Hereinafter, a description is given of the flow in the second half of the association operation between the smart speaker 100 and the MFP 1 with reference to the sequence diagram of FIGS. 39A and 39B (FIG. 39).

When the provisional code is issued, the user operates the operation unit 16 of the MFP 1 to input the provisional code acquired via the smart speaker 100 and the user ID (and password) input in step S506 using an association screen (steps S701, S702).

Then, the process execution program (e.g., Voice Control Service) installed on the MFP 1 acquires the user ID and the provisional code. Further, an "association button" for instructing an execution of the association processing of the MFP 1 and the smart speaker 100 can be displayed on a screen of a display on the MFP 1, and then the association processing can be performed by operating the association button (step S703).

Then, the communication control program of the MFP 1 (e.g., MultiDeviceHub) acquires the user ID and the provisional code from the process execution program (step S704), and then transmits the user ID and the provisional code to the audio operation API 500 (step S705). The communication control program is a program for controlling communication with the cloud service apparatus, such as the audio recognition server 3 and the AI assistant server 4.

Then, the audio operation API 500 acquires a region list from a region management DB (steps S706, S707). The region management DB can be provided in a storage unit of the cloud service apparatus, such as the HDD 44 of the AI assistant server 4. The region information represents information indicating a location where a server configuring the cloud service apparatus is disposed or installed, such as a nation, state, and/or region. The cloud service apparatus can consist of a plurality of servers. For example, the audio recognition server 3 that executes the operation audio conversion program and the AI assistant server 4 that executes the management program can be different servers, and each server may be disposed or installed in different regions. Further, a server that executes both of the operation audio conversion program and the management program can be disposed or installed in each region.

Further, the MFP 1 is set in advance with a condition indicating which server is to be accessed from the MFP 1 among the servers disposed or installed in the plurality of regions. This region setting can be set to any region by the user. The region setting can be performed at any timing. For example, the user can perform the region setting by operating the operation unit before step S501. At this timing, the user can set the region information along with valid and invalid settings of the audio-based operation function for the MFP 1. The MFP 1 accesses the audio operation API 500 corresponding to the set region information.

Then, the audio operation API 500 searches the provisional code association DB (step S708) to check or confirm whether or not information of provisional code identical to the provisional code input by the user is stored in the provisional code association DB.

If the information of provisional code corresponding to the provisional code input by the user is stored in the provisional code association DB, the audio operation API 500 acquires the access token, the device ID, and the provisional code generation date from the provisional code association DB (step S709).

Typically, the cloud service apparatus can be disposed or installed in a plurality of regions, and the provisional code association DB can be stored in each of the cloud service apparatus disposed or installed in each region. Therefore, there may be a case that an installation region of one server registered with the provisional code in step S619 become different from an installation region of another server that is accessed by the MFP 1 (i.e., the installation region of the server that executes the audio operation APT 500 that is accessed by the MFP 1 in step S705). In this case, even if the provisional code association DB stored in another server accessed by the MFP 1 is searched, the provisional code registered in the step S619 is not detected or found in the provisional code association DB stored in another server accessed by the MFP 1.

Therefore, the audio operation API 500 checks whether or not the provisional code exists in a specific server that is accessed by the MFP 1. If the provisional code does not exist in the specific server that is accessed by the MFP 1, the audio operation API 500 searches the provisional code association DB with respect to all of the regions included in the region list acquired in step S706, that is the servers disposed or installed in the plurality of regions (steps S710, S711).

If Device ID is Acquired and Less than 30 Minutes from Code Generation Date:

Then, if the device ID is acquired and less than 30 minutes from the provisional code generation date, the audio operation API 500 searches the association DB 102 using the apparatus ID (e.g., machine number) of the MFP 1 acquired from the MFP 1. That is, the audio operation API 500 determines whether or not any smart speakers 100, associated with the apparatus ID of the MFP 1, is registered in the association DB 102 (steps S712, S713).

If Smart Speaker Associated with Apparatus ID Exists and ID Type is Device ID:

If the smart speaker 100 associated with the apparatus ID exists and the ID type is the device ID based on a determination result in steps S712 and S713, the audio operation API 500 deletes the device ID associated and registered in the association DB 102 (steps S714, S715). If the ID type is the device ID, the smart speaker 100 and the MFP are associated with a relationship of one-to-one. Therefore, if the smart speaker 100 that was associated with the MFP 1 in the past exists, the association information is deleted. This allows the new association between the smart speaker 100 and the MFP 1.

On the other hand, if the ID type is the user ID or room ID, a plurality of control target apparatuses (e.g., MFPs) can be registered in association with the user ID or room ID in some cases. Therefore, if the ID type is the user ID or room ID, the past association information is not deleted, but the past association information is updated by adding the MFP 1 to be associated with the smart speaker 100.

Further, to be described later in step S716, the association DB 102 stores the apparatus ID in association with information indicating the smart speaker 100, in which the information indicating the smart speaker 100 can be the device ID, user ID, or room ID. Therefore, the apparatus ID can be stored in association with the ID type indicating which type of information is used to identify the smart speaker 100. Further, if the ID type can be identified from the apparatus ID, it may not be necessary to store the apparatus ID together with the ID type.

Then, the audio operation API 500 stores the apparatus ID of the MFP 1 and the information indicating the smart speaker 100 in the association DB 102 in association with each other (step S716). Since the information indicating the smart speaker 100 can be the device ID, user ID, or room ID, the audio operation API 500 may store the apparatus ID of the MFP 1 in the association DB 102 in association with the ID type representing the type of information indicating the smart speaker 100. Further, the association request includes, for example, region information indicating a location of a server (i.e., address of the specific server that executes the audio operation API 500) that is accessed by the MFP 1.

Thus, among the servers disposed or installed in the plurality of regions, the region information of the specific server that is accessed by the MFP 1 in step S705 can be registered to the association DB 102 of the server that executes the processing in steps S601 to S625.

Further, the audio operation API 500 can retain the region information corresponding to the specific server that executes the audio operation API 500, or can acquire the region information from the storage unit disposed in the specific server. Therefore, the audio operation API 500 transmits the region information of the specific server including the audio operation API 500 to the association DB 102, but not limited thereto. For example, after acquiring the region information from the MFP 1 in step S705, the audio operation API 500 can transmit the acquired region information to the association DB 102.

Further, as described above, if the ID type is the user ID or room ID and the association information is already registered in the association DB 102, the past association information is updated by adding the MFP 1 to be associated with the smart speaker 100.

Then, the audio operation API 500 receives an association result indicating whether or not the association processing has succeeded or not from the association DB 102 (step S717). Then, the association result is transmitted to the MFP 1 (steps S718, S719, S720).

If Device ID is Acquired and More than 30 Minutes has Elapsed from Code Generation Date:

Then, if the device ID is acquired and more than 30 minutes has elapsed from the provisional code generation date, an association result indicating a timeout is transmitted from the audio operation API 500 to the MFP 1 (steps S721, S722). Then, the MFP 1 displays an error message (step S723).

If Device ID is not Found in all Regions:

If the device ID is not found in all of the regions, an association result indicating an error is transmitted from the audio operation API 500 to the MFP 1 (steps S724, S725). Then, the MFP 1 displays an error message (step S726).

If Verification Result of Access Token has Error (NG):

Hereinafter, a description is given of a case that the access token has an error (NG) by verifying the access token. In this case, the access token acquired from the provisional code association DB in step S709 (access token generated in step S510) and the access token generated by the audio operation API 500 based on the user ID acquired in step S702 are compared.

If the compared two access tokens are not identical, it is determined that there is an error in the access token (i.e., error in the user ID acquired in step S702). Since the audio operation API 500 generates the access token by hashing the user ID, the audio operation API 500 can generate the same access token if the comparing two user IDs are identical. Therefore, when there is an error in the access token, the user ID input or entered to the smart speaker 100 in step S506 and the user ID input or entered to the operation unit 16 of the MFP 1 in step S702 are not identical. Then, an association result indicating an incorrect input of the user ID is transmitted from the audio operation API 500 to the MFP 1 (steps S727, S728). Then, the MFP 1 displays an error message (step S729).

As to the above described audio-based operation system of the third embodiment, the smart speaker 100 and the MFP 1 can be associated with each other and registered (stored) in the association DB 102. Then, when a user-spoken phrase is collected by the smart speaker 100, by referring to the association DB 102, the MFP 1 associated the smart speaker 100 is searched, and a job is requested to the searched MFP 1. With this configuration, the smart speaker 100 and the MFP 1 can be associated and controlled with a relationship of one-to-one.

Further, the user account information can be associated with the provisional code and the device ID of the smart speaker 100 and stored in the provisional code association DB. Then, if the user account information and the provisional code acquired from the MFP 1 are already stored in the provisional code association DB, the user account information, the device ID of the smart speaker 100 and the apparatus ID of the MFP 1 are stored in the confirmed code association DB in association with each other. With this configuration, the user authentication based on the user account information can be performed, and thereby the security of the audio-based operation system can be enhanced.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

For example, in the above described first embodiment, the audio recognition server 3 generates the text data corresponding to the user-spoken phrase, and the AI assistant server 4 interprets the operation intended by the user based on the text data, but is not limited thereto. For example, the mobile terminal 2 can be configured to include the audio recognition function and interpretation function to interpret an intended operation based on the user-spoken phrase. With this configuration, the audio recognition server 3 and the AI assistant server 4 can be omitted, with which the system configuration can be simplified.

In conventional technologies, an account that is logged in by a smart device and account information of a control target apparatus are associated with each other so that the control target apparatus, which is controlled from the smart device, can be identified.

In conventional technologies, a situation that a plurality of smart speakers are controlled by one account may occur. In this case, the plurality of smart speakers may control one target apparatus, in which it becomes difficult to associate the smart speaker and the target apparatus with a relationship of one-to-one.

As to the above described one or more embodiments of the present disclosure, the information processing apparatus, the method of processing information, and the non-transitory computer readable storage medium storing program codes for causing a computer to execute the method of processing information can associate and control the audio input-output device, used for an audio-based operation using audio instruction, and the control target apparatus with a relationship of one-to-one.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing apparatus comprising:
   circuitry configured to
   issue a provisional code in response to receiving a setup request via an audio input-output device, the audio input-output device useable for operating a target apparatus based on an audio instruction input via the audio input-output device;
   store, in a memory, the issued provisional code in association with first identification information identifying the audio input-output device;
   transmit, to the audio input-output device, audio feedback information causing the audio input-output device to output the issued provisional code as an audio;
   in response to inputting the provisional code, which is output via the audio input-output device, into the target apparatus operable by the audio input-output device, receive the provisional code and second identification information identifying the target apparatus transmitted from the target apparatus; and
   store, in the memory, the first identification information identifying the audio input-output device and the second identification information identifying the target apparatus in association with each other when the provisional code received from the target apparatus is already stored in the memory.

2. The information processing apparatus according to claim 1,
   wherein in response to receiving the audio instruction via the audio input-output device, the circuitry searches the memory for the target apparatus identified by the second identification information associated with the first identification information identifying the audio input-output device, and instructs the searched target apparatus to execute a process corresponding to the audio instruction received via the audio input-output device.

3. The information processing apparatus according to claim 1,
wherein the circuitry stores, in the memory, user account information in association with the provisional code and the first identification information identifying the audio input-output device, and
wherein, when user account information and the provisional code received via the target apparatus are already stored in the memory, the circuitry further stores, in the memory, the user account information, in association with the first identification information identifying the audio input-output device, and the second identification information identifying the target apparatus.

4. The information processing apparatus according to claim 1,
wherein when the audio input-output device is not yet associated with the target apparatus, the circuitry transmits, to the audio input-output device, audio feedback information causing the audio input-output device to output an audio feedback prompting a setup operation.

5. An information processing system comprising:
the information processing apparatus of claim 1;
an audio input-output device configured to receive an audio instruction; and
a target apparatus operable using the audio instruction input via the audio input-output device.

6. A method of processing information, comprising:
issuing a provisional code in response to receiving a setup request via an audio input-output device, the audio input-output device useable for operating a target apparatus based on an audio instruction input via the audio input-output device;
storing, in a memory, the issued provisional code in association with first identification information identifying the audio input-output device;
transmitting, to the audio input-output device, audio feedback information causing the audio input-output device to output the issued provisional code as an audio;
in response to inputting the provisional code, which is output via the audio input-output device, into the target apparatus operable by the audio input-output device, receiving the provisional code and second identification information identifying the target apparatus transmitted from the target apparatus; and
storing, in the memory, the first identification information identifying the audio input-output device and the second identification information identifying the target apparatus in association with each other when the provisional code received from the target apparatus is already stored in the memory.

7. A non-transitory computer readable storage medium storing one or more instructions that, when performed by one or more processors, cause the one or more processors to execute a method of processing information, the method comprising:
issuing a provisional code in response to receiving a setup request via an audio input-output device, the audio input-output device useable for operating a target apparatus based on an audio instruction input via the audio input-output device;
storing, in a memory, the issued provisional code in association with first identification information identifying the audio input-output device;
transmitting, to the audio input-output device, audio feedback information causing the audio input-output device to output the issued provisional code as an audio;
in response to inputting the provisional code, which is output via the audio input-output device, into the target apparatus operable by the audio input-output device, receiving the provisional code and second identification information identifying the target apparatus transmitted from the target apparatus; and
storing, in the memory, the first identification information identifying the audio input-output device and the second identification information identifying the target apparatus in association with each other when the provisional code received from the target apparatus is already stored in the memory.

* * * * *